United States Patent
Doane et al.

(10) Patent No.: US 10,516,603 B2
(45) Date of Patent: *Dec. 24, 2019

(54) INTERFACES TO MANAGE INTER-REGION CONNECTIVITY FOR DIRECT NETWORK PEERINGS

(71) Applicant: Amazon Technologies, Inc., Seattle, WA (US)

(72) Inventors: Andrew J. Doane, Vienna, VA (US); Kevin Christopher Miller, Herndon, VA (US); David B. Lennon, Reston, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/024,549

(22) Filed: Jun. 29, 2018

(65) Prior Publication Data
US 2018/0324085 A1 Nov. 8, 2018

Related U.S. Application Data

(63) Continuation of application No. 13/335,465, filed on Dec. 22, 2011, now Pat. No. 10,015,083.

(51) Int. Cl.
*H04L 12/725* (2013.01)
*H04L 12/717* (2013.01)
(Continued)

(52) U.S. Cl.
CPC ............ *H04L 45/306* (2013.01); *H04L 45/00* (2013.01); *H04L 45/02* (2013.01); *H04L 45/42* (2013.01)

(58) Field of Classification Search
CPC .............................................. H04L 45/00–745
See application file for complete search history.

(56) References Cited

U.S. PATENT DOCUMENTS

| 6,141,777 A | 10/2000 | Cutrell et al. |
| 6,594,335 B2 | 7/2003 | Davidson |

(Continued)

FOREIGN PATENT DOCUMENTS

| JP | 2002232427 | 8/2002 |
| WO | 2010068630 | 6/2010 |
| WO | 2011049742 | 4/2011 |

OTHER PUBLICATIONS

Network Visualization—Network Admission Control Deployment Guide (2007). Cisco Systems, Inc. pp. 1-14.
(Continued)

*Primary Examiner* — David R Lazaro
(74) *Attorney, Agent, or Firm* — Robert C. Kowert; Kowert, Hood, Munyon, Rankin & Goetzel, P.C.

(57) ABSTRACT

Methods and apparatus for interfaces to manage inter-regional connectivity for direct network peerings. A system may include a connectivity coordinator, a first resource collection in a first geographical zone and a second resource collection in a second geographical zone. The coordinator implements a programmatic interface defining connectivity operations. The coordinator receives a request via the interface to establish a logically isolated network path to the second resource collection on behalf of a client that has a dedicated physical link set up to connect to the first resource collection. In response to the request, the coordinator performs one or more configuration operations to enable traffic to flow from the client's network to the second resource collection over a logically isolated network path using the dedicated physical link.

20 Claims, 36 Drawing Sheets

(51) Int. Cl.
*H04L 12/751* (2013.01)
*H04L 12/701* (2013.01)

(56) References Cited

U.S. PATENT DOCUMENTS

| | | | |
|---|---|---|---|
| 6,615,258 B1 | 9/2003 | Barry et al. | |
| 7,107,312 B2 | 9/2006 | Hackbarth et al. | |
| 7,225,249 B1 | 5/2007 | Barry et al. | |
| 7,292,577 B1 | 11/2007 | Ginipalli et al. | |
| 7,327,682 B2 | 2/2008 | Gandhi et al. | |
| 7,734,516 B2 | 6/2010 | Barnum et al. | |
| 8,073,777 B2 | 12/2011 | Barry et al. | |
| 8,959,203 B1* | 2/2015 | Miller | H04L 47/00 709/223 |
| 9,106,469 B1* | 8/2015 | Miller | H04L 67/1091 |
| 9,141,947 B1* | 9/2015 | Furr | G06Q 20/102 |
| 9,451,393 B1* | 9/2016 | Cullen | H04W 4/50 |
| 9,692,729 B1* | 6/2017 | Chen | H04L 63/0272 |
| 10,015,083 B2* | 7/2018 | Doane | H04L 45/42 |
| 10,187,289 B1* | 1/2019 | Chen | H04L 45/02 |
| 2001/0022837 A1 | 9/2001 | Vasell et al. | |
| 2003/0074443 A1 | 4/2003 | Melaku et al. | |
| 2003/0236745 A1 | 12/2003 | Hartsell et al. | |
| 2005/0216421 A1 | 9/2005 | Barry et al. | |
| 2007/0135109 A1 | 6/2007 | Walter et al. | |
| 2007/0220575 A1 | 9/2007 | Cooper et al. | |
| 2008/0276085 A1 | 11/2008 | Davidson et al. | |
| 2008/0298374 A1 | 12/2008 | Rhoades et al. | |
| 2009/0276771 A1 | 11/2009 | Nickolov et al. | |
| 2010/0039959 A1 | 2/2010 | Gilmartin | |
| 2010/0111093 A1 | 5/2010 | Satterlee et al. | |
| 2010/0131649 A1 | 5/2010 | Ferris | |
| 2010/0226280 A1 | 9/2010 | Burns et al. | |
| 2010/0319004 A1 | 12/2010 | Hudson et al. | |
| 2011/0016028 A1 | 1/2011 | Toure et al. | |
| 2011/0131647 A1 | 6/2011 | Sanders et al. | |
| 2011/0231899 A1 | 9/2011 | Pulier et al. | |
| 2012/0130873 A1 | 5/2012 | Morgan | |
| 2013/0166709 A1* | 6/2013 | Doane | H04L 45/42 709/223 |
| 2017/0359413 A1* | 12/2017 | Miller | H04L 67/1091 |

OTHER PUBLICATIONS

Office Action from Japanese Application No. 2014-544797, dated May 12, 2015 (English and Japanese Versions), pp. 1-4.

* cited by examiner

Connectivity Center Home Page — 800 https://ABCconnectivity.com

Dear John Doe, Welcome to Connectivity Center!

Just provide your connectivity requirements below, ← 803
submit the form, and get your configuration
instructions in seconds!

| Address where you need the connection: | Street / City, State, Zip / Country | ← 805 |

| Bandwidth: | ● 1 Gbps / ○ 10Gbps / ○ Other (specify) | ← 807 |

| Pairing (optional): | Number of connections: 2 / ● Active/Active / ○ Active/Passive | ← 809 |

| Your Router Equipment (optional): | Vendor Name / Model | ← 811 |

| Network Service Provider | | ← 813 |

SUBMIT ← 815

*Figure 8*

Connectivity Center Home Page — 1600 https://ABCconnectivity.com

Dear John Doe, welcome to Connectivity Center!

Just provide your connectivity requirements below, ← 1603
submit the form, and get your configuration
instructions in seconds!

| Address where you need the connection: | Street | |
|---|---|---|
| | City, State, Zip | |
| | Country | |

← 1605

| Do you need help selecting a connectivity provider? | ◉ Yes, please send me a list of available providers |
|---|---|
| | ○ No |

← 1607

| Bandwidth: | ◉ 1 GB |
|---|---|
| | ○ 10GB |
| | ○ Other (specify) |

← 1609

| Connectivity timing requirements (e.g., start time, end time) (optional) | |
|---|---|

← 1611

[SUBMIT] ← 1615

DirectConnectMarketCenter Home Page https://DirectConnectMarket.com

Dear John Doe, welcome to Direct Connect Market!

Just provide the details of your service below, submit the form, and submit your service advertisement in seconds! ←2603

| Service name and description | Name | | ←2605 |
| | Description | | |
| | Links to additional information | | |

| Pricing information | Flat rate | | ←2607 |
| | Variable rate | | |
| | Advanced pricing options | | |

Customer requirements ←2611

Slots information ←2613

Distribution options ←2614

SUBMIT ←2615

Remote Connectivity Center Home Page https://RemoteConnectivity.com

Dear John Doe, welcome to the Remote Connectivity Center!

Just provide the details of your remote connectivity request below, submit the form, and establish your remote logical connection within seconds! ←3403

| Customer ID | | ←3405 |
| Remote Resource Collection ID | | ←3407 |
| Remote Zone | | ←3409 |
| Direct Physical Link ID | | ←3411 |

Logical Connection Configuration Details
- VLAN tag
- BGP ASN
- Prefixes
- Pairing
- Gateway

←3413

SUBMIT ←3415

*Figure 34*

INTERFACES TO MANAGE INTER-REGION CONNECTIVITY FOR DIRECT NETWORK PEERINGS

This application is a continuation of U.S. patent application Ser. No. 13/335,465, filed Dec. 22, 2011, now U.S. Pat. No. 10,015,083, which is hereby incorporated by reference herein in its entirety.

BACKGROUND

Many companies and other organizations operate computer networks that interconnect numerous computing systems to support their operations and the services they provide to their end customers distributed worldwide. For example, data centers housing significant numbers of interconnected computing systems have become commonplace, such as private data centers that are operated by and on behalf of a single organization, and public data centers that are operated by entities as businesses to provide computing resources to customers. In many cases providers set up large networks that may logically span several regions or even countries, and may include numerous data centers with varying levels of services and facilities available, utilized together to provide a unified set of services to their end customers.

In some data centers that have been set up to provide computing and/or storage facilities to remote clients, the set of computational resources at the data center may be dynamically divided into resource pools, with each pool being made available for exclusive use by a given client for designated periods of time. There are a number of alternatives available for how the consumers of these facilities establish network connectivity to the resource pools that have been designated for their use. The customer requests may originate from a wide variety of devices—desktop personal computers, laptops, client-office servers, tablets, smart phones and the like. These devices may use either long-lasting network links (e.g., using a client office network with a T1 connection) to communicate with their proximate private network and/or the public Internet, or they may have transient connectivity (e.g., in the case where the customer uses a mobile smart phone). The proximate networks to which the customer devices are directly connected may in turn route request traffic to the provider network's data centers over a wide variety of paths. Such paths in many cases may have somewhat unpredictable performance, reliability and security characteristics.

For some casual types of service requests, such as a request from a customer to read a recent news article from a web-based news provider, a reasonable variation in responsiveness and an occasional dropped connection may be acceptable. However, for many business-related data transmissions, such as stock quote services and stock purchase order services provided by online stock traders, or for high-bandwidth software package deployments originating at a software development center, more stringent performance, reliability and security needs may exist. In such environments, a customer of the provider network may need a greater level of network isolation and control than is generally available over the public Internet. For example, the customer may wish to establish, if possible, dedicated physical network links between the customer's own network and the provider network, such that the only traffic transmitted over those links is traffic generated on behalf of the customer and in accordance with policies established by the customer. Furthermore, to meet quickly changing business needs, customers may want the ability to enable and disable such dedicated links dynamically and with a minimum of effort and delay.

BRIEF DESCRIPTION OF THE DRAWINGS

FIG. 8 is an illustration of a portion of an exemplary web-based interface that may be provided by connectivity coordinator, according to at least some embodiments.

FIG. 16 is an illustration of a portion of an exemplary web-based interface that may be provided for initiating connectivity provider selection, according to some embodiments.

FIG. 26 is an illustration of a portion of an exemplary web-based interface that may be provided for marketplace operations such as service advertisements, subscriptions and the like, according to some embodiments.

FIG. 34 is an illustration of a portion of an exemplary web-based interface that may be provided to allow a client to request the establishment of a logically-isolated path to a remote resource collection, according to some embodiments.

Figure 1:
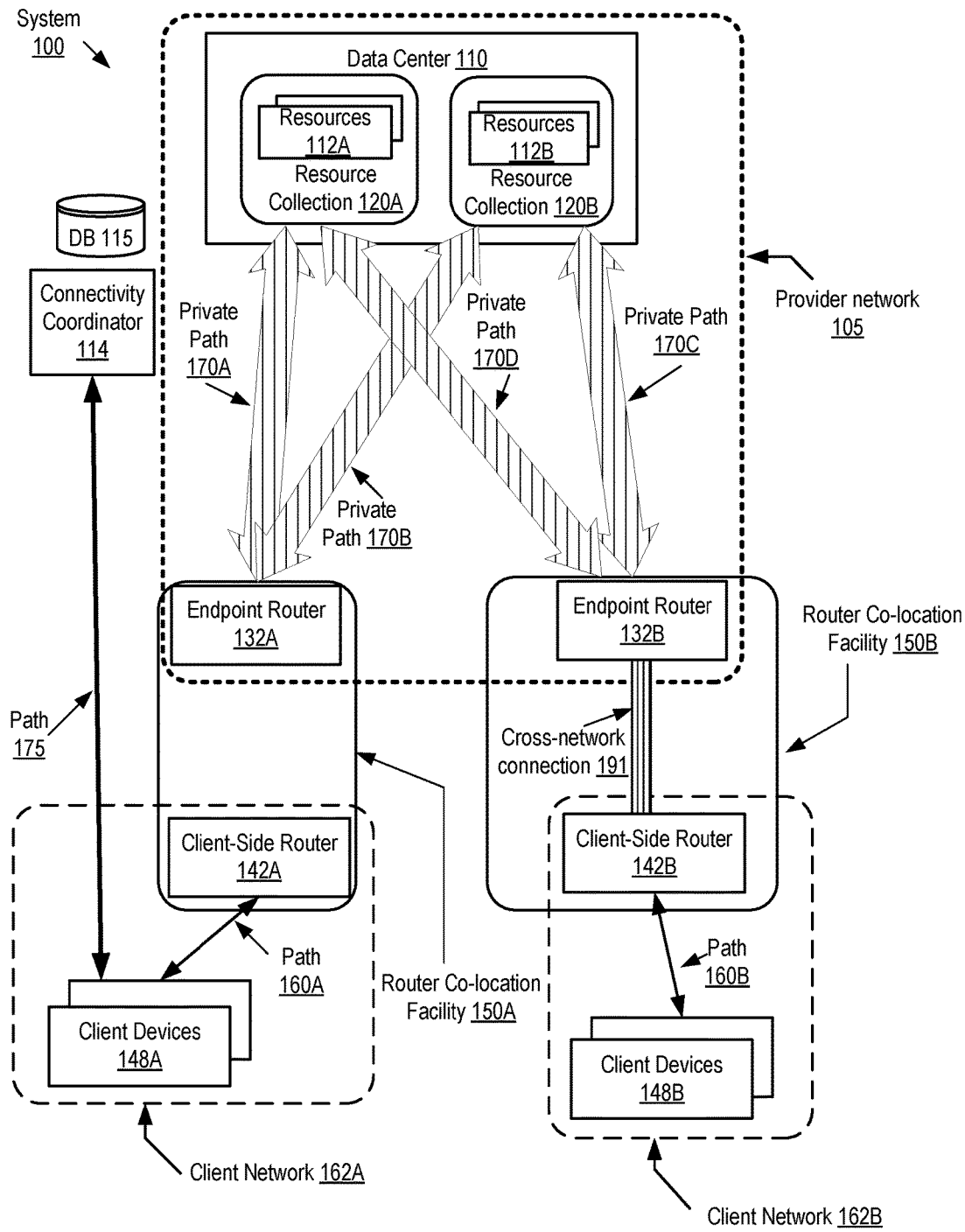
FIG. 1 illustrates an example system, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for using interfaces such as application programming interfaces (APIs) to manage dedicated network connectivity between customer networks and provider networks are described. Networks set up by an entity such as a company or a public sector organization to provide one or more services accessible via the Internet (such as various types of cloud-based computing or storage) to a distributed set of clients may be termed provider networks in this document. Such a provider network may include numerous data centers hosting various resource pools, such as collections of computer servers, storage devices, networking equipment and the like, needed to implement and distribute the services offered by the provider.

In order to extend the geographical areas over which its services can be accessed with desired levels of performance, reliability and security, an operator of a provider network may establish dedicated private network paths between its data centers and one or more routers that are physically located at a facility remote from the data centers. The facilities at which these routers are housed are termed "router co-location facilities" in this document, as they may sometimes house routers and other network equipment owned and/or managed by business entities other than the provider network's operator, such as by independent network service providers or by the clients themselves. Routers owned or managed by, or on behalf of, the provider network operator at the router co-location facilities are called "endpoint" routers in this document, as they may represent the furthest points to which the provider network's control or ownership of network equipment extends. For example, only traffic that has passed through a device owned or managed by the provider network operator, and therefore complies with policies set by the provider network operator, may be allowed on the private paths between the endpoint routers and other components of the provider network. In some embodiments one or more other routers at the router co-location facilities may be part of a client network—i.e., such routers may owned and/or managed by or on behalf of the clients, or the other routers may have private connectivity to the systems at which clients of the provider network generate service requests for the provider network. These other routers are termed "client-side" routers in this document.

In order to facilitate the management of network connectivity between the client networks and the provider network, in some embodiments a connectivity coordinator responsible for implementing one or more programmatic interfaces through which connectivity-related requests from clients are handled may be set up. A variety of different kinds of connectivity-related requests, such as requests to discover the types of connectivity options that may be accessible, requests to select a particular connectivity option or service, requests to set up or dismantle a physical link, and the like may be made available through the interface in different implementations. The interface may be exposed to the client in many different ways in various embodiments: for example, as an API, through a graphical user interface, a web page or web site, or even as a collection of commands that can be issued from a computer system's command-line prompt.

In one embodiment, one or more collections or pools of resources at a data center may be allocated for use by a particular client, i.e., to implement functionality needed to satisfy services requested from devices of the client network. In such an embodiment, a connectivity coordinator may be operable to receive a request to establish dedicated connectivity from a client to one or more of the resource pools. The connectivity request may be generated or formatted to conform to the interface implemented by the connectivity coordinator—for example, it may be received via a web-based form submission in a case where the interface is presented to the client as a set of web pages. In response to the request for dedicated connectivity, the connectivity coordinator may select a particular endpoint router from among the set of endpoint routers of the provider network as the target router from which dedicated connectivity is to be provided to the requesting client. For example, the target router may be selected from the available endpoint routers at a router co-location facility geographically closest to the client's premises, at which the client has access to an existing client-side router. In some implementations the interface may allow the client to specify various details in the request that may help the connectivity coordinator choose an appropriate target endpoint router, such as one or more names and/or addresses of router co-location facilities, a desired bandwidth, desired price ranges, and the like.

Having selected the target endpoint router, the connectivity coordinator may generate configuration instructions for one or more physical network links to be established to provide the desired dedicated connectivity, and transmit the instructions back to the client in reply to the client's request. The reply may also be generated to conform to the interface implemented by the connectivity provider: e.g., in a case where a web page with a form was used for the client request, the configuration instructions may also be specified as one or more web pages, or as links to documents accessible from the web site. The configuration instructions may, for example, identify a physical location of the endpoint router, a physical port of the target endpoint router, the rack in which the target router is housed, the kind of connector required for the physical link, and so on. After the client sets up the physical network link in accordance with the instructions, the connectivity provider in some embodiments may verify that the link has been set up correctly and send a confirmation message to the client indicating that the requested dedicated connectivity has been established.

Example System Environment

FIG. 1 illustrates an example system environment, according to at least some embodiments. The system 100 may include a provider network 105 with one or more data centers 110 maintained to provide services to clients, such as cloud computing services or cloud storage services. The data centers 110 in turn may include resource collections such as 120A and 120B. Each resource collection 120 may include a set of resources (for example, computer servers, storage devices, network devices, etc.) such as resources 112A in resource collection 120A and resources 112B in resource collection 120B. The system 100 may also include a connectivity coordinator 114 configured to provide a connectivity service to the clients, a connectivity database 115, and a plurality of endpoint routers such as endpoint routers 132A and 132B in some embodiments. The endpoint routers 132 may be linked to the resource collections 120 via private network paths such as paths 170A, 170B, 170C and 170D. Direct use of a private network path 170, such as 170A-170D, may be limited to devices and servers of the provider network, i.e., a network packet may only be physically transmitted upon a link of the private network path from a device owned or managed by the owner of the provider network. The term "path" as used herein, broadly refers to the set of links and devices traversed by a network message or packet between a source device and a destination device. The set of links of a given path may, in some cases, comprise a single wire, as when the source and destination may be linked directly by a physical cable. In other cases the path may include multiple wired and/or wireless links and several intermediary devices such as switches, gateways, routers and the like. Paths may comprise unidirectional and/or bidirectional physical links.

In the illustrated embodiment, two example client networks 162A and 162B representing respective clients of the provider network 105 are shown. Each client network comprises a plurality of client devices 148 (e.g., 148A and 148B) from which requests that are ultimately serviced at resource collections 120 may be generated. Such client devices 148 may include a variety of systems such as desktop or racked computer systems, laptops, notebooks, tablets, smart phones and the like. Some client devices 148 may be housed at client data office premises, client data centers, or client home premises in various embodiments, and others may be mobile devices with no fixed physical location. In the illustrated environment, the client devices 148 of a particular client have access to a client-side router—e.g., client devices 148A of client network 162A are connected to client-side router 142A via path 160A, and client devices 148B of client network 160B are connected to client-side router 142B via path 160B.

Client-side router 142A in the example shown in FIG. 1 is housed at a router co-location facility 150A, where endpoint router 132A is also present, and client-side router 142B is housed at a router co-location facility 150B where endpoint router 132B is located. In general, a number of different types of paths to various components of data center 110, such as connectivity coordinator 114 and resource collections 120, may be available from client networks 162A in various embodiments. For example, a path 175 that does not include endpoint router 132A is shown in FIG. 1 between client devices 148A of client network 162A and connectivity provider 114; such a path 175 may include various routers, gateways and devices of the public Internet, for example, which may or may not provide desired levels of performance, availability, reliability or other service characteristics required for some of the services provided by the provider network 105. Other paths similar to 175, but not illustrated in FIG. 1, may also be available to the resource collections 120 from client devices 148A and/or 148B.

The connectivity service provided by connectivity coordinator 114 may include a number of techniques implemented to help clients of the provider network establish and manage dedicated network paths from the client networks 162 to the resource collections 120 in various embodiments.

For example, a cross-network connection 191 including a physical link or cable between client-side router 142B and endpoint router 132B may have been established with the help of some of the features of the connectivity service provided by connectivity coordinator 114. The term cross-network connection, as used herein, refers to a physical network connection set up between two autonomous networks. For example, within the Internet, an autonomous network may be identified by a unique Autonomous System (AS) identifier—a collection of connected Internet Protocol (IP) routing prefixes under the control of one or more network operators that presents a common, clearly defined routing policy to the Internet. In the illustrated embodiment, the connectivity coordinator 114 may be operable to implement an interface defining various connectivity operations available to clients, including establishment of cross-network connections such as connection 191, and establishment of logically isolated connections or paths using such cross-network links. The interface may be implemented using a variety of approaches: e.g., as an application programming interface (API), a web-based interface, other graphical user interfaces, or command-line interfaces, in different embodiments. Connectivity coordinator 114 may also make the interface known to clients using various mechanisms—e.g., a notification detailing the interface may be published on one or more corporate web sites in one embodiment. Connectivity coordinator 114 may itself be resident outside provider network 105 in some embodiments, and in other embodiments it may be incorporated within the provider network 105.

Using the interface implemented by connectivity coordinator 114, a client may generate a request for dedicated connectivity. The client may, by making such a request, wish to indicate that a physical network link (similar to cross-network connection 191 shown in FIG. 1) be established exclusively for a client network 162A to communicate with one or more resource pools 120, for any of a number of reasons such as better performance, higher reliability, enhanced security, or lower or more predictable cost. The exclusivity requirement may indicate that only traffic to or from a specified set or sets of network addresses in the client's network should be allowed over the requested dedicated physical network link. The set or sets of physical addresses may be identified and/or modified by the client after the physical link has been set up in some implementations, i.e., they may not have to be specified prior to the initial establishment of the physical link. The request may provide any combination of a number of different details that may be of use to connectivity provider 114 in various embodiments—for example, the physical location of one or more client-side routers that could be used, a desired bandwidth and, or other service requirements. In some implementations specific service requirements may be provided in subsequent requests after the initial request to establish dedicated physical connectivity has been sent.

In response to receiving such a request, connectivity coordinator 114 may select a particular endpoint router 132 that may be appropriate to meet the requirements of the client. For example, the endpoint router that is physically closest to one or more client premises where the majority of client requests may be expected to originate may be chosen in one implementation. Having selected the target endpoint router to provide the dedicated connectivity, the connectivity coordinator 114 may generate a reply or notification comprising configuration instructions for a physical network link to be established to the target endpoint router 132 to provide at least a portion of the desired dedicated connectivity. The instructions may include a variety of elements in various embodiments, including for example a port number, rack identifier and the like to identify the target endpoint router. The instructions may also be generated in accordance with the interface—for example, as the contents of a web page in an implementation where the request was received as a web-based form submission. In some cases multiple responses may be sent by the connectivity coordinator—for example, a combination of one or more web responses to the requester, and one or more email messages, some of which may be sent to entities other than the client, such as the operator of the router co-location facility 150. The response or responses from the connectivity coordinator 114 may be used to set up the physical link needed. The time taken to establish the physical link may vary widely, depending on the responsiveness of the client, the responsiveness of the operator of the router co-location facility 150, and various procedures that may have to be completed for security, authorization and the like. After the physical network link has been set up, the connectivity coordinator 114 may in some embodiments transmit a confirmation message to the client indicating that the desired dedicated connectivity has been established. Various connectivity related information, including for example data identifying details of physical links such as cross-network connection 191, data identifying the clients for which such links have been established, the dates or times of establishment of dedicated connectivity, and the like, may be stored in connectivity database 115 in some embodiments.

In addition to the network paths illustrated in FIG. 1, in many environments there may be several other alternative network paths available between the client networks 162 and various components of the system 100. For example, some connectivity requests may be transmitted to the connectivity provider 114 over a path that includes public or shared links, and various services provided at resource collections 120 may be accessed over public or shared links as well. In some cases the alternative paths may serve as backups in case connectivity over the desired dedicated paths is interrupted.

Physical and Logical Connectivity Establishment

Figure 2:
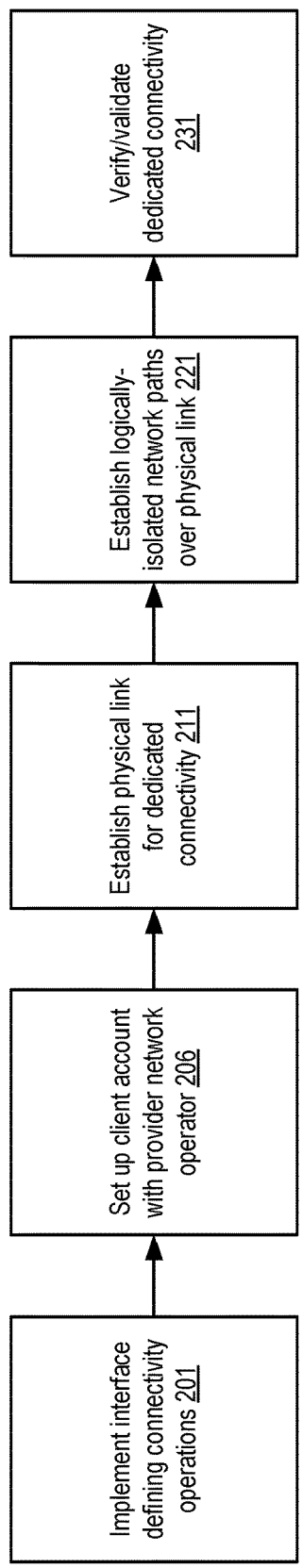
FIG. 2 provides a high level overview of steps that may be taken with the help of services provided by a connectivity coordinator to establish dedicated connectivity between a client network and a resource collection, according to at least some embodiments.

FIG. 2 provides a high level overview of steps that may be taken with the help of services provided by connectivity coordinator 114 in one embodiment to establish dedicated connectivity between a client network 162 and a resource collection 120. As shown in the entry labeled 201 in FIG. 2, the connectivity coordinator 114 may implement an interface defining a set of connectivity-related operations available to clients of the provider network 105, to other entities (such as one or more administrative servers, measurement agents, billing agents and the like) and/or other parties. The set of available operations may include, for example, operations to create, query, retrieve, update or delete connectivity records or objects in some implementations. The available operations may be exposed via application programming interfaces (APIs) in any of a variety of standard specifications or programming languages, such as Web Services Description Language (WSDL), XML, Java, C, C++, Python, Perl, or derivatives thereof, in some environments, where clients may interact with the connectivity provider programmatically by issuing method calls, function calls and the like. In other environments, in addition to or instead of providing a public API using which clients may write code, the connectivity coordinator may provide a more user-friendly interface such as a collection of Web pages. In one implementation, the connectivity coordinator may for example publish a set of documents (similar to Javadocs in a case where Java or a Java-like programming language is used) that provide an exhaustive list of APIs, and may expose a frequently used subset of connectivity-related operations via a Web page or pages. In such an environment a client may opt to use the Web pages for common operations, and may resort to programs that invoke the API calls for more complex operations or for operations for which a web interface is not provided by connectivity coordinator 114. A particular web-based interaction with the client may result in an invocation of one or more of the APIs internally at the connectivity coordinator 114 in some such embodiments. Other types of interfaces, such as command-line tools, independently installable graphical user interfaces (GUIs) (i.e., GUIs that do not rely on Web pages and HTTP-based interactions), thick clients, electronic mail, or messaging protocols, may be used in isolation or in combination to implement the services provided by connectivity coordinator 114 in various embodiments. In some cases the interface may consist of multiple layers, where one layer of interface may invoke another, and one or more of the layers may be exposed for direct client interactions.

In one embodiment, the connectivity coordinator may provide a "Getting Started Guide" or some other similar documentation that may provide examples of how the interface may be used. The following list, with entries labeled API-1 through API-18, is a set of API call invocation examples that may be provided in such documentation for a subset of connectivity services provided by connectivity coordinator 114.

[API-1] CustomerId customerId=createNewCustomer(CustomerInfo customerInfo);
The createNewCustomer API may be used to create a customer account at the connectivity provider. It may take customer information (e.g., name, address, payment-related details) as input, and return a customer identifier.

[API-2] ConnectionRequestId requestId=requestDirectConnection(CustomerId customerId, ConnectionSpecification connectionSpecification);
The requestDirectConnection API may be used to by a customer to send a request for dedicated connectivity, with various details of the properties of the desired connectivity encapsulated in a ConnectionSpecification object.

[API-3] RequestStatus requestStatus=getConnectionRequestStatus(CustomerID customerId, RequestId requestId);
A customer may use the getConnectionRequestStatus API to query the current status of a connection request—for example, the connectivity provider may indicate in the returned RequestStatus object that the current state is "in-progress", "completed" or "rejected".

[API-4] ConnectionId connectionId=getConnectionId(CustomerID customerId, RequestId requestId);
If a Connection Object is created successfully by the connectivity coordinator (and for example stored in connectivity database 115), a client may use the getConnectionId API to obtain an identifier for that connection object.

[API-5] ConnectionInfo connectionInfo=getConnectionInfo(ConnectionId connectionId);
The getConnectionInfo API may be used to obtain the properties of the connection object, including such properties as the physical location of a router, a port number, traffic usage metrics, etc.

[API-6] PhysicalConnectionInfo physicalInfo=getPhysicalConnectionInfo(ConnectionInfo connectionInfo);
The getPhysicalConnectionInfo API may be used to extract the location-specific properties of the connection object from the ConnectionInfo object.

[API-7] AuthInfo authInfo=getAuthInfo(PhysicalConnectionInfo(physicalConnectionInfo);
The getAuthInfo API may be used to extract authorization-related information for the connection—e.g., a document allowing a technician to enter the premises where an endpoint router 132 is housed, and make a physical network link to an endpoint router.

[API-8] RequestStatus modificationStatus=modifyConnection(ConnectionId connectionId, ModificationInfo modificationInfo);
The modifyConnection API may be used to request changes to an existing Connection—e.g., to request more bandwidth.

[API-9] RequestStatus disableStatus=disableConnection (ConnectionId connectionId);
The disableConnection API may be used to request that an existing connection be disabled, i.e., that no traffic be allowed to flow through the physical link previously set up for that connection.

[API-10] RequestStatus enableStatus=enableConnection (ConnectionId connectionId);
The enableConnection API may be used to request that an existing (e.g., currently disabled) connection be enabled.

[API-11] RequestStatus deleteStatus=deleteConnection (ConnectionId connectionId);
The deleteConnection API may be used to request that a connection be removed permanently.

[API-12] LogicalRequestId logicalRequestId=setUpLogicalConnection(ConnectionId connectionId, LogicalConnectionParameters lcParameters);
The setUpLogicalConnection API may be used to request that a logically isolated network path be set up using a previously established physical connection and a set of logical connection properties encapsulated in a LogicalConnectionParameters object.

[API-13] LogicalConnectionId logicalConnectionId=getLogicalConnectionId(LogicalRequestId logicalRequestId);
A client may use the getLogicalConnectionId API to obtain an identifier for a particular logical connection.

[API-14] LogicalConnectionInfo logicalConnectionInfo=getLogicalConnectionInfo(LogicalConnectionId logicalConnectionId);
The getLogicalConnectionInfo API may be used to obtain the properties of the logical connection, including such properties as the VLAN tag being used for the logical connection, and/or other routing-related information associated with the logical connection.

[API-15] LogicalConnectionRequestStatus modificationStatus=modifyLogicalConnection(LogicalConnectionId logicalConnectionId, LogicalConnectionModificationInfo modificationInfo);
The modifyLogicalConnection API may be used to request changes to an existing logical connection—e.g., to modify the set of network prefixes associated with it.

[API-16] LogicalConnectionRequestStatus disableLogicalConnectionStatus=disableLogicalConnection(LogicalConnectionId connectionId);
The disableLogicalConnection API may be used to request that an existing logical connection be disabled, i.e., that no traffic be allowed to flow through the logically-isolated path associated with the logical connection.

[API-17] LogicalConnectionRequestStatus enableLogicalConnectionStatus=enableLogicalConnection(LogicalConnectionId connectionId);
The enableLogicalConnection API may be used to request that an existing (e.g., currently disabled) logical connection be enabled.

[API-18] LogicalConnectionRequestStatus deleteLogicalConnectionStatus=deleteLogicalConnection(LogicalConnectionId connectionId);
The deleteLogicalConnection API may be used to request that a logical connection be removed permanently.

Turning again to FIG. 2, the next high-level step illustrated at 206 is the establishment of a client account, which may be used for example for billing purposes. In some embodiments the interface provided by connectivity coordinator 114 may be used (such as via an invocation of a createNewCustomer API or via a web interface that in turn invokes a similar API) to set up the customer account. In other embodiments the connectivity coordinator 114 may not be involved in account creation directly, and some other mechanism (such as interactions with an account manager component not shown in FIG. 1) may be used to set up customer accounts.

A customer that has an account set up may use the interface implemented by connectivity coordinator 114 to first establish a physical link for the desired dedicated connectivity (entry 211 in FIG. 2), and then establish one or more logically-isolated network paths that use that physical link (entry 221). Finally, the functionality of the dedicated connectivity may be verified or validated (entry 231), e.g., in some embodiments the client and/or the connectivity coordinator 114 may perform one or more verification operations and confirm that the client's request has been satisfactorily implemented. Each of the high-level steps illustrated in entries 211, 221 and 231 of FIG. 2 may involve several interactions and/or operations at the client end and at connectivity provider 114, and further details of each high-level step are provided below.

Example Requests and Responses for Connectivity Establishment

Figure 3:
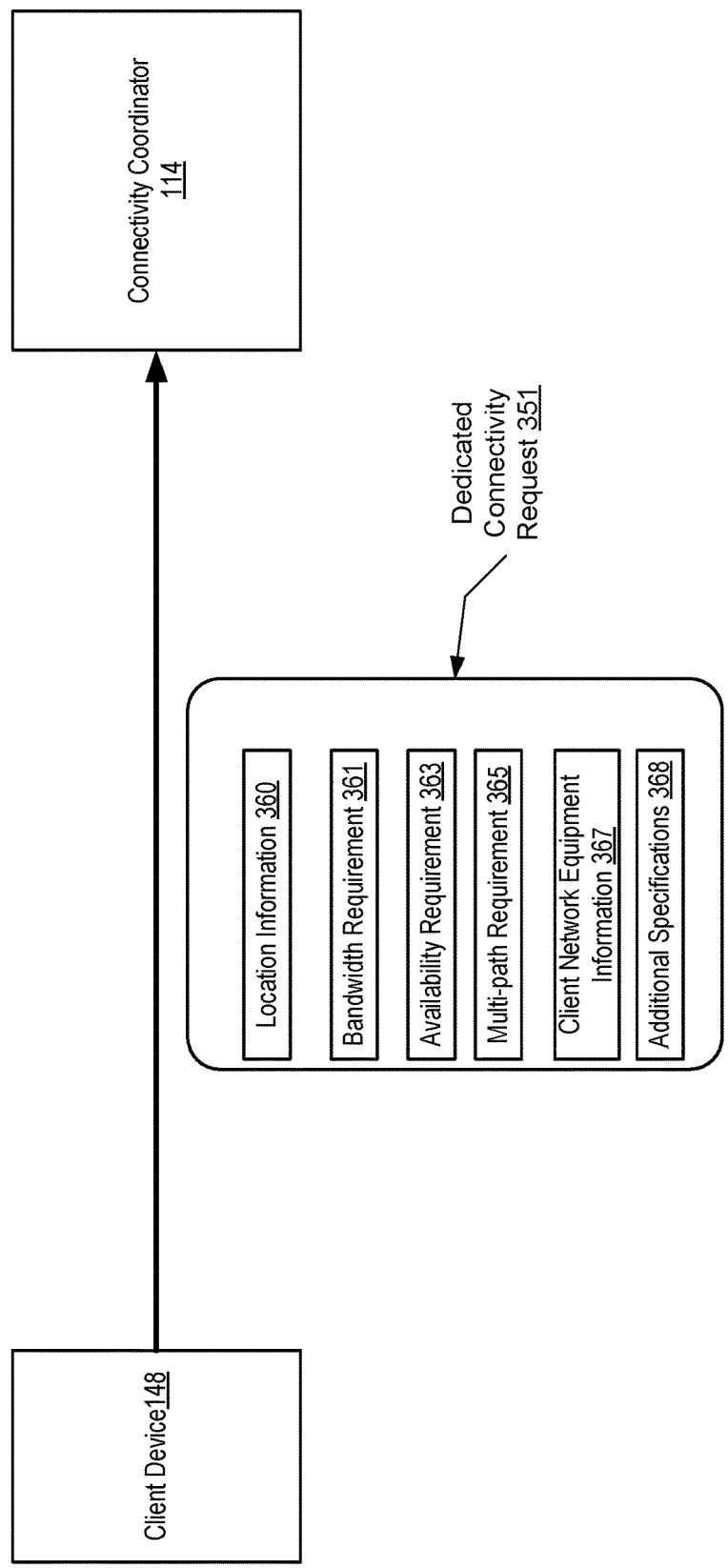
FIG. 3 illustrates an example of constituent elements of a request for dedicated connectivity from a client, according to at least some embodiments.

FIG. 3 illustrates exemplary elements of a request 351 for dedicated connectivity from a client, according to one embodiment. As shown, the request, which may be generated at a client device 148 and may be formatted in accordance with the interface provided for connectivity-related services by connectivity coordinator 114, comprises location information 360, bandwidth requirement 361, availability requirement 363, multi-path requirement 365, client network equipment information 367, and additional specifications 368. Not all these elements may be included in a connectivity request; any combination or subset of these and other elements may be included in the requests in various embodiments. In implementations where an API similar to the requestDirectConnection API described above is used, some or all of the request elements may be provided as fields of a ConnectionSpecification object or its equivalent.

The location information 360 may include details of a physical location at which the dedicated connectivity is desired: for example a street address where a client-side router 142 currently exists or where such a client-side router may need to be set up, e.g., with the help of a third-party network service provider. In some cases the client may simply list one or more cities or even states where portions of the client network 162 are located and request the connectivity coordinator 114 to provide a set of possible sites where a physical connection could be set up to serve the client network.

In some implementations the client may specify a desired bandwidth for the dedicated connectivity via bandwidth requirement 361. The interface provided to the client by connectivity provider may, for example, allow the client to choose among a discrete set of bandwidth choices such as 500 Megabits/second, 1 Gigabit/second or 10 Gigabits/second, where the choices may be derived from the details of the specific networking hardware available for establishing a physical link to an endpoint router 132. For example, at some router co-location facilities, the choices for physical links may include 1 Gbps 1000BASE-LX (1310 nm) single-mode fiber connections over single-mode fiber, and 10 Gbps 10GBASE-LR (1310 nm) single-mode fiber connections over single-mode fiber, and the connectivity coordinator 114 may allow the client to choose between the 1 Gbps option and the 10 Gbps option. In other cases the client may be allowed to request any arbitrary bandwidth and the connectivity coordinator 114 may respond to the request by indicating the bandwidth it is able or willing to provide. In one implementation the connectivity coordinator may not provide any guarantees of bandwidth availability and instead, for example, indicate to the client that a best-effort approach will be used—i.e., the connectivity coordinator will try to provide as much bandwidth (up to the customer's desired limit) as possible. In another implementation, the connectivity coordinator may indicate that more than one physical link may be needed—e.g., if the customer requests 20 Gbps and the maximum bandwidth available over a single cable is 10 Gbps. It may also be possible to set up multiple physical links distributed over different router co-location facilities 132 in response to a single request for dedicated connectivity—e.g., if a particular client has access to client-side routers 142A and 142B at respective facilities 132A and 132B, one or more physical links may be set up at each facility if needed or requested. The interface provided by connectivity coordinator 114 may allow clients to specify whether distinct physical locations should be used to provide the desired connectivity, and if so, how many locations should be used.

The client may in some embodiments also provide an availability requirement 363 and/or a multi-path requirement 365. The availability requirement may be expressible in any of various metrics such as desired maximum network outage limits (e.g., one hour per year maximum outage time) or mean time between outages. A multi-path requirement 365 may indicate the number of physical links that should be set up between a client-side router 142 and an endpoint router 132. Multiple physical links may for example be requested for performance (e.g., so that traffic from the client network 162 may be load-balanced or otherwise distributed over multiple physical paths, thereby reducing network congestion), for higher availability (e.g., by providing multiple paths, an alternate path may be available as a backup path in case of a failure at one of the physical links), or a combination of performance and availability reasons. In addition to specifying how many physical links are needed, a client may also specify the manner in which traffic is to be distributed among them. In a case where two paths are requested, for example, the client may specify whether they should be established in an active/active mode (e.g., where Border Gateway Protocol (BGP) Multipathing is used to balance load across the two links, and in case of a failure, one link takes over the other's traffic), or in active/standby mode where only one of the links is in use at a time, and the second link is activated only in the event of a failure at the first link. Default choices (e.g., active/active) may be indicated via the interface to the client in some implementations, so that the client need not explicitly specify the type of multi-path setup if the client does not wish to do so. In some cases, indicating a multi-path requirement 365 may negate the need for (or contradict) an availability requirement 363, so the client may be allowed to specify only one of these two types of options.

In one embodiment, in order for example to further simplify the tasks that the client may need to do to establish connectivity at their end, or to optimize performance, the connectivity coordinator 114 may also be able to provide configuration instructions, suggestions, and/or preferred settings for the specific type of networking equipment that the client may have. In such an environment, a client may provide client network equipment information 367 to connectivity coordinator 114, which may for example consult a database of configuration data (e.g., database 115) to look up configuration instructions for the equipment, and provide configuration suggestions or instructions to the client. If a client indicates via information 367 that they wish to use a particular type or class of router from a particular vendor (e.g., a Cisco router, a Juniper router, or a Yamaha router), for example, the connectivity coordinator may be able to provide vendor-specific configuration hints for the particular type of router or for a particular version of software running on that particular router. Such hints may include examples of how to configure or verify BGP settings, tunneling-related settings, IKE (Internet Key Exchange) settings, and may also include instructions on how to test that the particular vendor's device is operating effectively. Troubleshooting hints and/or tuning hints such as preferred buffer sizes and the like that may be vendor-specific and/or device-specific may also be provided by connectivity coordinator 114 in some embodiments. Since at least in some environments the provider network 105 may have a large number of clients using a wide variety of networking equipment, the connectivity coordinator 114 may be able to build up a knowledge base covering a wide variety of networking equipment configurations, the kinds of client-side settings that work best with the provider network's own equipment, and so on, which may be very helpful clients that are embarking on the process of linking their client networks 160 to the provider network 105. In some implementations, additional specifications 368 for the desired connectivity may also be included in a client request—e.g., specifications of a desired start time or end time for the dedicated connectivity, or an acknowledgement that a particular BGP version and/or Bidirectional Forwarding Detection (BFD) are supported in the client network 162.

In various embodiments information similar to that shown in FIG. 3 may be communicated in multiple steps to the connectivity coordinator 114—e.g., first location information and desired bandwidth may be communicated, then the connectivity coordinator may provide a response with a list of possible options, and then from among the possible options the client may choose one option and provide additional specifications in subsequent messages. The information may be transmitted to the connectivity coordinator 114 from the client (or from a third party on behalf of the client) using any available network path—for example a path 175 that may include portions of the public internet. Some or all of the interactions between the client and the connectivity coordinator 114 may be encrypted in various embodiments. In some cases where the client does not currently have a client-side router already available at an appropriate router co-location facility 150, further interactions may be required between the client and the connectivity coordinator 114, wherein for example the connectivity coordinator provides suggestions for third-party network service providers that the client may be able to use to obtain access to a suitable router.

Figure 4:
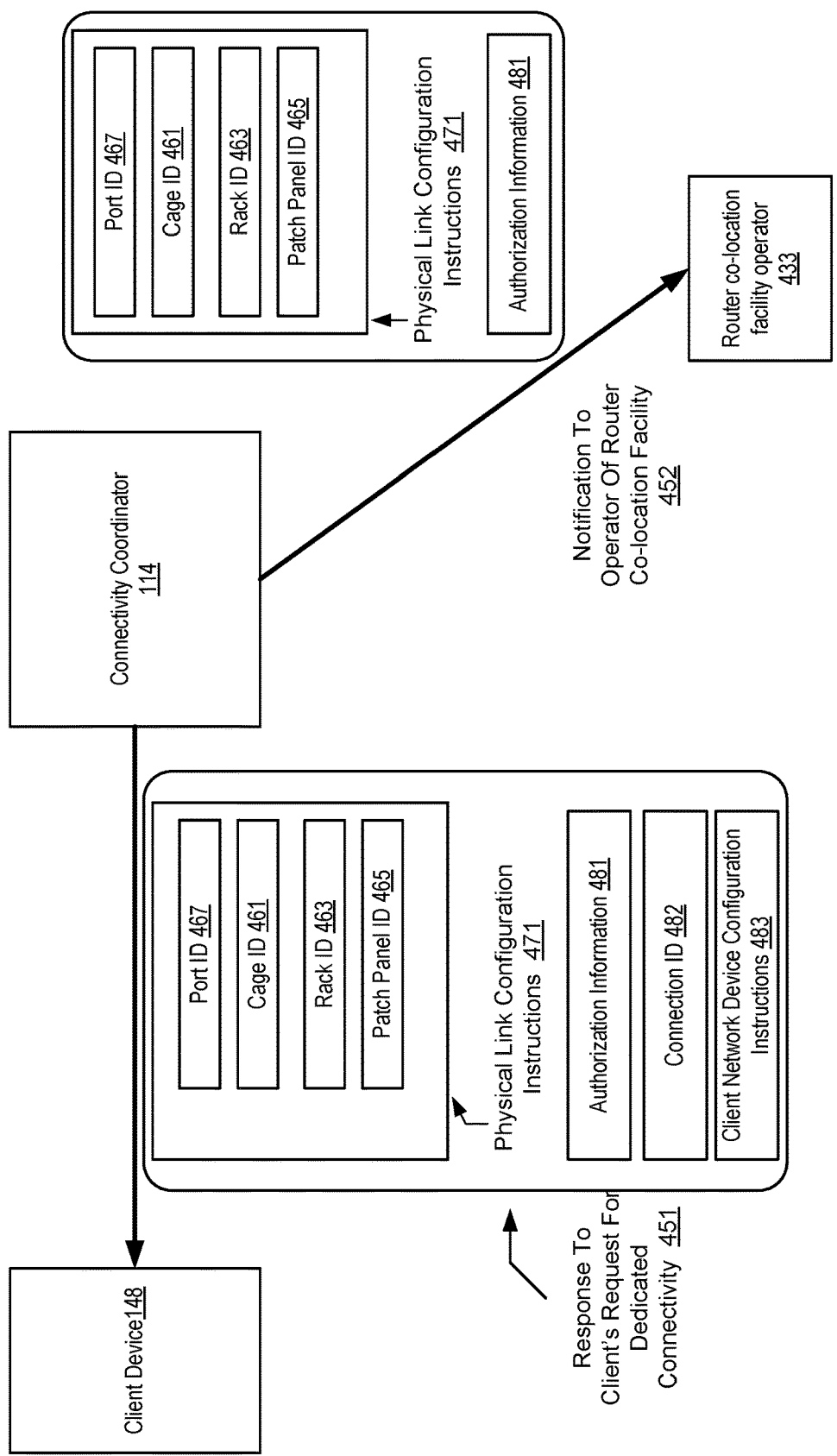
FIG. 4 illustrates an example of constituent elements of a response to a request for dedicated connectivity, according to at least some embodiments.

FIG. 4 illustrates an example of constituent elements of a response that may be generated to a request for dedicated connectivity from a client, according to at least some embodiments. The illustrated example shows the connectivity coordinator 114 sending a response 451 back to the requesting client device 148, and also an optional notification 452 that may be sent to an operator or manager of a router co-location facility 150 in some implementations. Having examined the various parameters or properties of the dedicated connectivity requested by the client as illustrated in FIG. 3, the connectivity coordinator 114 may eventually decide on a particular endpoint router 132 that may be appropriate for a physical link to be set up to the client's network. For example, in FIG. 1, endpoint router 132A at router co-location facility 150A may be chosen to provide physical connectivity to client network 162A. Response 451 may include any combination of physical link configuration instructions 471, authorization information 482, a connection identifier 482, and device-specific configuration instructions 483. The physical link configuration instructions 471 may for example pinpoint the exact physical coordinates where a cable originating from a client-side router such as router 142A is to be attached: an identification 467 of the physical port (e.g., "port 3" or "the third port from the left"), a cage identifier 461, a rack identifier 463, and a patch panel identifier 465.

In many cases networking equipment such as routers 132 and 142 are housed in secure environments where not everyone may have physical access. In such cases, authorization information 481, which may for example comprise a legally-binding agreement to allow a technician to access the endpoint router 132A may be provided to the client. In some environments a document similar to or derived from a commonly-used standard authorization communication format called "LOA-CFA" (Letter Of Authority and Customer Facility Assignment) may be used for authorization information 481. Authorization information 481 may itself include the physical link coordinates such as port identifier 467, cage identifier 461, rack identifier 462, and patch panel identifier 465 in some cases. The response 451 may also include a connection identifier 482 corresponding to the requested dedicated connectivity, which may be used in further communications from the client to the connectivity coordinator 114, such as a request for establishment of logically-isolated paths via the setUpLogicalConnection API described earlier and discussed further in conjunction with the description of FIG. 5 below.

In some embodiments the connectivity coordinator 114 may also provide configuration instructions 483 for client-side network equipment. Such instructions may be provided in cases where client network equipment information 367 was earlier provided to the connectivity coordinator 114, and may also be provided for a default set of devices (e.g., the most commonly used types of routers) even the client did not previously provide details of the client-side equipment in some implementations. Depending on the specifics of the endpoint router 132 selected for the physical connection, different sets of client-side configuration settings may in general be appropriate even for a given piece of client-side networking equipment, and the connectivity coordinator may consult its configuration knowledge base to choose the appropriate instructions after the endpoint router 132 has been selected.

As described earlier, authorization may be required to set up physical connectivity to an endpoint router 132 in some environments. In some embodiments, authorization information 481 may also (or instead) be sent to an operator 433 of the router co-location facility 150 by connectivity coordinator. In some jurisdictions legal constraints may prevent such direct communication between the connectivity coordinator 114 and co-location facility operators 433, in which case the authorization information may, if required, be provided by the client to the operator 433.

In many cases a client may be interested in using resource collections 120 for a variety of different purposes—for example, a software vendor may wish to use one set of resources 112A to set up a development and build environment for its software engineers, another set of resources 112B for an intranet for storing and sharing corporate information internally within the company, and a third set of resources 112C (not shown in FIG. 1) for a web site that may be accessed by the software vendor's customers. Such a client may desire, for example for administrative purposes, accounting/billing purposes, and/or security purposes, that the network traffic for each set of resources 112 be isolated from the traffic for the other sets of resources 112. For example, the software vendor may wish to ensure that the build-related traffic be kept separate from the intranet traffic, that traffic from the build machines or resources 112A may not be permitted to reach one or more intranet servers 112B, and so on. At the same time, such a client may wish to utilize the same dedicated physical connectivity provided via an endpoint router 132 for all these different functions, i.e., the client may wish to establish multiple logically-isolated network paths that all share the same physical link similar to cross-network link 191 established for dedicated connectivity to resource collections 120. In some embodiments, the interface set up by connectivity coordinator 114 may be capable of providing support for various operations related to such logically-isolated paths, such as creating, modifying, deleting, and retrieving or querying the state of the paths.

Figure 5:
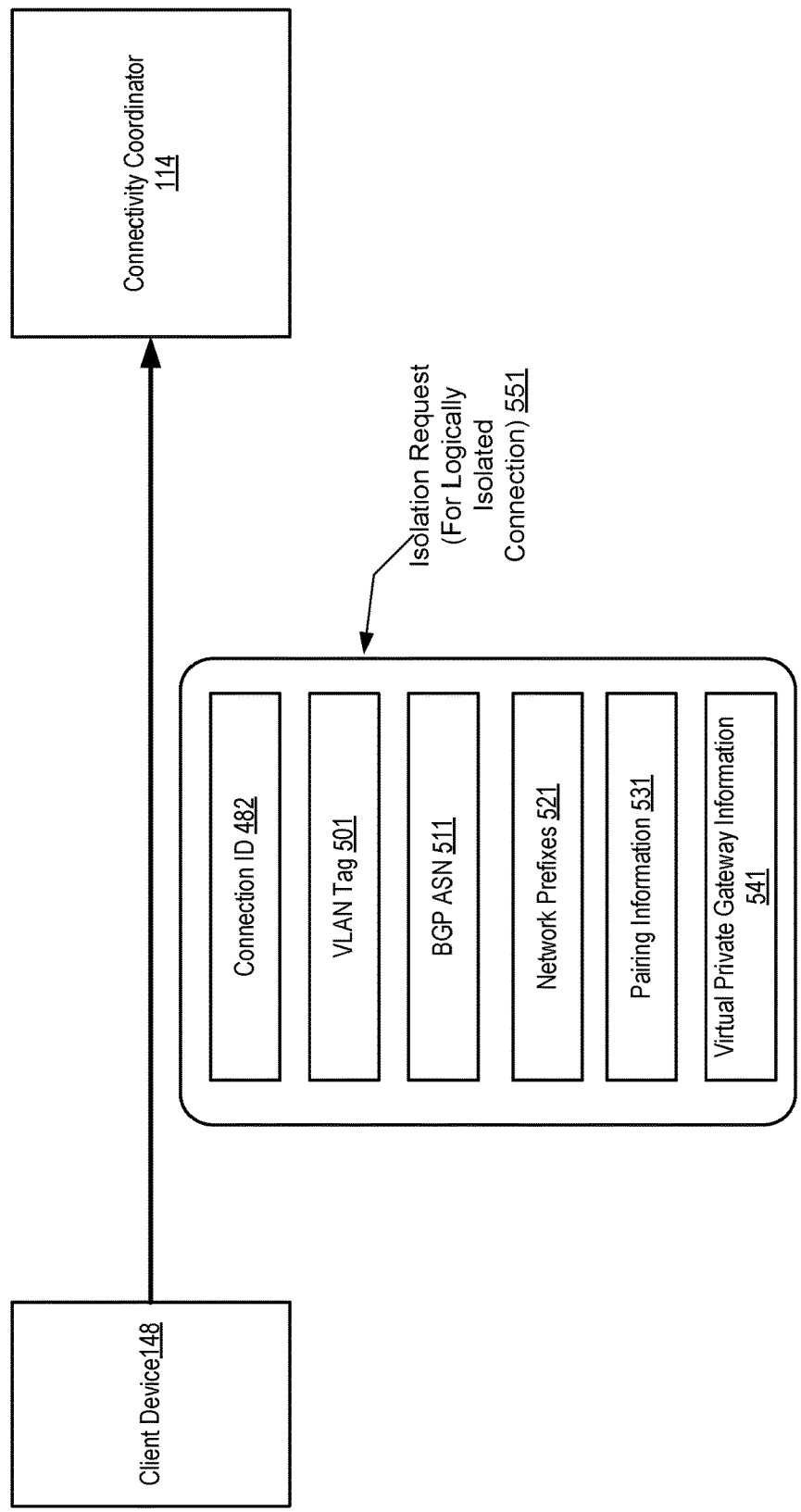
FIG. 5 illustrates an example of constituent elements of a request for a logically-isolated network path, according to at least some embodiments.

FIG. 5 illustrates an example of constituent elements of an isolation request 551 for a logically-isolated network path that may be sent to connectivity coordinator 114, according to at least some embodiments. Prior to making a request for a logically-isolated network path, a client may have established a physical link to obtain dedicated connectivity, as illustrated in high-level step 211 of FIG. 2, and may have obtained a connection identifier 482 during the physical-link establishment process. That connection identifier may be included in the request 551 in the illustrated embodiment. Request 551 may also comprise various selection criteria such as any combination of a VLAN tag 501, a BGP ASN 511, a set of network prefixes 521, pairing information 531, virtual private gateway information 541, and/or other information that may be useful in network isolation in various embodiments.

A Virtual Local Area Network (VLAN) is a method often used for creating multiple logically-isolated networks within a single physical network. A tag or identifier called a VLAN tag may be inserted into the header of each packet being transmitted within a given VLAN environment to enable switches or other network devices to identify the VLAN to which the packet belongs. In one embodiment, connectivity coordinator 114 may require the client to provide a unique VLAN tag 501 for each logically-isolated network path that the client wishes to establish, i.e., a client may not be permitted to use the same VLAN tag for multiple logically-isolated paths. In one implementation the VLAN tag 501 may be required to comply with a standard, such as the Ethernet 802.1q standard.

A client may also be required to provide a BGP Autonomous System Number (ASN) 511. As noted earlier, an Autonomous System (AS) is a collection of connected Internet Protocol (IP) routing prefixes under the control of one or more network operators that presents a common, clearly defined routing policy to the Internet. A unique ASN is typically allocated to each AS for use in BGP routing. ASN 511 may be public (i.e. may be exposed to various routers of the public Internet) or private (exposed only to routers of the provider network 100 and the client network 162), depending on the type of logical connectivity the client wishes to establish in various embodiments. The client may also provide a set of network prefixes 521 to be advertised for the logically isolated network, e.g., in accordance with BGP or another routing protocol. Pairing information 531, indicating for example whether the desired logically-isolated path is to be paired in an active/active or active/standby mode with any other path, may also be included in request 551 in some embodiments. In some implementations the provider network may support establishment of virtual private gateways to support VPN (virtual private network) functionality between a client network 162 and resource collections 120, and request 551 may also include an identification of such a virtual private gateway to be used for the logically-isolated network path. In some embodiments Multiple Protocol Label Switching (MPLS) techniques may be used to implement logical network isolation. While the exemplary elements illustrated in FIG. 5 may be applicable in environments where BGP and related protocols are in use, in other embodiments other network isolation mechanisms (e.g. any other techniques usable for connecting to virtual private clouds or VPNs) may be supplied by the client and used by connectivity provider for logical network isolation. In the example setUpLogicalConnection API call described earlier, some or all of the various elements of request 551 may be included for example in fields of the LogicalConnectionParameters object passed as a parameter.

Figure 6:
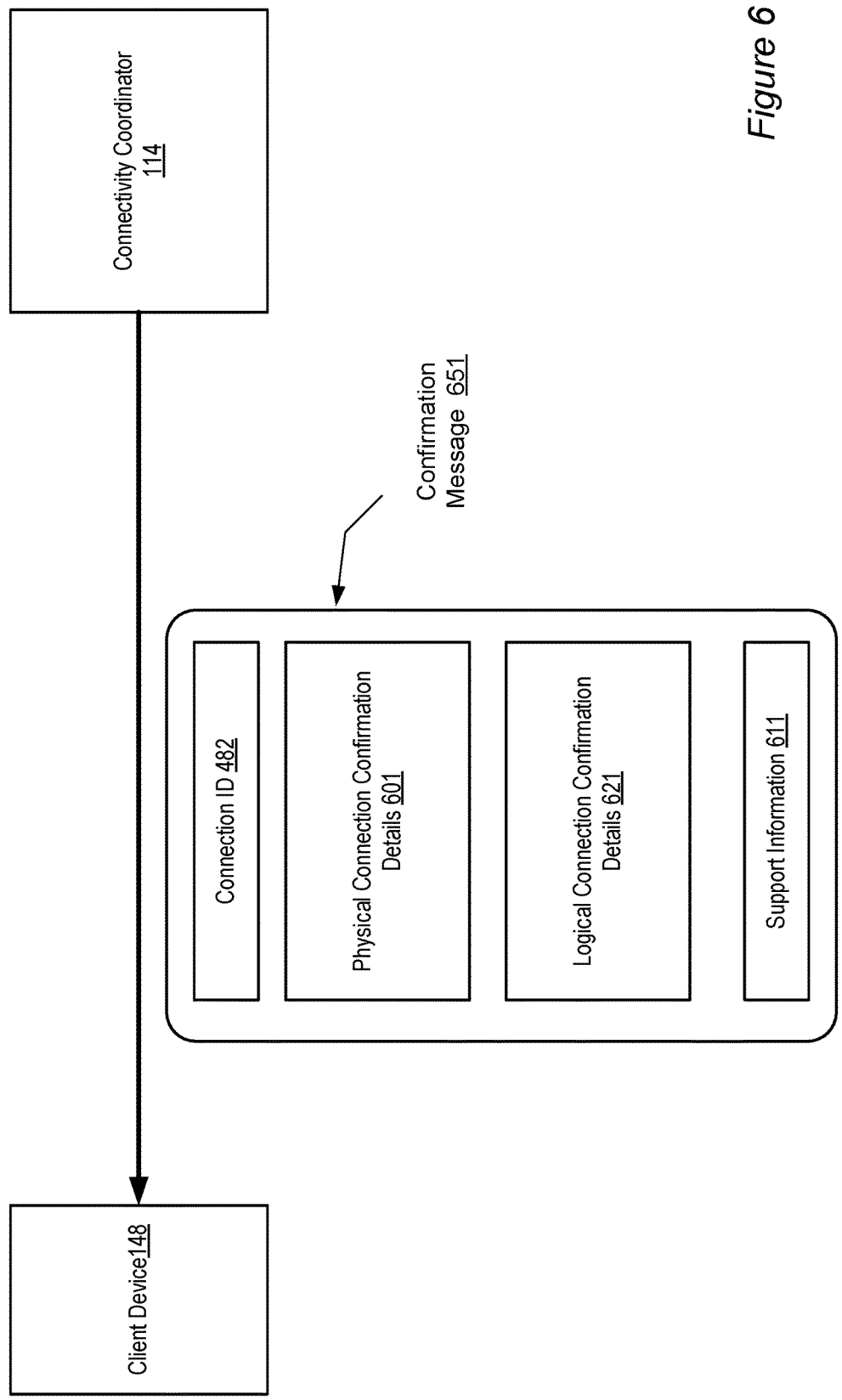
FIG. 6 illustrates an example of contents of a confirmation message indicating that requested connectivity has been established, according to at least some embodiments.

In one embodiment, after receiving the request 551 for establishing a logically-isolated network path, connectivity coordinator 114 may perform a set of operations, such as updating connectivity database 115, propagating appropriate routing information to various routers of provider network 105, refreshing various routing-related caches, and the like, to complete the requested configuration. After establishing the logically-isolated network path successfully, in some embodiments the connectivity coordinator 114 may send a confirmation message back to the client indicating that the requested dedicated connectivity and/or logical isolation has been successfully provisioned. FIG. 6 illustrates an example of contents of such a confirmation message 651 indicating that requested connectivity has been established, according to at least some embodiments. In the illustrated example the physical connection confirmation details 601 may confirm some of the information related to the physical link established at the request of the client, such as port identifier 467, rack identifier 463, available bandwidth, etc. Logical connection confirmation details 621 may confirm properties of the logically-isolated network paths, such as VLAN tag 501, BGP ASN 511, network prefixes 521, pairing information 531, and virtual private gateway information 541. In the illustrated example confirmation message 651 also includes the connection identifier 482 and support information 611—e.g., information that the client may use to obtain help in case of a traffic interruption, poor performance, or other issue that may arise. Confirmation messages 651 may exclude any combination of the elements shown in FIG. 6 in different embodiments, and may include additional information in some embodiments. In one embodiment multiple confirmation messages may be sent by connectivity coordinator 114—e.g., a first confirmation message may be sent after the physical link is established, and a second confirmation message may be sent after the logically-isolated network path has been established. Connectivity coordinator 114 may also send instructions to the client to verify or validate that the desired connectivity is functioning correctly at the client end—e.g., in en embodiment where resources 112 include virtual compute servers with associated public and/or private IP addresses, such instructions may direct the client to start up a virtual compute server and ping one of its IP addresses.

Example of Logically-Isolated Network Paths Over Shared Physical Link

Figure 7:
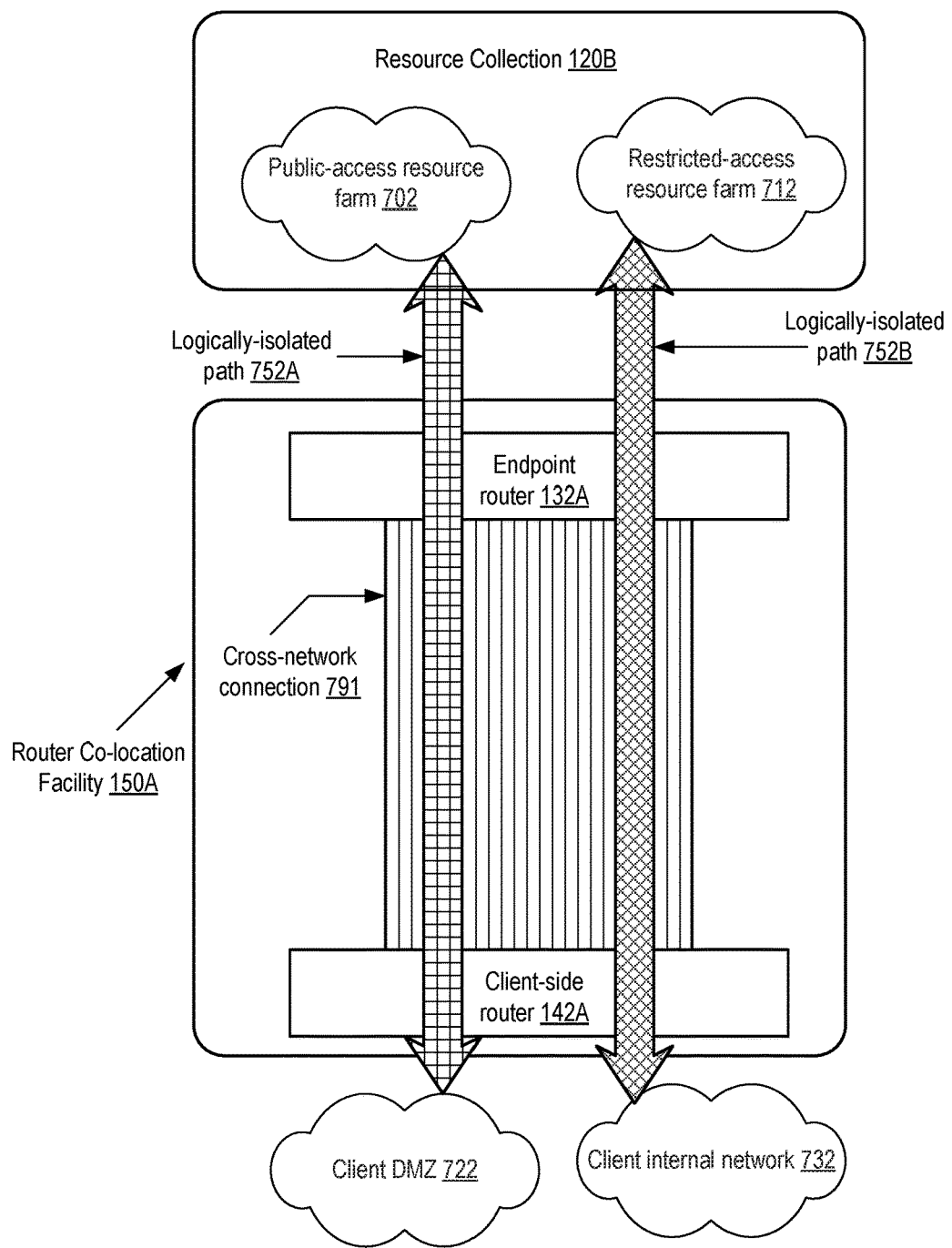
FIG. 7 illustrates an example of two logically-isolated network paths sharing a physical link established using an interface provided by a connectivity coordinator, according to at least some embodiments.

FIG. 7 illustrates an example of two logically-isolated network paths 752A and 752B sharing a single dedicated physical link such as a cross-network connection established using an interface provided by connectivity coordinator 114, according to at least some embodiments. In the environment shown in FIG. 2, the client requires connectivity to be established and maintained between internal network 732 and a restricted-access resource farm 712. At the same time the client has set up a de-militarized network zone (DMZ) 722 (which may also be termed a perimeter network)—a sub-network of client network 162A that may expose some of the client's services to the public or untrusted Internet via public-access resource farm 702 within provider network 105's data centers. To ensure that the traffic for both the restricted-access resource farm 712 and the public-access resource farm 702 meets desired performance, security and cost requirements, the client may first use the interface provided by connectivity coordinator 114 to establish a cross-network connection 791 between client-side router 142A and endpoint router 132A, using for example the steps described in FIG. 2. The client may further use other components of the interface to establish two logically-isolated network paths that share the cross-network connection 791: path 752A for traffic between DMZ 722 and the public-access resource farm 702, and path 752B for traffic between the client's internal network 732 and restricted-access resource farm 712.

In some embodiments multiple dedicated physical links such as cross-network connections 791 or 191 may be set up on behalf of a single customer, either within one router co-location facility 150 or across multiple router co-location facilities. For example, a multinational corporation may have office facilities in several different countries, which may all benefit from dedicated connectivity to a set of resource collections 120; in such as a case, one or more dedicated physical links may be set up for respective geographically separated office locations. A single physical link may be shared across numerous logically-isolated paths such as paths 752 of FIG. 7. Furthermore, a given resource collection such as a resource farm 702 or 712 may be accessible via a plurality of logically-isolated paths 752, where some of the logically-isolated paths 752 may use different dedicated physical links 791.

Example of Web-based Interface

FIG. 8 is an illustration of a portion of an exemplary web-based interface that may be provided by connectivity coordinator 114 in some embodiments. As noted earlier, the interface implemented by connectivity coordinator 114 to provide connectivity services may be exposed to clients as a set of web pages in some embodiments. Web page 800 of FIG. 8 is a representation of an example of one such web page that includes several form fields that a client may fill out to provide details about desired dedicated connectivity requirements. In some implementations the submission of form data via an interface like web page 800 may result in an invocation of one or more API calls similar to those listed earlier in conjunction with the description of element 201 of FIG. 2.

In area 803 of web page 800, a friendly greeting and overview message may be provided. Form fields 805 may be provided to allow the client to specify a physical location where the dedicated connectivity is desired. Using form field 807, the client may specify desired bandwidth, for which a default value of 1 Gbps is shown pre-selected in FIG. 8. Form fields 809 may be used to provide optional pairing or multi-path information; as shown, a default of two connections in active/active mode is pre-selected. For fields 811 may allow the client to specify a vendor name and model for a client router to be used for a dedicated physical link. Form field 813 may allow the client to identify a network service provider that may also be involved in setting up the dedicated connectivity—for example, an operator of the router co-location facility that may be used. In some embodiments, when the client fills in the address information in form fields 805, the connectivity coordinator 114 may automatically fill out the network service provider form field 813, or may populate a set of drop-down options from which the client may select a preferred provider via form field 813. The client may submit the completed form using submit button 815 in the illustrated example. In some implementations employing a web page interface, several different web pages may be employed during the process of establishing the desired physical and logical connectivity. As the client fills out one form entry, the connectivity coordinator may be able to customize or narrow the set of options available for subsequent form entries.

Figure 9:
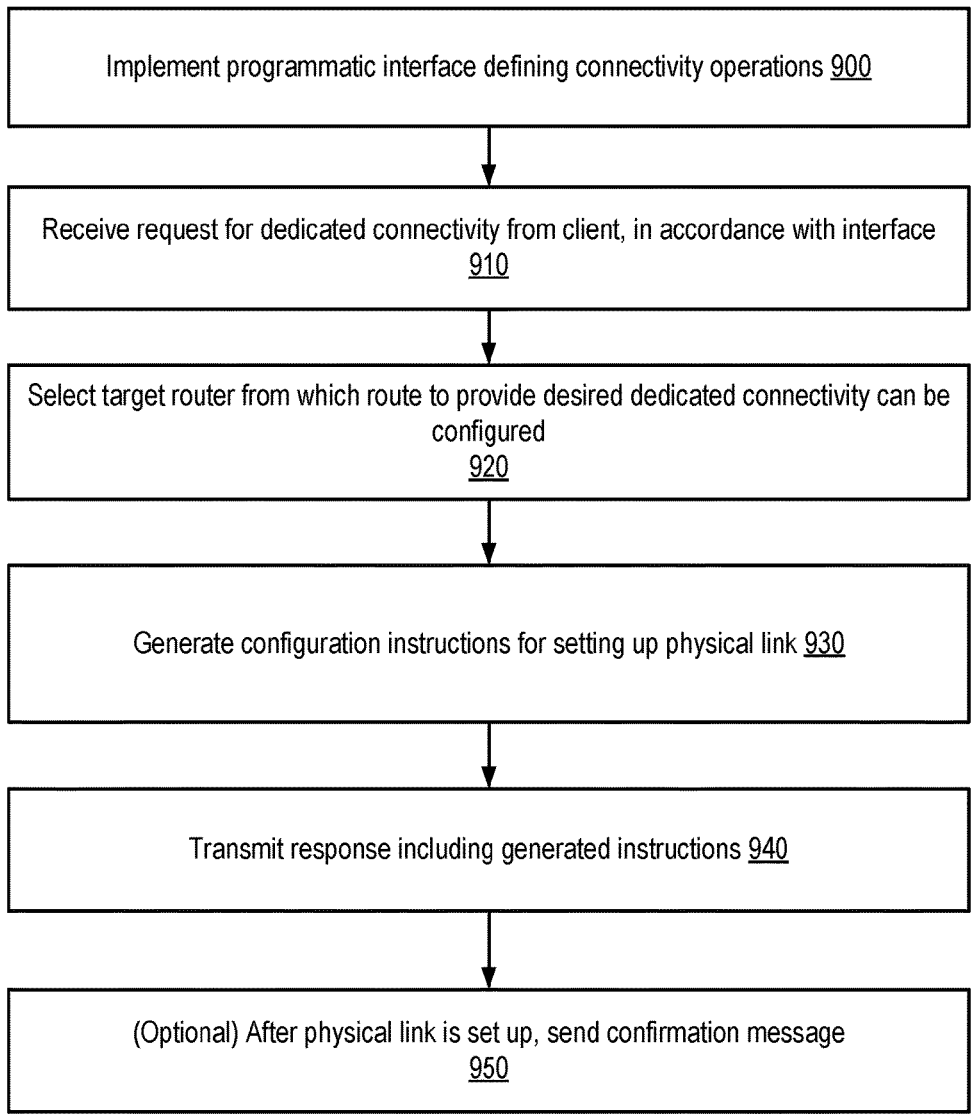
FIG. 9 is a flowchart of a method for providing connectivity-related services, according to at least some embodiments.

FIG. 9 is a flowchart of a method for providing connectivity-related services, according to at least some embodiments. As shown in element 900 in the flowchart, an interface that defines a set of connectivity operations may be implemented, for example by a connectivity coordinator 114. The connectivity operations provided via the interface may include services to set up, query, modify, disable and tear down various types of physical and logical connections in various embodiments. The interface may comprise any combination of a set of APIs, a web-based or standalone GUI, command-line tools, and the like.

A request for dedicated connectivity may be received in accordance with the interface, as shown in element 910. For example, in an environment where the interface is web-based, the request may comprise one or more HTTP or HTTPS requests, while in a different embodiment, the request may comprise one or more method calls from a program coded and executed on behalf of the client. The request may comprise an enumeration of several details that may be needed to make a decision as to where and how the dedicated connectivity may be provided, and which business entities such as third-party network service providers or network data center operators may need to be involved. For example, the request may specify a desired physical address at which a client-side router 142 is available for use, a desired bandwidth, and various other requirements.

On receiving the request, a target endpoint router 132 of a provider network 105 may be selected, through which a route to provide the desired dedicated connectivity to the client may be configurable, as shown in element 920 of FIG. 9. The target endpoint router may be selected based on any of a variety of factors in different embodiments, including physical location, measured and/or expected bandwidth utilization levels, costs, previous positive or negative experiences with the operator of the facility where the router is located, compatibility with the client's networking equipment and the like.

A set of configuration information and instructions may then be generated for setting up a physical link to the target endpoint router, as shown in element 930, and a response may then be transmitted (element 940). In some embodiments the response may be submitted only to the requesting client, while in other embodiments a response may be submitted to an operator of a router co-location facility 150 where the physical link is to be established, or responses may be submitted to both the requesting client and the facility operator. The response may include data identifying the particular physical port, cage, rack, and/or patch panel where a physical cable may be attached in some implementations. Authorization information, e.g., granting permission to a technician to access the endpoint router may be included in the response, or may be made accessible via the response.

In one implementation, after the physical link is established, a confirmation message indicating that the desired connectivity has been established successfully may be transmitted to the client (element 950 of FIG. 9). In other implementations, a confirmation message may be generated after one or more logically-isolated network paths have been established using the newly established physical link.

Figure 10:
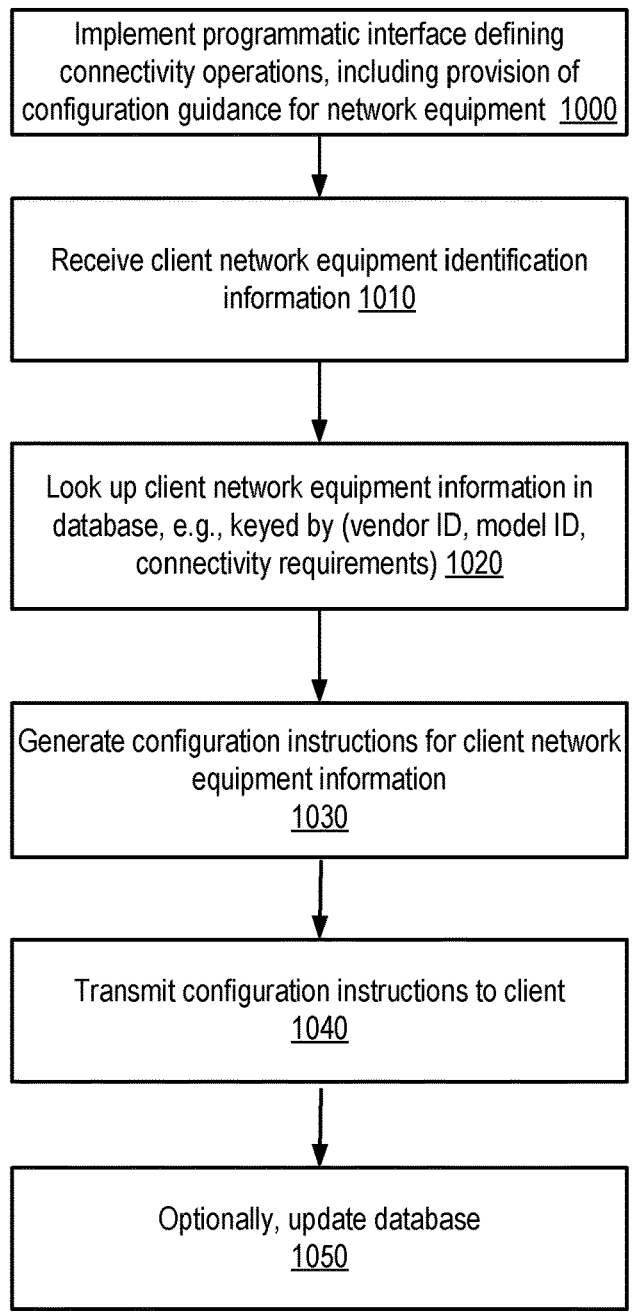
FIG. 10 is a flowchart of a method for providing connectivity-related services including guidance on configuring a client network device, according to at least some embodiments.

FIG. 10 is a flowchart of a method for providing connectivity-related services including guidance on configuring a client network device, according to at least some embodiments. An interface that allows a client to make a variety of connectivity-related requests, including requests for assistance in configuring one or more network devices that may be used to establish dedicated connectivity with a provider network, may be implemented as shown in element 1000. A request that provides an identification of networking equipment (e.g., any combination of a vendor name, a model name, and a software version identifier for software running on the networking equipment) available for use by the client may be received (element 1010) in accordance with the interface. Such a request may also include other details of the connectivity requested by the client, such as a desired bandwidth, availability/redundancy requirements, and the like.

In response to the request, in some implementations a connectivity coordinator 114 may query a database of configuration information, for example using a combination of vendor name, model name, software version and/or connectivity requirements (element 1020). If appropriate configuration guidance is found, e.g., based on the identification information provided in the request, a response containing the configuration information or instructions may be generated (element 1030) and transmitted to the requesting client (element 1040). In some implementations, the database of configuration information may include an inventory of where (i.e., by which clients) different types of networking equipment are being used; in such a case, a record indicating that the requesting client uses the specified equipment may be inserted into the database (element 1050). In some environments additional information on experiences with different types of networking equipment, such as surveys of client satisfaction with their networking equipment, mean times to failure, availability data, and the like may also be maintained in a knowledge base by connectivity coordinator 114, and some or all of this additional information may also be made available via the interface.

Interactions with Last-mile Connectivity Providers

Figure 11:
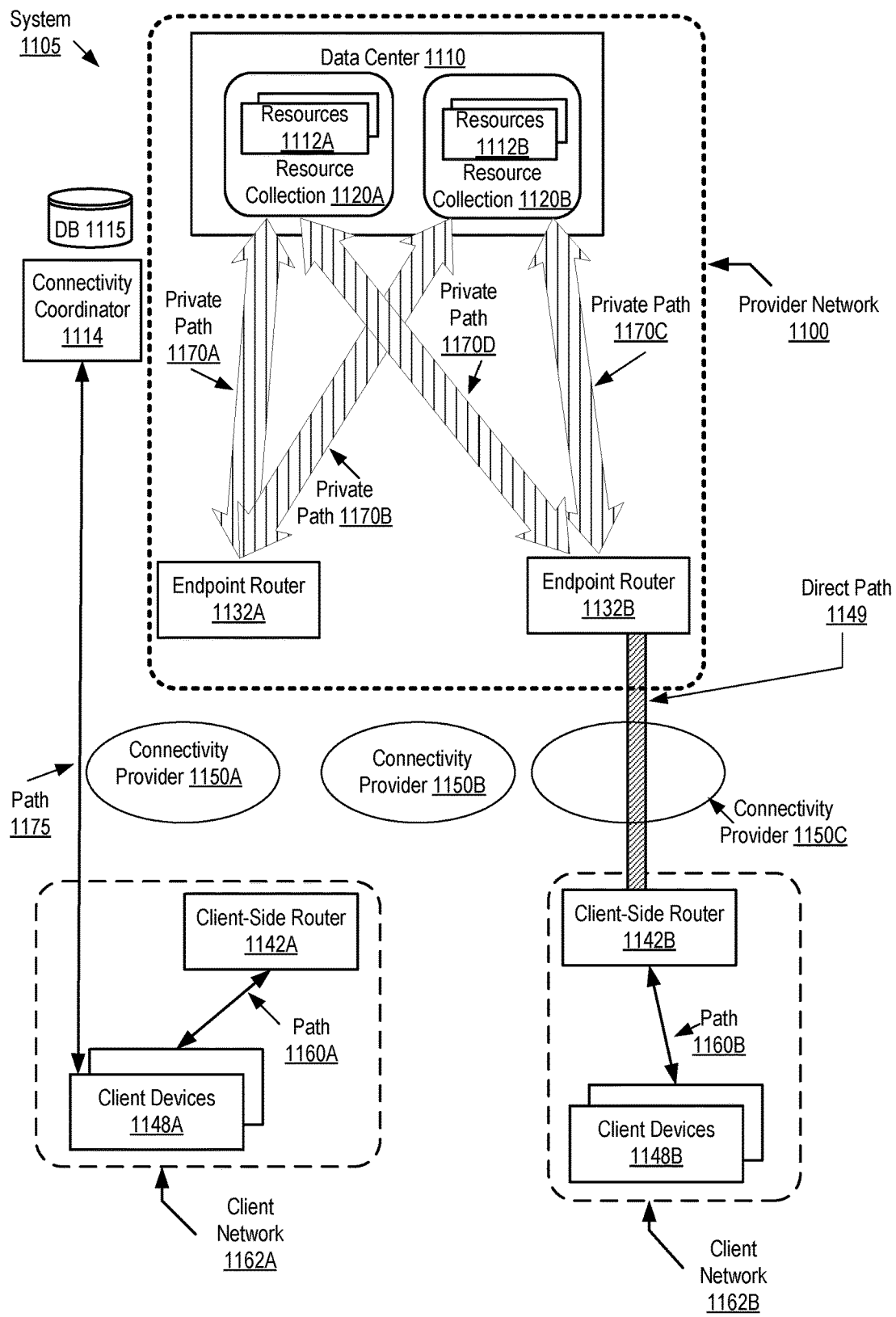
FIG. 11 illustrates an example of a system including a provider network to which connectivity may be provided from client networks via "last-mile" connectivity providers, according to at least some embodiments.

FIG. 11 illustrates an example of a system 1105 including a provider network 1100 to which connectivity may be provided from client networks such as 1162A and 1162B through "last-mile" connectivity providers (e.g., 1150A, 1150B, and 1150C), according to at least some embodiments. In many environments, client devices such as 1148A and 1148B may be provisioned within networks (e.g., 1162A and 1162B) that may not have private paths available from their client-side routers 1142 to router co-location facilities (similar to facilities 150 of FIG. 1) where endpoint routers such as 1132A and 1132B may be located. This may be especially likely in the case of relatively small client businesses, or when client business premises are located in areas that are somewhat remote from router co-location centers. Such client networks 1162 may have access via shared network paths (e.g., the portions of the public Internet, including for example portions of path 1175) to various resource collections 1120 of the provider network 1100, but the operators of the client networks may wish to avail themselves of the advantages of dedicated paths to the resource collections. Various third party connectivity providers 1150 (i.e., business entities other than the provider network's operator) may be capable of providing the dedicated paths to the endpoint routers 1132—for example, in FIG. 11, connectivity provider 1150C is shown providing a dedicated or direct path 1149 between endpoint router 1132B and client network 1162B. Such connectivity providers may help clients to bridge the gap between the client networks 1162 and the private paths 1170 (e.g., paths 1170A, 1170B, 1170C and 1170D, similar to paths 170 of FIG. 1) available between the endpoint routers 1132 and the resource collections 1120. These third party connectivity providers may be referred to as "last-mile" connectivity providers (or "last-kilometer" connectivity providers in environments where metric distance units are more popular), as they are often responsible for implementing physical network connectivity closest to the client premises, and therefore furthest from the premises of major network infrastructure providers. In this document, last-mile connectivity providers may also be referred to using the abbreviation "LMCP".

Identifying which, if any, last-mile connectivity providers may be available and willing to link a client's network to the provider network 1100 may often be cumbersome from a client's perspective. In some cases, a number of LMCPs may operate in the vicinity of the client's premises, but only a subset may be supported or preferred by the operator of provider network 1100. In the embodiment illustrated in FIG. 11, connectivity coordinator 1114 may be operable to implement an interface defining a variety of connectivity-related services, which may allow clients to easily determine which LMCPs 1150 can be used to connect to provider network 1100. Such an interface may further allow the clients to establish desired dedicated connectivity (e.g., over a direct path 1149) to resource collections 1120 with the help of selected last-mile connectivity providers. Connectivity coordinator 1114 may implement one or more databases 1115 to store connectivity-related information, including for example a directory of last-mile connectivity providers 1150 and their offerings. The interface may be published or made available to clients by connectivity coordinator 1114 using any appropriate technique, such as one or more email messages to all the clients of the provider network 1100, establishing a web site or web page with the details of the interface, and so on. The interface itself may, for example, be programmatic, and may comprise any combination of a collection of APIs, one or more web pages, command-line tools, an installable graphical user interface, or the like. Connectivity coordinator 1114 may itself be resident outside provider network 1100 in some embodiments, and in other embodiments it may be incorporated within the provider network 1100.

Using the interface, e.g., from one of the client devices 1142A, a client may submit a request for dedicated connectivity, e.g., over a path 1175 that may include links of the public Internet. The request may, for example, include the physical address or addresses at which the client desires dedicated connectivity. In response to the request, the connectivity coordinator may be operable to identify one or more LMCPs 1150 that may be available to establish dedicated connections between the provider network 1100 and the requesting client's network (e.g., 1162A), and generate and transmit a response that lists the selected LMCP or LMCPs. The selected LMCP may operate or manage one or more routers that happen to be co-located with one of the endpoint routers 1132 of the provider network 1100, or may have the ability to set up such routers if they are not already available. In some embodiments the connectivity coordinator 1114 may allow the client to select one LMCP from among a set of available LMCPs, while in other embodiments the connectivity coordinator 1114 may determine the specific LMCP or LMCPS that should be used, and inform the client of the determination. Later, after the dedicated connectivity has been set up, for example via steps similar to those outlined in FIG. 2, the connectivity coordinator 1114 may in some embodiments provide a confirmation to the client indicating that the desired connectivity has been verified. The interface may be used for communication between the client and the connectivity coordinator 1114 during any of the stages of dedicated connectivity establishment and use—e.g., a client may query the state of a requested connection or an established connection using the interface, and may request various connectivity modifications, disabling and enabling of connectivity, and the like. Responses to the client requests may also be formatted in accordance with the interface.

The connectivity coordinator 1114 may, for example, look up LMCP information in database 1115 to respond to the initial request for dedicated connectivity. In cases where multiple LMCPs 1150 are available, the connectivity coordinator 1114 may in some implementations provide an unordered enumeration of all available LMCPs to the client. In other implementations the available LMCPs may be sorted according to any of a variety of criteria based on details of the client's request and on the connectivity coordinator's LMCP knowledge base. For example, if the connectivity provider 1114 is aware of service quality rankings or ratings of the various LMCPs, it may sort the LMCPS from highest to lowest quality. If the connectivity provider 1114 has pricing information available for the different LMCPs it may rank them according to price, and so on. Connectivity coordinator 1114 may in some implementations periodically query clients for quality rankings or ratings of different LMCPs and store the results of such surveys in its database 1115, or it may monitor outages or support requests to establish its own quality rankings. In one implementation in which clients may specify desired connectivity establishment times (e.g., the logical equivalent of "I need this connectivity by Aug. 1, 2011 at 8 AM EST"), the connectivity coordinator may be able to eliminate some LMCPs from the list of available LMCPs based on how quickly the LMCPs have been known to establish connectivity in the past. In some embodiments the interface supported by the connectivity coordinator 1114 may allow clients to query its knowledge base of LMCPs. In addition to the paths illustrated in FIG. 11, in many environments there may be several other alternative network paths available between the client networks 1162 and various components of the system 1105—for example, the connectivity requests may be transmitted to the connectivity provider 1114 over a path that includes public or shared links, and various services provided at resource collections 1120 may be accessed over public or shared links as well.

LMCP-related Communications with the Connectivity Coordinator

Figure 12:
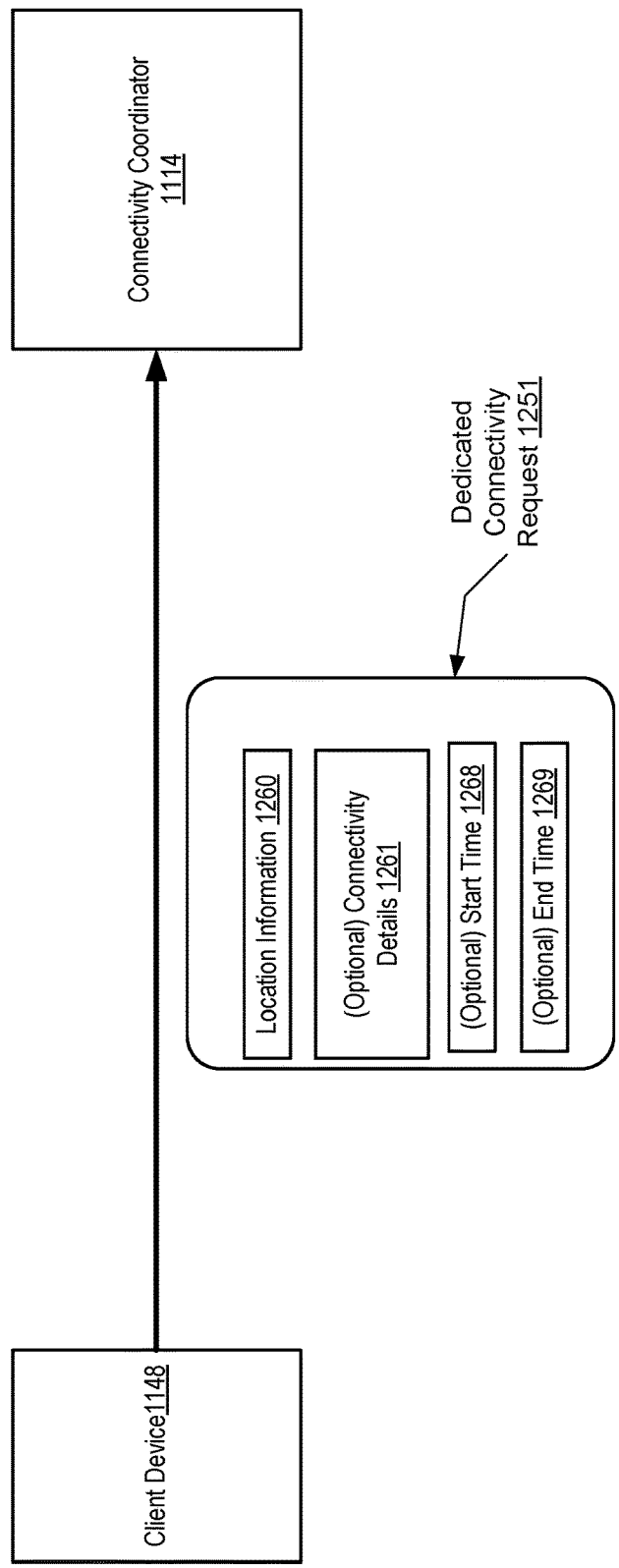
FIG. 12 illustrates an example of constituent elements of a request for dedicated connectivity through a connectivity provider, according to at least some embodiments.

FIG. 12 illustrates an example of constituent elements of an initial request 1251 for dedicated connectivity through a connectivity provider 1150, according to at least some embodiments. As shown the request comprises location information 1260 for the client network 1162, and optional connectivity details 1261, an optional start time 1268, and an optional end time 1269. The connectivity coordinator 1114 may use location information 1260 as the primary criterion for querying its LMCP database to identify available LMCPs. Optional connectivity details 1261 may include requirements similar to those shown in FIG. 3, for example, bandwidth requirement 361, availability requirement 363, and/or multi-path requirement 365. In some embodiments the client may also specify a desired start time 1268 and/or a desired end time 1269—for example, indicating that the dedicated connectivity is only going to be needed for 3 months starting on Jan. 1, 2011. In some cases the start and end times may indicate that the client only desires to use the dedicated connectivity part of the time—e.g., the start time and end time may be specified as "8 AM-8 PM, Monday through Friday". In some implementations where desired start times 1268 are indicated by the client, end times 1269 may not be required. Timing requests comprising desired start and/or end times may be sent separately from the initial request 1251 in some embodiments.

Figure 13:
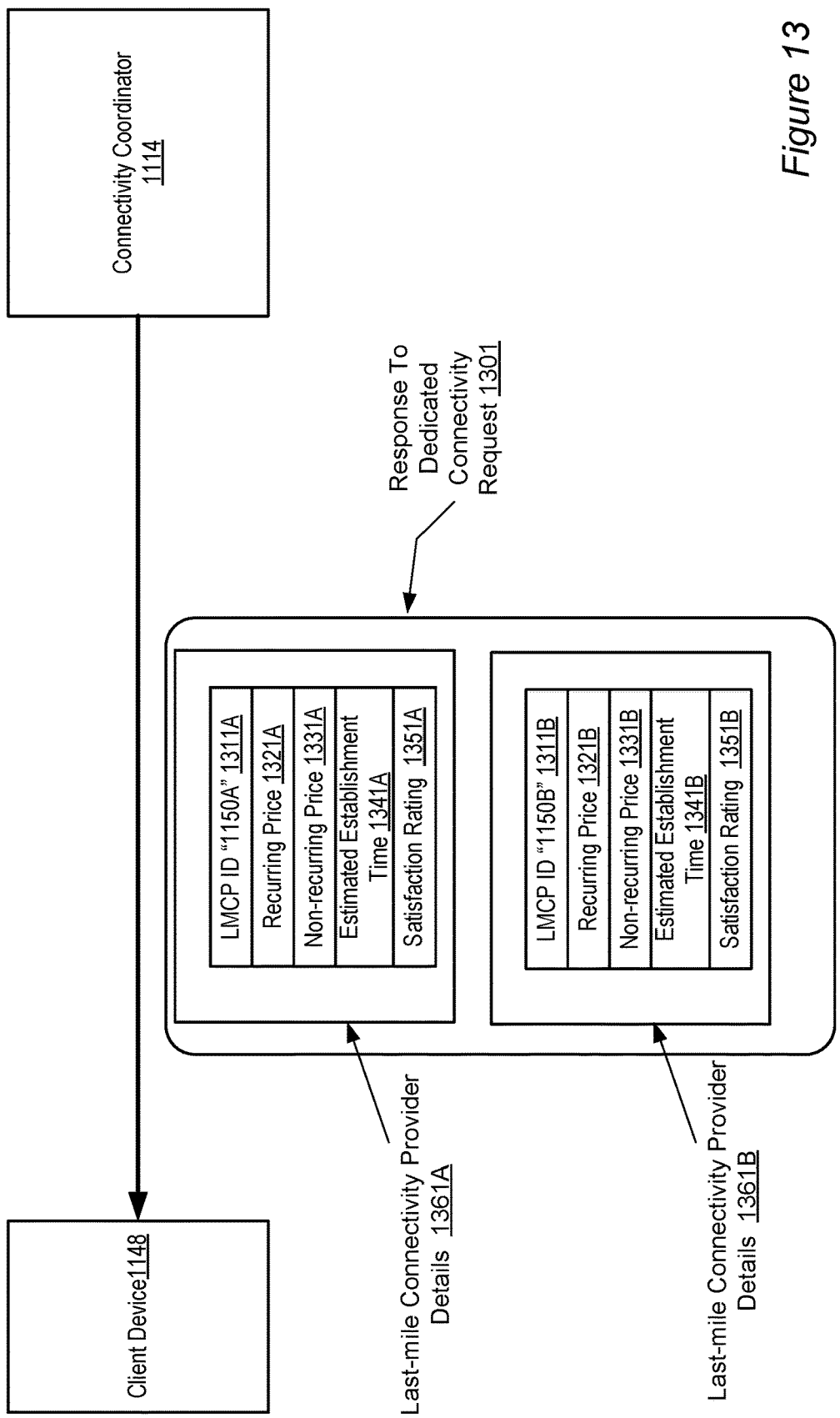
FIG. 13 illustrates an example of constituent elements of a response to a dedicated connectivity request that includes information on available connectivity providers, according to at least some embodiments.

FIG. 13 illustrates an example of constituent elements of a response 1301 to a dedicated connectivity request that includes information on available connectivity providers 1150, according to at least some embodiments. The response 1301 may comprise a list of one or more LMCP details records 1361, e.g., 1361A and 1361B, that the connectivity coordinator 1114 may have found to meet the request 1251 from the client. Different types of information regarding the available LMCPs may be provided to the client in various embodiments. For example, LMCP details record 1361A may comprise an identification (e.g., name and contact information) 1311A of the LMCP 1150A, pricing information in fields 1321A and 1321B, estimated connectivity establishment time 1341A, and/or a satisfaction rating 1351A. Pricing information may be split into a recurring price component 1321A (e.g., "X dollars per month, independent of the actual usage") and a non-recurring price component 1331A (e.g., based on measured bandwidth usage by the client). In some implementations the pricing information may be broken down further into components that are to be paid to the LMCP 1150A directly by the client, and components that are to be paid to the operator of provider network 1100. The interface supported by coordinator 1114 may allow clients to submit pricing-related queries as separate requests in some implementations. The earliest time at which the LMCP 1150A and/or the provider network 1100 operator may be able to establish the desired dedicated connectivity may be indicated via field 1341A. In some cases a satisfaction rating 1351A (e.g., based on surveys of the clients of the LMCP 1150A) may be included, which may be helpful to the client in selecting among available LMCPs. Details record 1361B may include similar fields as record 1361A for a different LMCP, e.g., for LMCP 1150B.

Figure 14:
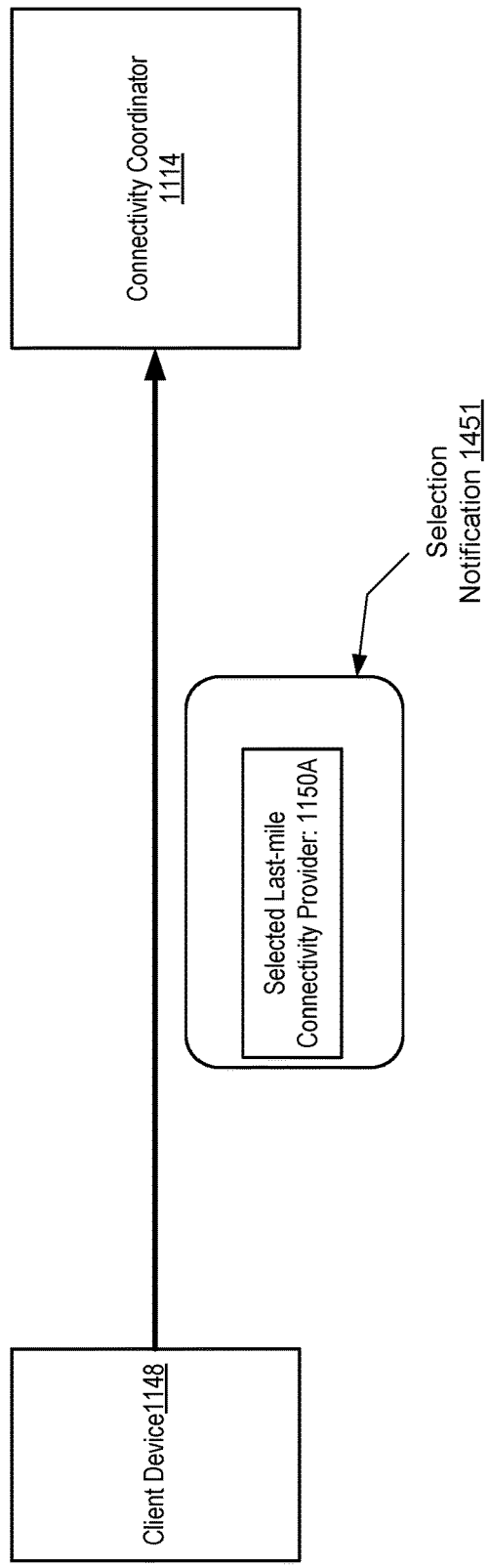
FIG. 14 illustrates an example communication from a client identifying a selected connectivity provider, according to at least some embodiments.
Figure 15:
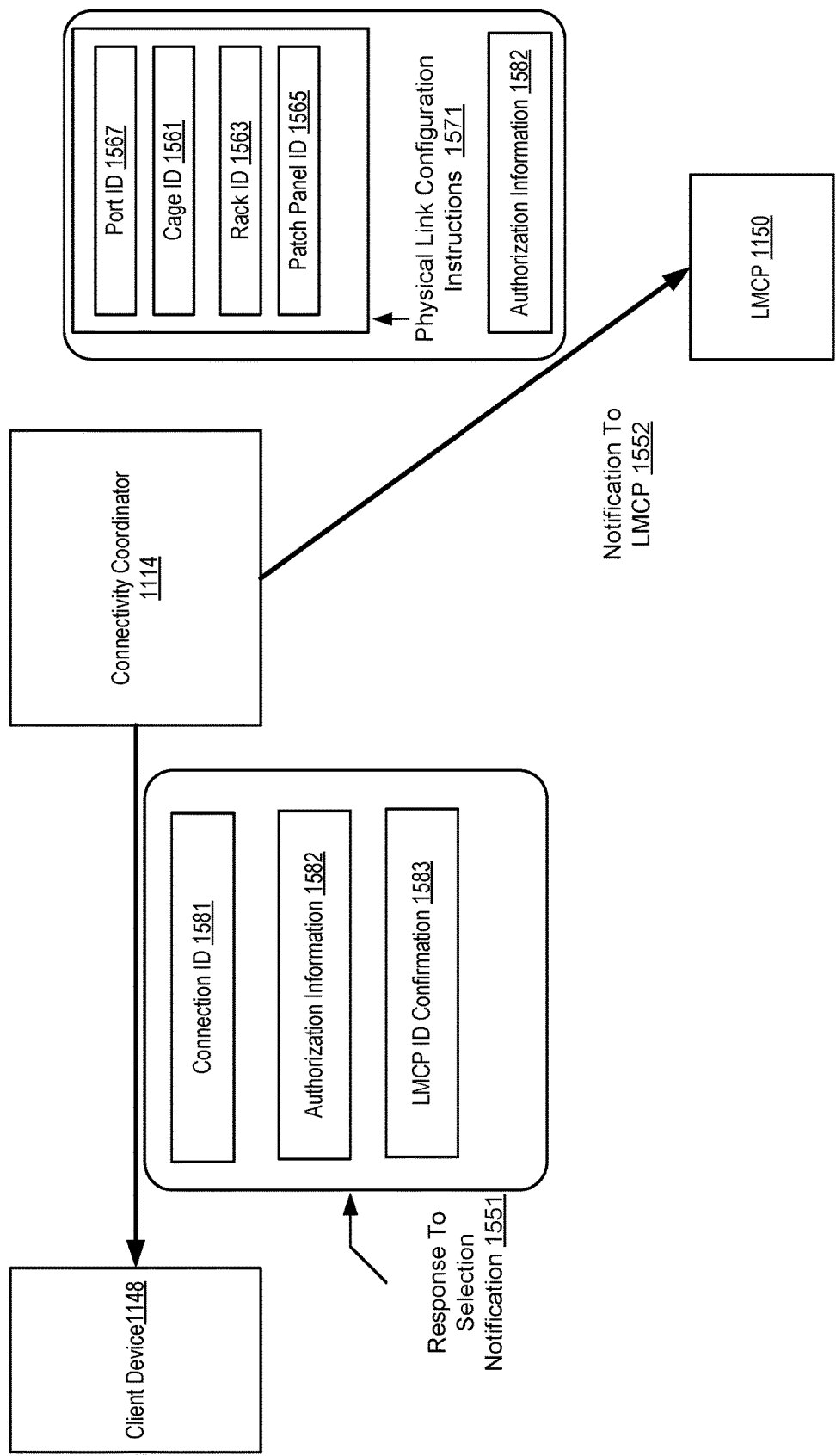
FIG. 15 illustrates example communications from a connectivity coordinator to a connectivity provider and a client after the client has selected the connectivity provider, according to one embodiment.

FIG. 14 illustrates an example communication from a client identifying a selected connectivity provider 1150A, that may be generated by the client after receiving a response 1301, according to at least some embodiments. Selection notification 1451 may also be formatted in accordance with the interface implemented by connectivity coordinator 1114, e.g., as an API call or a web form selection. FIG. 15 illustrates example communications from connectivity coordinator 1114 to an LMCP 1150 and the client after the client has selected the LMCP, according to one embodiment. As shown, in response 1551 to the client, the connectivity coordinator 1114 may provide confirmation 1583 of the selection of the LMCP. In one embodiment, the connectivity coordinator 1114 may determine the LMCP 1150 to be used, e.g., based on the client's location information, and may not require that the client make a selection; in other embodiments, the connectivity coordinator 1114 may wait for the client's selection or confirmation before making the determination of the LMCP. In some implementations the client may suggest or recommend one or more LMCPs in the initial request for dedicated connectivity (e.g., request 1251 of FIG. 12), and the connectivity coordinator 1114 may determine the LMCP to be used based on the initial request. A connection identifier 1581 may also be provided to the client in response 1551. In some embodiments authorization information 1582 allowing physical access to the network provider's endpoint router 1132, similar to the authorization information 481 shown in FIG. 4, may be provided to the client as well. In notification 1552 sent to the selected LMCP 1150, connectivity coordinator 1114 may also provide authorization information 1582, as well as physical link configuration instructions 1571 (similar to physical link configuration instructions 471 of FIG. 4) which may include port, cage, rack and/or patch panel identifiers 1567, 1561, 1563 and 1565 respectively for the endpoint router 1132 to which a physical link may be established by or on behalf of the selected LMCP. In some embodiments the authorization information 1582 may be sent to either the client or the LMCP, but not both.

After communications similar to those shown in FIG. 15 are received by the client and/or the selected LMCP 1150, a path (similar to direct path 1149 of FIG. 11) comprising a dedicated physical link may be established between equipment of the provider network (such as an endpoint router 1132) and the client network 1162 using the selected LMCP's network and/or equipment in one embodiment. As desired, one or more logically-isolated paths, similar to those discussed in conjunction with the description of FIGS. 5 and 7 may then be established using the newly-established dedicated physical link. In some implementations, the connectivity coordinator 1114 may verify, e.g., by exchanging one or more network packets or messages with the client and examining the routes taken by the messages, that the desired dedicated connectivity has been provided, and may send a confirmation message to the client and/or the LMCP 1150 indicating this accomplishment.

In environments where timing constraints (such as start times and/or stop times) were requested by the client, connectivity provider 1114 may also be operable to implement those timing constraints, e.g., by scheduling routing changes or making other configuration changes at the appropriate times. For example, in one environment where BGP is used as a routing protocol, a set of network prefixes for the client network may be advertised at or shortly prior to a desired start time to enable or disable the dedicated connectivity. In some implementations, the dedicated connectivity provided to a client with the help of an LMCP may have an associated bandwidth limit, and the interface supported by the connectivity coordinator 1114 may also enable clients to make bandwidth modification requests—e.g., to request a higher or lower rate of traffic than initially agreed upon. In response to such requests the connectivity coordinator 1114 may dynamically change configuration settings at one or more devices to comply with the new bandwidth requirement. In one embodiment the connectivity coordinator 1114 may itself monitor the rate at which traffic flows to a client network 1162. If traffic over a measured period of time reaches a threshold (e.g., 80% or more of the maximum allowed traffic), the connectivity coordinator 1114 may inform the client that a bandwidth modification may be advisable, and the client may in turn request a bandwidth increase using the interface. In some implementations the connectivity coordinator 1114 may also be configure to notify a client if it may be advisable to lower the bandwidth limit associated with a dedicated direct path, e.g., if measurements indicate that the client appears to use only a small fraction of the bandwidth it requested.

Example Web Interface for Initiating LMCP Selection

FIG. 16 is an illustration of a portion of an exemplary web-based interface that may be provided for initiating connectivity provider selection, according to some embodiments. As shown, the web-based interface may comprise a web-page 1600 with several form fields that may be presented to the client by connectivity coordinator 1114. The web page may include a welcome message area 1603, and form fields 1605 for the client to specify a physical address where dedicated connectivity is desired. In fields 1607, the client may indicate whether assistance in selecting a connectivity provider is desired. Bandwidth requirements may be specified in fields 1609, and timing-related requirements for the dedicated connectivity, such as a desired start time and/or a desired end time, may be specified in field 1611. The submit button 1615 may be used to submit the completed form to the connectivity coordinator 1114.

In one embodiment, the submission of such a form may result in the invocation of one or more APIs at the connectivity coordinator similar to APIs API-1 through API-18 listed in conjunction with the description of FIG. 2. Some additional APIs, including some LMCP-specific APIs and APIs to provide dynamic modification of existing connections and/or pricing-related operations may also be supported in some implementations, for which example invocations may include the following:

[API-21] ProviderList providerList=getConnectionProviders(CustomerID customerId, CustomerLocationRecord location);
The getConnectionProviders API may be used to find available LMCPs based on the location information specified in a CustomerLocationRecord object.
[API-22] RequestStatus status=setConnectionProvider(ProviderId providerId, CustomerID customerId, RequestId requestId);
The setConnectionProvider API may be used to specify that a particular LMCP identified by its ProviderId has been selected by the customer.
[API-23] RequestStatus status=setConnectionStartTime (ConnectionId connectionID);
The setConnectionStartTime API may be used to specify a start time for the dedicated connectivity.
[API-24] RequestStatus status=setConnectionEndTime (ConnectionId connectionID);
The setConnectionEndTime API may be used to specify a desired end time for dedicated connectivity.
[API-25] PricingInfo pricingInfo=getConnectionPricingInfo(ConnectionId connectionID);

The getConnectionPricingInfo API may be used to query pricing-related information for an existing connection or for a connection that has not yet been established.

In some embodiments, APIs such as those for which examples are provided above may be available for use directly by clients, LMCPs 1150 and/or other network providers, or by facility providers such as operators of router co-location facilities 150. In some implementations multiple layers of interfaces may be supported, allowing clients to request some connectivity-related operations using a web interface, for example, and to perform or request other operations using an API.

Figure 17:
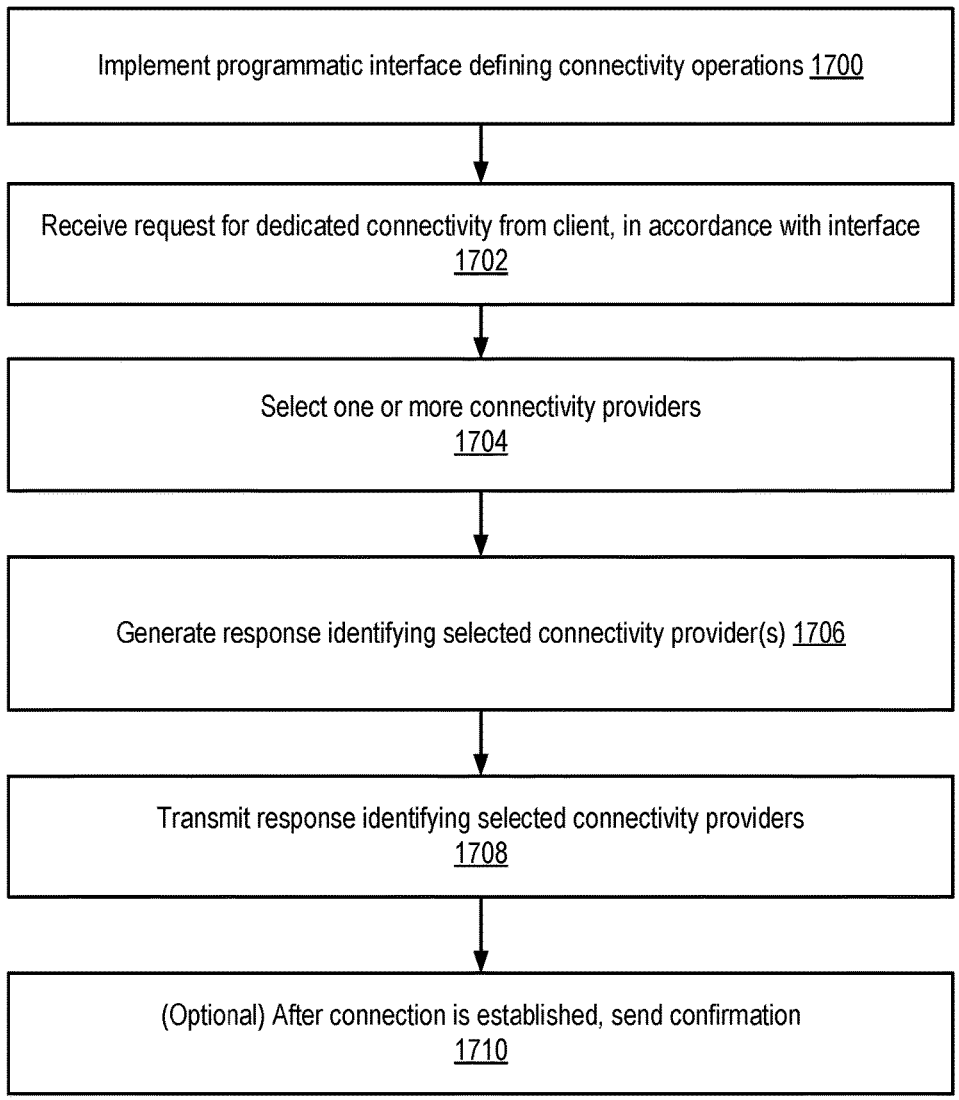
FIG. 17 is a flowchart of a method for enabling clients to select connectivity providers, according to at least some embodiments.

FIG. 17 is a flowchart of a method for enabling clients to select connectivity providers, according to at least some embodiments. The method (as shown in element 1700 of FIG. 17) comprises implementing an interface that defines a set of connectivity operations made available to clients of a provider network 1100 by a connectivity coordinator 1114. The interface may comprise an API, a command-line interface, a web-based interface, some other GUI, or any other programmatic interface, for example. A request for dedicated connectivity, formatted in accordance with the interface, may be received (element 1702). The request may in some cases directly indicate that the requester requires assistance in selecting a connectivity provider. In other cases the request may simply contain some information (such as a physical address where a client wishes to obtain dedicated connectivity) from which the connectivity coordinator 1114 may infer, based on its knowledge of where endpoint routers 1132 of provider network 1100 are physically located, that a connectivity provider may be needed to fulfill the client's request. As indicated in element 1704, one or more connectivity providers may then be selected, and a response identifying the selected connectivity provider or providers may be generated (element 1706 of FIG. 17) and transmitted (element 1708). In some implementations the response may be transmitted to just the requesting client, while in other implementations a response and/or notification may also or instead be transmitted to the selected connectivity provider.

When the client receives the information identifying candidate connectivity providers such as LMCPs 1150, it may select one (if more than one were identified by the connectivity coordinator 1114) and notify the connectivity coordinator of its choice. The connectivity coordinator 1114 may then communicate with the selected LMCP 1150, and with the client, to coordinate the establishment of a physical link (and in some cases one or more logical connections that use the physical link) to fulfill the client's connectivity needs. After connectivity has been successfully established, the connectivity coordinator 1114 may in some implementations send a confirmation of the completion of the establishment (element 1710 of FIG. 17).

Figure 18:
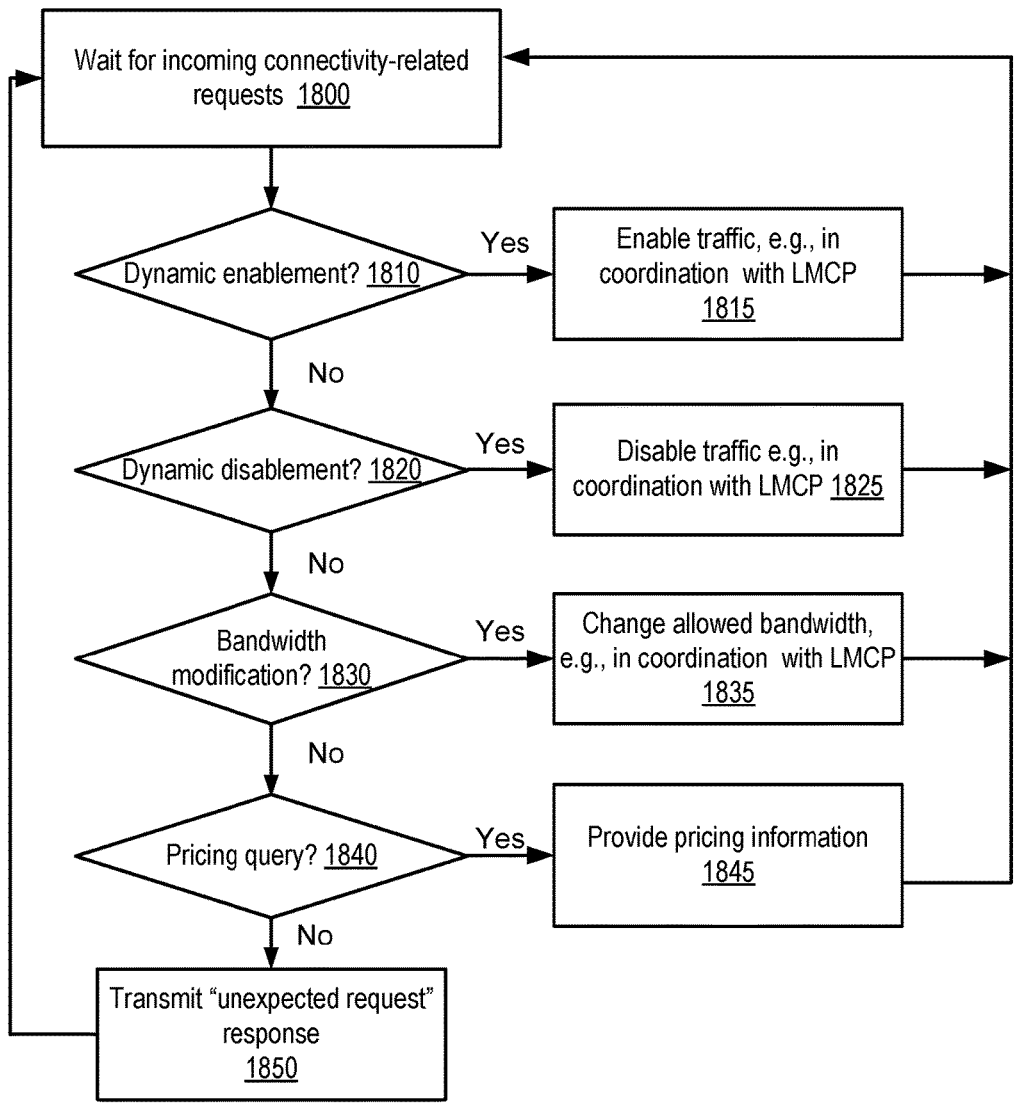
FIG. 18 is a flowchart of a method for providing dynamic connectivity-related services, according to at least some embodiments.
Figure 19:
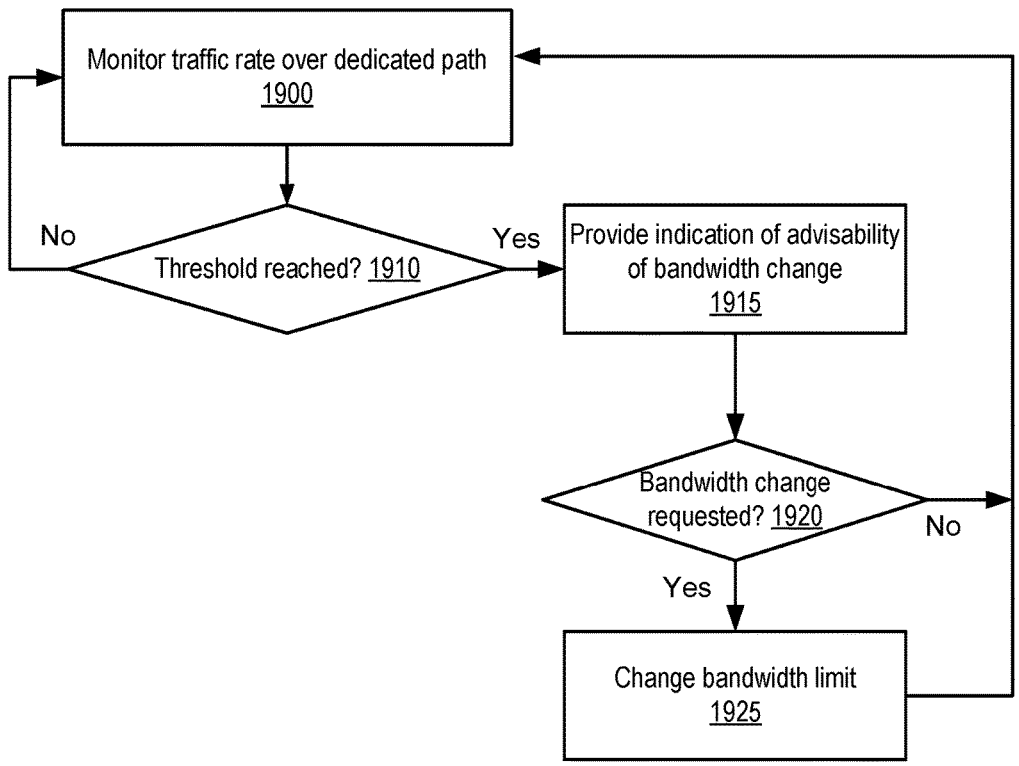
FIG. 19 is a flowchart of a method comprising responding dynamically to changing traffic levels, according to at least some embodiments.

In some embodiments a number of additional capabilities, in addition to connectivity provider selection and connectivity establishment, may be supported via the interface provided by a connectivity coordinator 1114. FIG. 18 is a flowchart of a method for providing dynamic connectivity-related services, according to at least some embodiments. The connectivity coordinator 1114 may wait for connectivity-related requests from clients, as shown in element 1800. When such a request is received, if the request is a supported type of request, the connectivity coordinator 1114 may take the requested action. For example, if a request for dynamic enablement of connectivity is received and supported in the embodiment (element 1810), the connectivity coordinator may enable traffic flow, as shown in element 1815. In some cases enabling or disabling traffic may require interaction or coordination between the connectivity coordinator 1114 and an LMCP 1150. Similarly, if the request is for disabling connectivity (element 1820), the desired change may be put into effect by connectivity coordinator 1114 (element 1825). If the request is for a change to the bandwidth limits associated with a client's dedicated connection path (element 1830), the requested change may be implemented, e.g., by making configuration changes at one or more network devices of the provider network 1100 and/or an LMCP. If the request comprises a pricing query (element 1840), the connectivity coordinator 1114 may provide the requested pricing information (element 1845), which may for example include recurring and/or non-recurring cost information that the provider network operator and/or the LMCP may charge the client. If an invalid or unsupported request is received, as shown in element 1850, the connectivity coordinator may transmit a response indicating that an unexpected request was received. In each case, as the arrows leading back to element 1800 indicate, the connectivity coordinator eventually resumes waiting for connectivity-related requests. While the determination of the type of request is shown as a series of checks in FIG. 1800 for simplicity (first checking for dynamic enablement requests, then for disablement requests, and so on), in various implementations the request type may be determined in a single step using logic similar to a "case" or "switch" statement in C or Java FIG. 19 is a flowchart of a method comprising responding dynamically to changing traffic levels, according to at least some embodiments. As shown in element 1900, the connectivity coordinator may monitor traffic rates over the dedicated path set up for a client. If some threshold of traffic is reached or sustained over a period of time (as detected in element 1910), the connectivity coordinator may provide an indication to the client that a bandwidth change may be appropriate (element 1915). If a request to change the bandwidth is received in response to the indication (element 1920), the connectivity coordinator may implement the requested change (element 1925). The connectivity coordinator may then resume monitoring the traffic. Each of the interactions illustrated in FIGS. 18 and 19 between the connectivity coordinator 1114 and the client may be implemented using the interface or interfaces (such as one or more web pages) provided by the connectivity coordinator.

Marketplace Enablement for Services Accessible Via Direct Links from Client Networks Clients of provider networks (such as provider network 105 of FIG. 1 or provider network 1100 of FIG. 11) may in many environments implement applications and services exposed to their own customers outside the provider networks. For example, one client ("Client A") of a provider network that has set up direct physical links from its client network to the provider network using the techniques described earlier may set up a file backup service using one or more resource collections, and customers of Client A may access the file backup service from the customers' client devices. In some cases some of the potential customers of such a Client A may also be clients of the provider network, and may have set up their own dedicated physical links to the provider network using interfaces similar to those described above. For example, a Client B of the provider network may have such a dedicated physical link (similar to the cross-network connection 191 shown in FIG. 1) set up between its client network and Client B's resource collections in the provider network, and may be a candidate to be a customer of Client A's backup service. However, such a Client B may not be aware of the possibility that Client A's backup service may be made accessible from Client B's client network using Client B's dedicated physical link, thereby gaining the performance and security benefits of such dedicated links. In such environments a connectivity coordinator similar to coordinator 114 of FIG. 1 may support a number of marketplace-related features that, for example, allow services such as the backup service to be advertised, allow clients of the provider networks to subscribe to such services, and make any configuration changes needed to allow the services to be used via the dedicated physical links.

Figure 20:
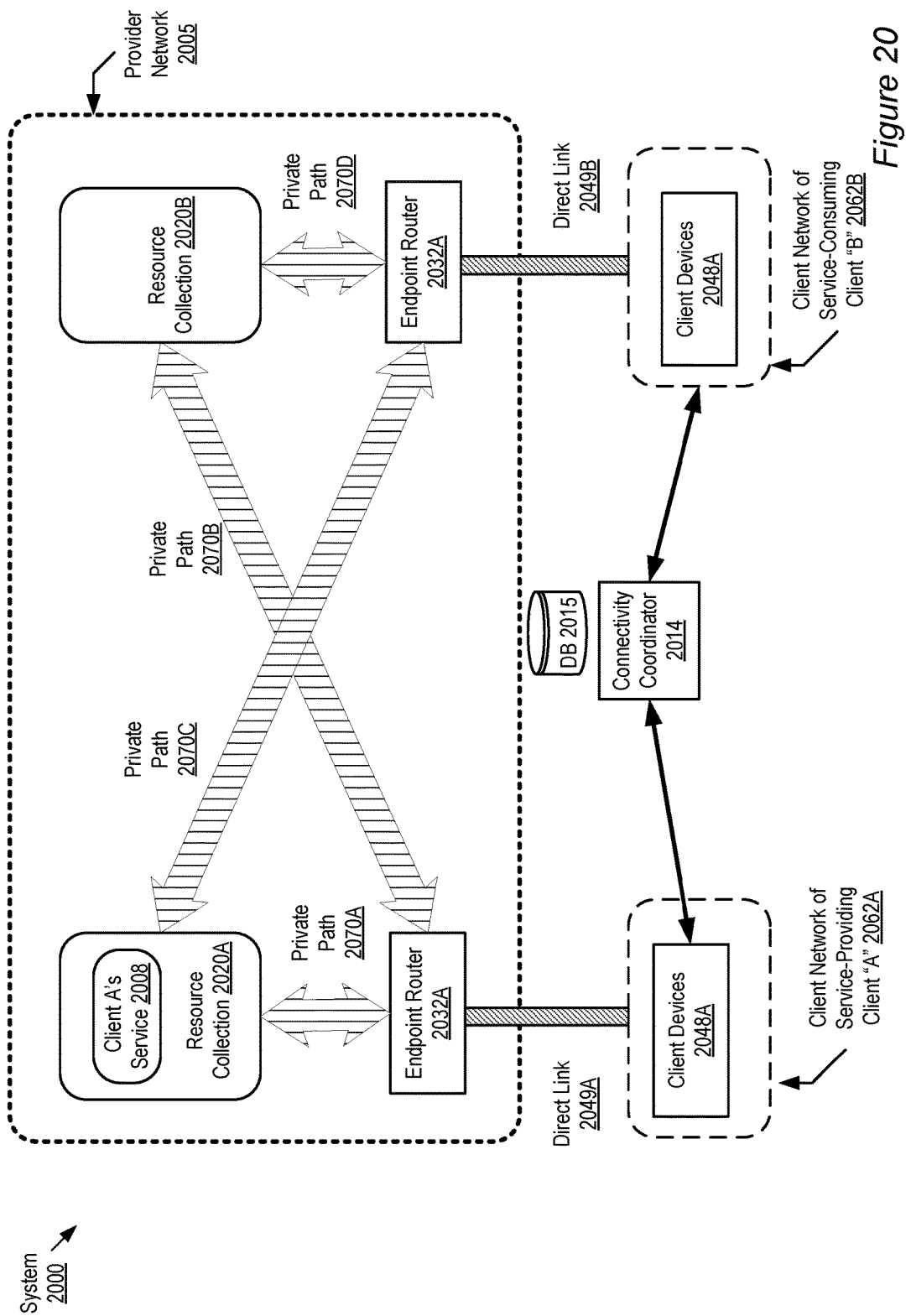
FIG. 20 illustrates an example of a system including a provider network within which a client has established a service potentially accessible to other clients via dedicated physical links, according to at least some embodiments.

FIG. 20 illustrates an example of a system 2000 including a provider network 2005 within which a client has established a service 2008 potentially accessible to other clients via dedicated physical links, according to at least some embodiments. In the illustrated embodiment, Client A may have used some of the interfaces and techniques described above, provided by a connectivity coordinator 2014, to establish dedicated connectivity via direct link 2049A from its client network 2062A to resource collection 2020A via endpoint router 2032A. Similarly, Client B may have used the interfaces to establish dedicated connectivity via direct link 2049B from its client network 2062B to resource collection 2020B via endpoint router 2032B. Within the provider network 2005, various private paths 2070 such as paths 2070A, 2070B, 2070C and 2070D may be available between endpoint routers 2032 and resource collections 2020; not all the paths may be actively in use at any given time (e.g., routing configuration settings may need to be changed to permit traffic to flow along a given path 2070). Client A may have implemented its service 2008 using resource collection 2020A allocated to Client A, and may be interested in making the availability of the service 2008 known to other clients of provider network 2005 (such as Client B), and adding such subscribers to service 2008. The term "service-providing clients" may be used in this document to designate those clients (such as client A) that implement a service that can potentially be made accessible via direct links 2049 of other clients of the provider network 2005. Clients (such as Client B) that are, or may become, customers of the service-providing clients may be termed "service-consuming clients". In some embodiments the service may be made available to service-consuming clients that may have set up direct links 2049 (similar to link 2049B) between their client networks (similar to 2062B) and the provider network 2005, but may not have their own resource collections allocated. That is, in such embodiments the direct links 2049 may be set up to provide connectivity between the service-consuming clients' networks and various resources and services available within the provider network 2005, without requiring the service-consuming client to reserve or obtain its own resource collections within the provider network. Such a service may also be available to various potential customers outside provider network 205 via paths that do not include direct links 2049 in some embodiments. A programmable interface implemented by connectivity coordinator 2014 (which may extend or be similar to the interfaces implemented by connectivity coordinators described earlier in conjunction with FIGS. 1 and 11) may be usable by Client A to advertise its service 2008, and by Client B to discover Client A's service and subscribe to it.

For example, in one embodiment connectivity coordinator 2014 may receive a service advertisement request, formatted in accordance with the interface, from a service-providing client such as Client A, in which Client A may identify and describe various features of service 2008. In response, connectivity coordinator 2014 may store this information within a database 2015 in some implementations. In some embodiments the connectivity coordinator 2014 may actively propagate or distribute the advertised information to other clients of provider network 2005, that may for example have agreed (or "opted-in") to receive notifications of such services as they become available. Such notifications may also be formatted in accordance with the interface. The notifications may include, among other information, pricing indications for service 2008 in some embodiments; for example, billing rates that may be charged by Client A for service 2008, and/or billing rates that may be charged by the operator of provider network 2005 for providing network connectivity to service 2008.

In some embodiments clients such as Client B may submit service discovery requests formatted in accordance with the interface to connectivity coordinator 2014, requesting the coordinator to enumerate or list services with certain desired characteristics that may be available from within provider network 2005. Upon receiving such a discovery request, the connectivity coordinator 2014 may determine (e.g., by consulting or searching database 2015) whether any such services are available, and transmit a notification, formatted in accordance with the interface, to the requesting client with the results of its determination. If one or more services such as service 2008 were found, the notification may comprise a list of the services found, and if no services were found, the notification may indicate that result. In some embodiments access policies may be associated with various resource collections and/or the services implemented therein, which may govern who is allowed to access the resource collection or service, or from where such access is permitted. In such embodiments, before responding to a connectivity request or providing any connectivity-related notifications, the connectivity coordinator 2014 may verify whether the action it is taking is in compliance with the applicable access policy or policies. Access policies associated with the resource collections 2020 and/or services 2008 may, in some implementations, be stored in the database 2015.

Subscriptions to services such as service 2008 may also be set up or disbanded using the interface provided by connectivity coordinator 2014 in some embodiments. For example, after a client such as Client B learns about a service, the client may send a subscription request to the connectivity coordinator 2014 via the interface, indicating that the client wishes to start using the service. In response to such a subscription request, connectivity coordinator 2014 may in some implementations verify whether the requested subscription is acceptable (e.g., by communicating with Client A for service 2008 using the interface). If the subscription is acceptable (e.g., if sufficient resources are still available for Client A to respond to a new subscriber's requests with acceptable performance and quality levels), the connectivity coordinator 2014 may initiate or make one more configuration changes, for example routing-related changes at endpoint router 2032B, to enable requests from Client B's network 2062 to flow to the resource collection 2020A where the service is being implemented or provided. In some environments, depending on policies agreed to between the connectivity coordinator 2014 and the service-providing client, the connectivity coordinator 2014 may perform the configuration changes necessary without verifying the acceptability of the request. After the configuration changes have been completed, in one embodiment the connectivity coordinator may send messages formatted according to the interface to one or both of the participating clients (Client A and/or Client B) confirming that a new subscription has been enabled. The term subscription, as used herein, refers broadly to any mechanism whereby a client receives requested services and pays for the services. A variety of payment or billing options may be implemented for the service 2008 in different embodiments; for example there may be fixed charges per unit time (e.g., per business day) that the service is available, as well as request-based charges (e.g., per HTTP request) or usage-based charges (per megabyte of data transferred for the service). In some embodiments the charges may be based on how far the traffic generated for, or associated with, a given service or service request has to be transmitted—e.g., a different charge may be incurred if a service requested from the U.S. east coast is handled by a resource in the central U.S., than if the service is handled by a resource in Singapore.

In one implementation, the client operating service 2008 may provide the connectivity coordinator 2014 with capacity information for the service, e.g., by specifying a number of available customer "slots", which may indicate how many subscriptions (or connections for subscriptions) may be accepted. As each new subscriber such as Client B is added, the connectivity coordinator 2014 may use up one or more of the slots. For each slot in some such implementations, addressing or routing information such as IP addresses and/or port numbers to be used for accessing the service 2008 may be made available as well. Information about changes to slot availability (e.g., if Client A expands its resources and makes more slots available, or if Client A is performing upgrades or repair to service 2008 and reduces the number of slots available) may be exchanged between service-providing clients such as Client A and connectivity coordinator 2014 using the interface.

Using the interface, a variety of other functionality related to services such as service 2008 may be implemented in some embodiments. The interface may be used to drop or cancel subscriptions, for example. Support requests and/or customer feedback such as ratings and rankings related to a service 2008 may be implemented using the interface as well. In some embodiments users of a service 2008 may be allowed to modify their subscriptions (e.g., to reduce the number of concurrent user sessions for which they are willing to pay) and/or submit queries regarding their subscriptions (e.g., "how many gigabytes of data have I backed up so far this month?") via the interface. Different types of programmatic interfaces (e.g., APIs, command line interfaces, web-based or other GUIs, etc.) may be used to support the service marketplace functionality in different embodiments. In one embodiment clients such as Client A may also be allowed to extend or customize an API to, for example, provide their own branded "look and feel" to a service such as service 2008. The techniques described earlier in conjunction with the descriptions of FIGS. 1-19 may be used in various combinations to provide service marketplace functionality in various embodiments. For example, the direct links 2049A or 2049B may be set up using last-mile connectivity providers (similar to providers 1150 of FIG. 11) in some embodiments. Logically-isolated network paths similar to those illustrated in FIG. 7 may be set up for clients subscribing to service 2008 in one embodiment, e.g., using requests similar to request 551 of FIG. 5. That is, a client such as Client B may wish to restrict traffic generated for a subscribed service to a designated isolated network path, on which only traffic related to the subscribed service is allowed, and such isolation may be implemented using techniques such as VLAN tags described earlier in conjunction with the description of FIG. 5.

Marketplace-related Communications with the Connectivity Coordinator

Figure 21:
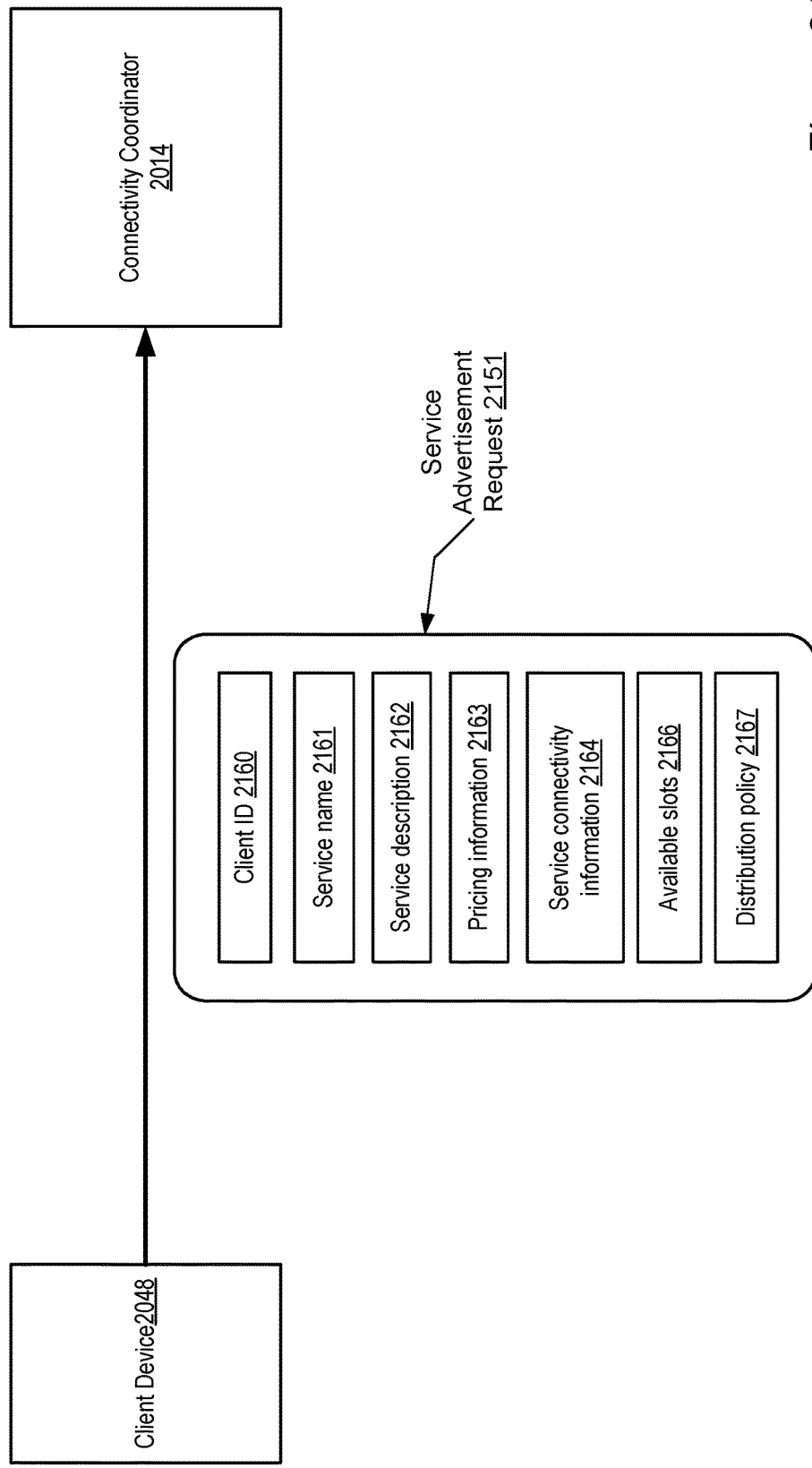
FIG. 21 illustrates examples of constituent elements of a service advertisement request that may be sent to a connectivity coordinator by a client, according to at least some embodiments.

FIG. 21 illustrates examples of constituent elements of a service advertisement request 2151 that may be sent to connectivity coordinator 2014 by a client such as Client A using the interface provided by the connectivity coordinator, according to at least some embodiments. As shown, the request comprises a client identifier 2160 of the client implementing the service (such as service 2008) that is being advertised. The request may include any of a number of elements providing information about the service in different embodiments, such as a service name 2161 (e.g., "WorldsBestBackups.com" for a backup service), a service description 2162, pricing information 2163, service connectivity information 2164, available slot information 2166, and a distribution policy 2167. A service description field 2162 may in some embodiments provide links or pointers to additional collateral regarding the service 2008, e.g., in the form of web links to documentation on the service, testimonials or reviews for the service, and the like. The service description field may also include any constraints or suggested requirements for clients wishing to use the service—e.g., that the browser software to be used to access the service must implement HTML5, or that the client should use a T1 line for connections to the service, and so on.

Pricing information 2163 may include details such as different rates based on the time of day or the day of the week (e.g., different rates may be charged during peak business hours vs. weekends or evenings), the geographical location of the requesting clients, the type of connectivity used (e.g., public internet connectivity vs. dedicated links) and so on. In some implementations pricing information 2162 may include indications of the different rates may be charged by the distinct providers involved: the service-providing client (e.g., Client A) may have its pricing rates, and the operator of the network such as provider network 2005 may have its own rates. Service connectivity information 2164 may include instructions on how to access the service, e.g., providing URLs, ports and the like. In some embodiments, as noted above, the service-providing client may provide an indication of available slots 2166—for example, 100 slots may indicate that up to 100 subscribers of a high-bandwidth backup service may be accepted. As the connectivity provider 2014 enables new subscriptions, it may use the available slot information 2166 to determine whether the service 2008 still has enough spare capacity to add another subscriber. In some implementations the available slot information 2166 may include IP addresses and/or ports to be used for each of the slots, and/or a maximum supported bandwidth or data transfer rate for each slot. In one embodiment the service advertisement request 2151 may include an indication of a distribution policy 2167 controlling how (or whether) the information within the advertisement should be propagated—e.g., whether the connectivity coordinator 2014 should send notifications to potential customers (who may or may not have agreed to receive such notifications) on its own, whether it should wait for service discovery requests to send notifications to potential customers, or whether it should wait for requests from the service-providing client to transmit notifications to specified potential customers.

Figure 22:
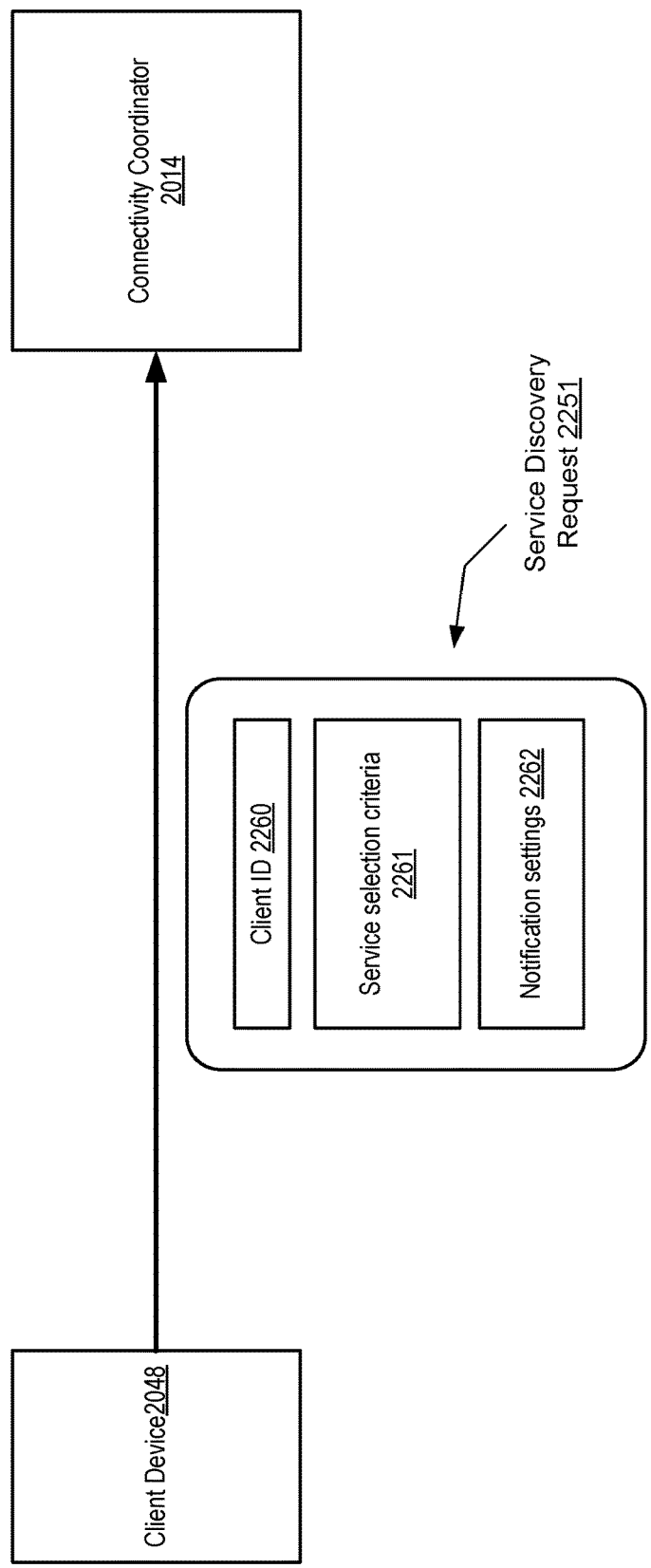
FIG. 22 illustrates an example of constituent elements of a service discovery request that may be sent to a connectivity coordinator by a client, according to at least some embodiments.

FIG. 22 illustrates an example of a service discovery request 2251 that may be sent to connectivity coordinator 2014 by a client (such as Client B) using the interface provided by the connectivity coordinator, according to at least some embodiments. Such a service discovery request may be used by a client to ascertain the types of services that may be available to the client through its direct link or links (such as link 2049B) to the provider network. The requesting client may include its client identifier 2260 within the discovery request 2251. In one embodiment the service discovery request 2251 may also include service selection criteria 2261 to allow connectivity coordinator 2014 to restrict the set of services on which information is provided to the client, i.e., to filter out services in which the requesting client may have no interest. Service selection criteria 2261 may include, for example, an enumeration of keywords indicating the types of services of interest (e.g., "backup", "disaster recovery", "video delivery"), desired price range, vendor criteria (e.g., the logical equivalent of "Tell me if any services are provided by MyFavoriteVendor.com"), rating or popularity criteria (e.g., the logical equivalent of "Tell me about the 20 most subscribed services"), and the like. In some implementations, by default (e.g., if no service selection criteria are specified) notifications regarding all available services may be provided to a client in response to a service discovery request.

In some embodiments a discovery request 2251 may include notification settings 2262, which may specify how frequently or under what circumstances the requesting client should be notified regarding the availability of services matching the service selection criteria. For example, a client may specify that service availability notifications may be sent to the client only in response to receiving a specific discovery request 2251, or that such notifications may be sent at some interval (e.g., weekly or monthly) even when no new service discovery requests 2251 have been sent during that period, or that such notifications may be sent whenever a new service matching the selection criteria becomes available.

Figure 23:
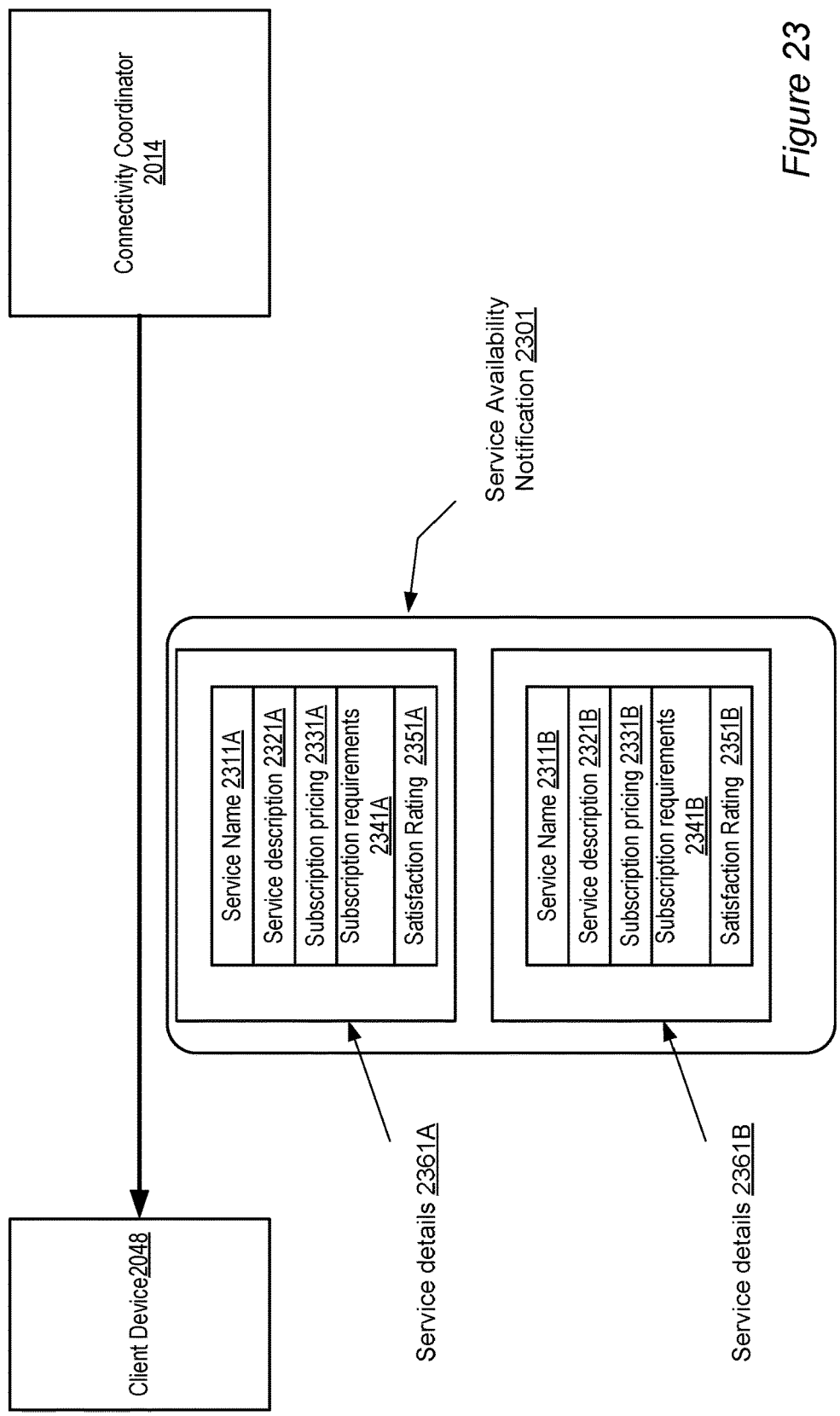
FIG. 23 illustrates an example of constituent elements of a service availability notification that may be sent by a connectivity coordinator to a client, according to at least some embodiments.

FIG. 23 illustrates an example of constituent elements of a service availability notification 2301 that may be sent by a connectivity coordinator 2014 to a client, according to at least some embodiments. Such a notification may be sent to a client via the interface in response to a specific service discovery request 2251 in some embodiments; in other embodiments it may be sent periodically, or whenever a new service becomes available, or when a service advertisement request 2151 is received at the connectivity coordinator 2014. As shown, a service availability notification 2301 may include one or more service details entries 2361 (e.g., 2361A and 2361B) describing the services available to potential customers. A given service detail entry such as entry 2361A may include a service name 2311A, a service description 2321A, and pricing information 2331A (such as recurring and non-recurring subscription rates, rates charged by the different vendors involved, rates that vary based on time of day or day of the week, rates that vary based on the geographical region where the service request originates, etc.).

In some embodiments a service detail entry 2361A may also include a subscription requirement entry 2341A, e.g., describing criteria that the customer must meet, such as a minimum bandwidth needed for service-related network data traffic between the client and the resource collection(s) such as 2020A where the service is implemented, or a minimum time period for which the customer must subscribe to the service, and so on. In one embodiment a service detail entry 2361A may include one or more indications of a popularity of the service, such as a satisfaction rating 2351A, reviews, rankings and the like. Connectivity coordinator 2014 may in some embodiments be configured to allow clients to provide feedback on services such as service 2008, and may store the feedback in its database 2015 together with other service details that may be used in the various interactions between the clients and the coordinator, for example to send satisfaction ratings 2351 to potential clients.

Figure 24:
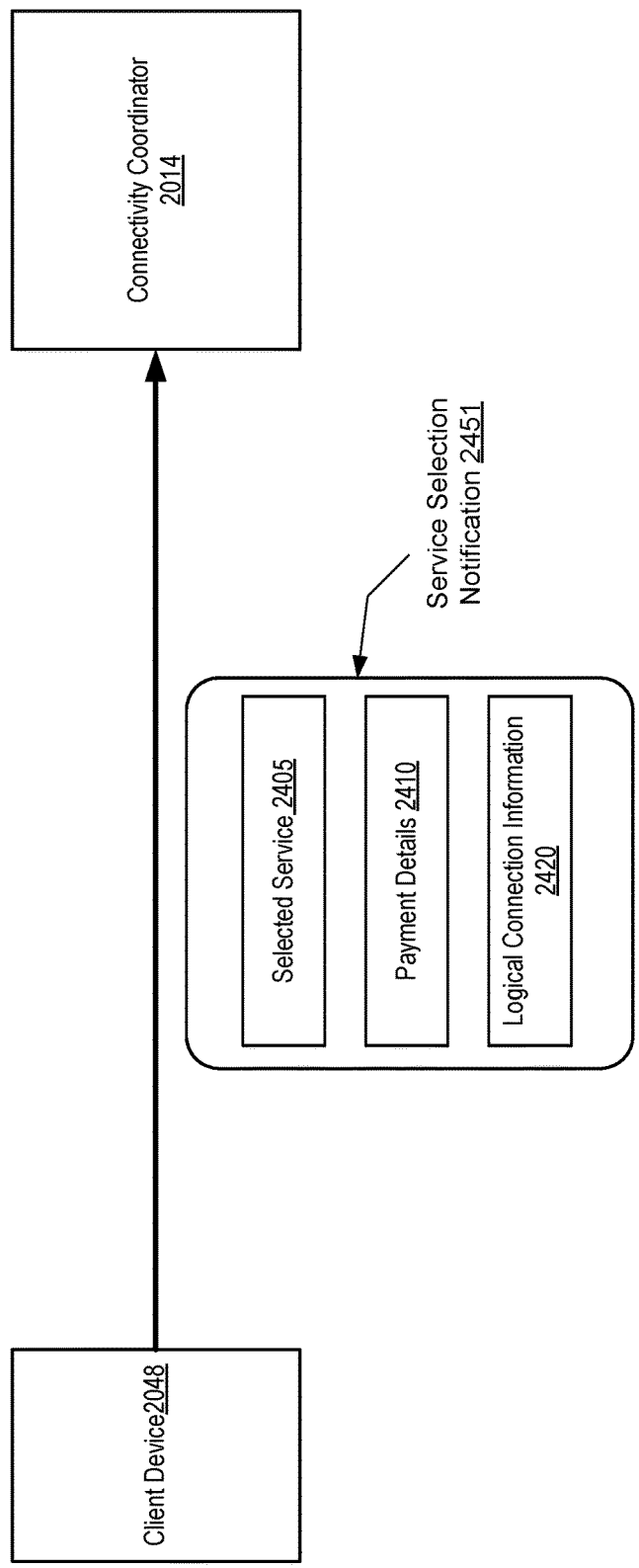
FIG. 24 illustrates an example of constituent elements of a service selection notification that may be sent by a client to a connectivity coordinator, according to at least some embodiments.

FIG. 24 illustrates an example of constituent elements of a service selection notification 2451 that may be sent by a client to a connectivity coordinator 2014, according to at least some embodiments. Such a notification may serve as a subscription request in which the client indicates the service it wishes to utilize via its dedicated physical link 2049. The service selection notification 2451 may also provide information about a logically-isolated path or connection the subscribing client may wish to use for the service. As shown, a service selection notification 2451 may include an identification of the selected service 2405, payment details 2410 (e.g., details of credit cards or other sources from which payments for the services are to be made), and logical connection information 2420. The logical connection information 2420 may include a name or identifier of a previously established logically-isolated path similar to paths 752A and 752B of FIG. 7 in one embodiment. In another embodiment, the logical connection information 2410 may include elements similar to those shown in FIG. 5, such as a VLAN tag, a BGP ASN, network prefixes, pairing information, and/or gateway information for the logically-isolated connection over which the client wishes to transmit and receive network traffic for the subscribed service. In one implementation, a service selection notification 2451 including details 2420 of a logical connection may serve as a request to the connectivity coordinator 2048 to establish a new logical connection over the requesting client's direct link 2049B—e.g., the connectivity coordinator 2014 may perform some actions (such as routing changes) responsive to the service selection information 2451 that are similar to the actions taken in response to isolation request 551 of FIG. 5. In embodiments where a client requests that a particular logically-isolated path or connection is to be used for its subscription-related traffic, the connectivity coordinator 2014 may perform one or more configuration operations to enable the traffic to flow as desired over the logically-isolated path or connection. In some implementations the subscribing client may identify which logically-isolated path(s) are to be used for a given subscription using a separate notification distinct from the service selection notification.

Figure 25:
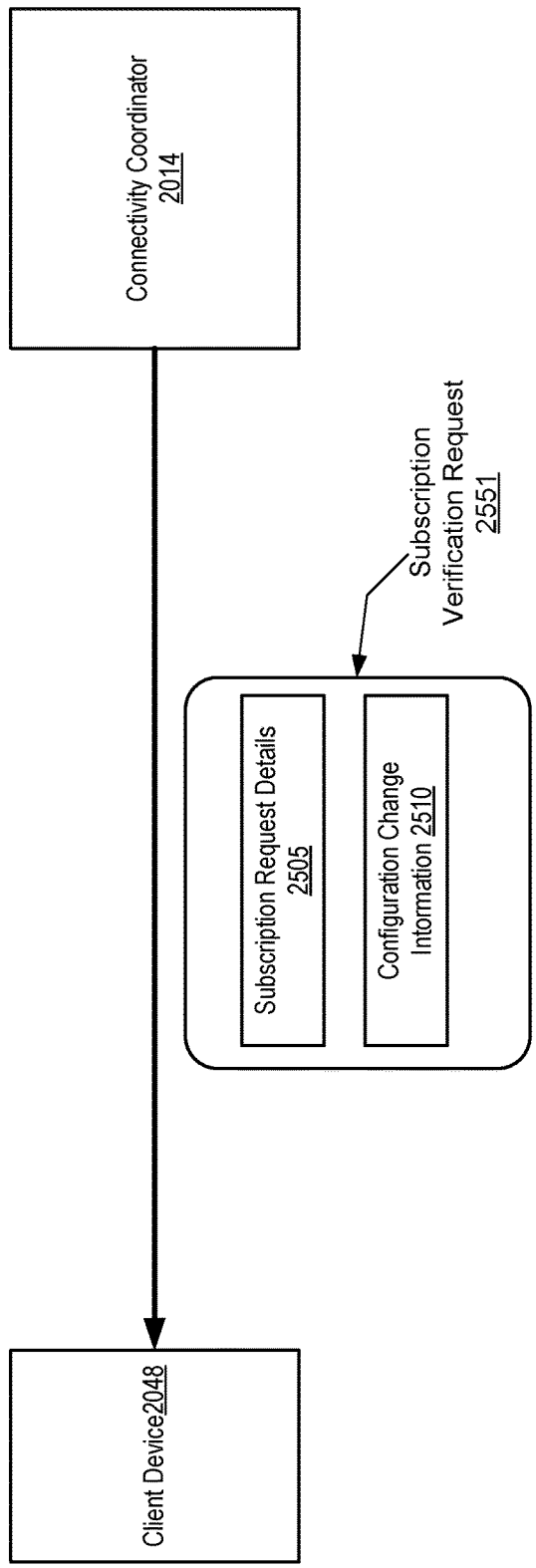
FIG. 25 illustrates an example of constituent elements of a subscription verification request that may be sent by a connectivity coordinator to a client, according to at least some embodiments.

In one embodiment, connectivity coordinator 2014 may be operable to verify with a service-providing client (such as Client A of FIG. 20) whether a subscription request is acceptable, e.g., before making any configuration changes that may enable traffic of such a subscription to flow. FIG. 25 illustrates an example of constituent elements of a subscription verification request 2551 that may be sent by the connectivity coordinator 2014 to a service-providing client, according to at least some embodiments. The subscription verification request 2551 may include details 2505 of the requested subscription and/or configuration change information 2510 indicating some of the changes that the coordinator 2014 intends to put into effect if the subscription request is acceptable. Subscription details 2505 may include for example an identification of the subscribing client, payment information from the client, the number of slots that the subscription may take up, and so on. Configuration change information 2510 may include for example routing-related changes that the coordinator intends to make, and in some cases an indication of how the new subscription might impact the total bandwidth or other resources allocated to the service-providing client. A subscription verification request 2551 may be communicated via the interface implemented by the connectivity coordinator 2014 for marketplace-related functions in some embodiments (e.g., by updates to a web page listing information on pending subscription requests), and may be transmitted using other mechanisms such as e-mail in other embodiments. In response to a subscription verification request 2551, the service-providing client may transmit a subscription approval message to the connectivity coordinator 2014 if the subscription is acceptable, and a rejection notice if the subscription is unacceptable. If the subscription is approved, the connectivity coordinator 2014 may implement the configuration changes corresponding to the subscription; if the subscription is rejected, the connectivity coordinator may inform the subscribing client of the rejection. In some embodiments a subscription verification request 2551 may be sent to the service-providing client before a service availability notification 2301 is sent to a potential customer of the service, e.g., the connectivity coordinator 2014 may wish to have potential subscriptions pre-approved before inviting a new customer to subscribe to a service.

Example Web Interface for Service Marketplace Operations

FIG. 26 is an illustration of a portion of an exemplary web-based interface that may be provided for marketplace related communications such as service advertisements, according to some embodiments. Web page 2600 may be used by service-providing clients such as Client A of FIG. 20 to provide information about the service they are making available to other clients of provider network 2005 that have direct physical links 2049 linking their client networks to the provider network. As shown, the web-based interface may comprise several form fields that may be presented to the client by connectivity coordinator 2014. The web page may include a welcome message area 2603, and form fields 2605 for the clients to specify the name and description for the service they wish to advertise. In some embodiments where for example the service-providing client may wish to provide additional information about the service, such as documentation, reviews and the like, a form field 2605 may include an area to provide links to the additional information.

In fields 2607, the client may indicate pricing information for the service, including for example a flat rate that may be charged regardless of the amount of network traffic that occurs on behalf of the service, and a variable rate that may be charged as a function of the amount of traffic. Additional or advanced pricing options may be specified as well in some implementations using the advanced pricing options section shown in FIG. 26, such as different recurring and non-recurring rates that may be charged at different times of day, on business days versus weekdays, and so on. Customer requirements for the service, such as browser software versions, bandwidth requirements and the like may be specified in fields 2611. In embodiments where the service-providing client uses a slot-based system to indicate the available capacity for new subscribers, slot information 2613 may be provided via a form field as well. Distribution options 2614 for the service advertisement, e.g., whether the advertisement should be propagated without waiting for discovery requests may be selectable in some implementations. The submit button 2615 may be used to submit the completed service advertisement form to the connectivity coordinator 2014. In some embodiments one or more of the form fields may be populated with the help of drop-down menus that allow the client to select from among several choices available, and default values may be provided for some form fields. Web pages similar to web page 2600 may be used for other types of marketplace-related communications between clients and the connectivity coordinator, such as discovery requests, subscription requests, and the like.

In one embodiment, the submission of such a form 2600 may result in the invocation of one or more APIs at the connectivity coordinator 2014 similar to APIs API-1 through API-18 and API 21 through API-25 described earlier. Example API invocations for marketplace-related operations may include the following:

[API-31] AdvertisementStatus status=advertiseService(CustomerID customerId, AdvertisedServiceInfo advertisedServiceInfo);

The advertiseService API may be used by a service-providing client such as Client A of FIG. 20 to send information about an advertised service, encapsulated within an AdvertisedServiceInfo object, to the connectivity provider.

[API-32] ServiceList sList=discoverAvailableServices(CustomerID customerId, ServiceSelectionCriteria serviceSelectionCriteria, NotificationSettings nSettings);

The discoverAvailableServices API may be used by a potential customer to discover information about available services that meet specified service selection criteria. A list of services that match the criteria may be specified in the returned ServiceList object.

[API-33] RequestStatus status=subscribeToService(CustomerID custId, ServiceID serviceId, LogicalConnectionInfo logConnInfo, BillingInfo billingInfo);

The subscribeToService API may be used to specify the service to which a client such as Client B wishes to subscribe over a logically-isolated connection specified using the LogicalConnectionInfo object.

[API-34] RequestStatus approvalStatus=approveSubscription(SubscriptionInfo sInfo);

The approveSubscription API may be used by the connectivity coordinator to verify whether a service-providing client wishes to accept a requested subscription described in the SubscriptionInfo object.

As noted above, in some embodiments connectivity coordinator 2014 may allow clients to extend or customize the interface, e.g., by introducing some level of branding to the information seen by prospective customers regarding a service. In some implementations multiple layers of interfaces may be supported, allowing clients to request some connectivity-related operations using a web interface, for example, and to perform or request other operations using an API.

Methods for Service Marketplace Operations

Figure 27:
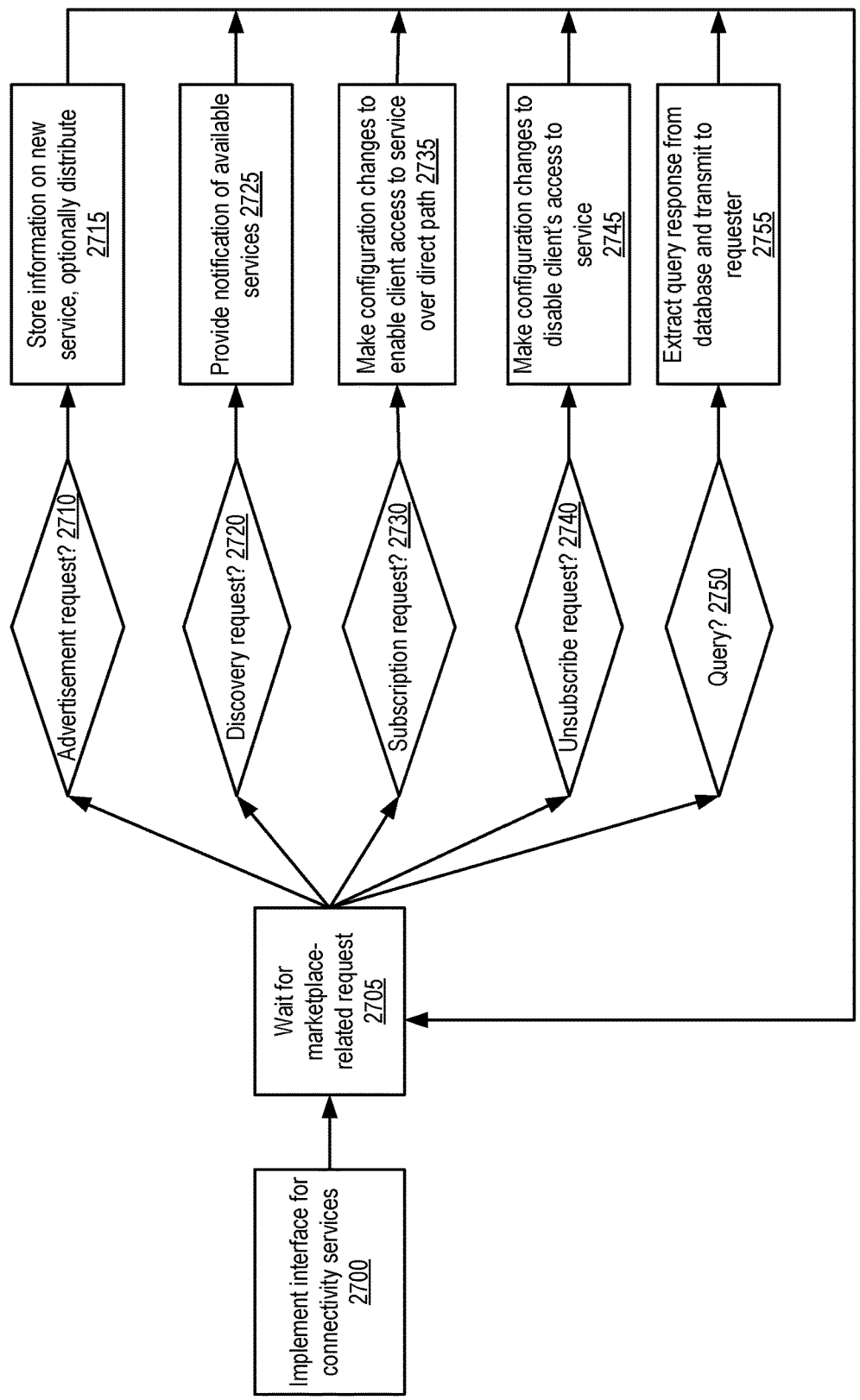
FIG. 27 is a flowchart of a method for enabling marketplace operations to which access is configurable via direct physical links, according to at least some embodiments.

FIG. 27 is a flowchart of a method for enabling marketplace operations to which access is configurable via direct physical links, according to at least some embodiments. As shown in element 2700 of FIG. 27, the method comprises implementing an interface that defines a set of connectivity operations made available to clients of a provider network 2005 by a connectivity coordinator 2014. The interface may comprise an API, a command-line interface, a web-based interface, some other GUI, or any other programmatic interface in various embodiments. As shown in element 2705, the method may include waiting for a marketplace-related request received in accordance with the interface. Depending on the type of request, one or more operations may be performed as part of the method. For example, if the request is a service advertisement request (element 2710), information on the newly-advertised service may be stored as shown in element 2715, e.g., in a repository such as database 2015. In some embodiments, information on the newly advertised service may be propagated to potential customers of the service, either as soon as the advertisement is requested, or according to a schedule requested by the advertiser or the potential customers. A notification of the availability of an advertised service may also be transmitted in accordance with the interface.

If a service discovery request is received (element 2720), indicating that the requester wishes to learn about services accessible through their direct path 2049 to the provider network, a notification that enumerates available services that meet the criteria specified in the request may be transmitted in accordance with the interface (element 2725). In response to the notification, or upon learning about available services based on some other interaction such as a propagated service advertisement, a client may submit a subscription request (element 2730) using the interface, identifying the service to which access is requested. The method may, as indicated in element 2735, further include performing or initiating one or more configuration changes in response to a subscription request (e.g., routing changes at endpoint routers) that may be needed to enable access to the service from the subscriber's client network. In some embodiments the service-providing client may be sent a subscription verification request to check that the new subscription is still acceptable, prior to the configuration changes.

The method may also comprise operations performed responsive to other types of marketplace-related requests. For example, as shown in elements 2740 and 2750, in some embodiments, clients may submit requests to unsubscribe from a service (element 2740), or queries (element 2750) e.g., regarding their subscriptions or regarding other services). In response to an unsubscribe request, the method may comprise performing one or more configuration operations to disable connectivity between the client network and the resource collection where the service is implemented (element 2745 of FIG. 27). The configuration changes may include routing changes at one or more routers or other network devices, as well as changes to subscription slot availability records, for example. In response to queries regarding client subscriptions, service usage and the like, a query response may be generated (element 2755), e.g., by consulting a database 2015 in which marketplace related data is stored, and the response may be transmitted back to the requesting client in accordance with the interface implemented by the connectivity coordinator 2014. After a requested operation is completed, the method may comprise resuming waiting for the next marketplace related request.

Figure 28:
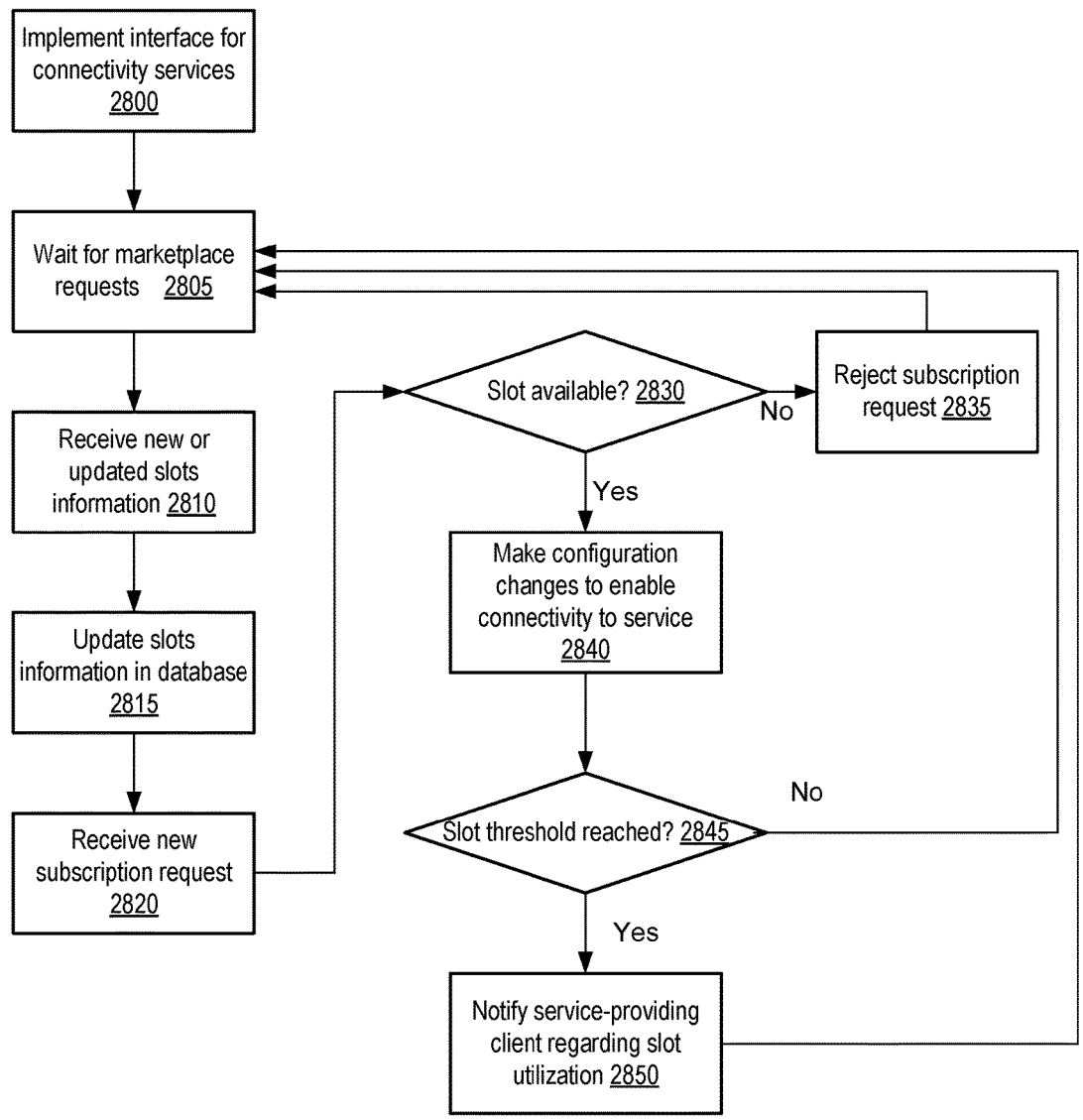
FIG. 28 is a flowchart of a method comprising using subscription slots to manage incoming subscription requests, according to at least some embodiments.

As noted earlier, in some embodiments, information regarding the ability of a service-providing client (such as Client A of FIG. 20) to accept new subscriptions may be maintained using a subscription slots mechanism. FIG. 28 is a flowchart of a method comprising using subscription slots to manage incoming subscription requests, according to at least some embodiments. As shown in element 2800, the method may comprise implementing an interface for connectivity-related services, and waiting for the next marketplace-related connectivity request (element 2805). In response to receiving new or updated slots information from a service-providing client (element 2810), the method may comprise storing the slots information in a database or persistent repository (element 2815). Subscription slots information may comprise, for example, an indication of how many subscribers the service-providing client is currently capable of serving, or how many distinct network ports or connections are available for subscriptions. In some implementations the slots information may include, for each slot, one or more IP addresses and/or TCP/IP port numbers from which the service may be accessed for the customer to whom that slot is allocated. In one implementation, a given slot may have additional information such as service-level characteristics associated with the corresponding subscription—e.g., a list of 10 open slots may include 3 slots for 10 GB of service related traffic per month and 7 slots for 1 GB traffic each. The service-providing client may in some embodiments use the interface provided by the connectivity provider to provide updates to slots information as subscribers are added or removed.

In element 2820, a new subscription request may be received at the connectivity coordinator in accordance with the interface. In response, the coordinator may determine whether a free slot is available (element 2830). If no slot is available, the subscription request may be rejected (element 2835). If a slot is available, the configuration changes needed to enable network traffic for the service between the subscriber's client network and the resources used for the service may be implemented (element 2840), and the slots information may be updated (e.g., by allocating one or more of the slots to the new subscriber). In some embodiments, the connectivity coordinator may be configured to monitor the number of slots available, and if the number of slots reaches some threshold (e.g., if 90% of the slots known to it are filled), notify the service-providing client, as shown in elements 2845 and 2850. The service-providing client may thus be made aware that it may soon need to increase the resources dedicated to providing the service, if new customers are to be accommodated.

Remote Connectivity Services Across Geographical Region Boundaries

In some cases an operator of a provider network may have facilities, including data centers, set up in multiple geographical regions. For example, one set of data centers may be established near the east coast of the continental United States, another set near the west coast, a third set in Europe, and a fourth set in Asia. For administrative as well as technical reasons, such a globally distributed provider network may be managed as a set of geographical zones, with each zone corresponding to a set of data centers and other facilities (such as the router co-location facilities 150 of FIG. 1) that are located near each other. The resource collections within a given geographical zone may be operated somewhat independently of those in other zones (e.g., different zones may have their own pricing policies, legal policies based on the region's government regulations, and the like) and yet may be reachable from other zones via private dedicated network paths that are also managed by the provider network's operator. Multiple geographical zones may help the operator of the provider network serve customers distributed across the world, and may enable functionality such as disaster recovery or remote replication that may not be easily accomplished without geographical diversification. In addition, in some cases such geographical diversification may permit the operator of the provider network to allow clients to benefit from pricing and technology variations across the different regions. In some embodiments, for example, a client that has established a direct physical link (similar to cross-network connection 191 of FIG. 1) to a provider network in one geographical zone may be able to access resources in other geographical zones using that same physical link, thus obtaining the benefits of having such a direct link without having to establish additional similar links in the other zones.

Figure 29:
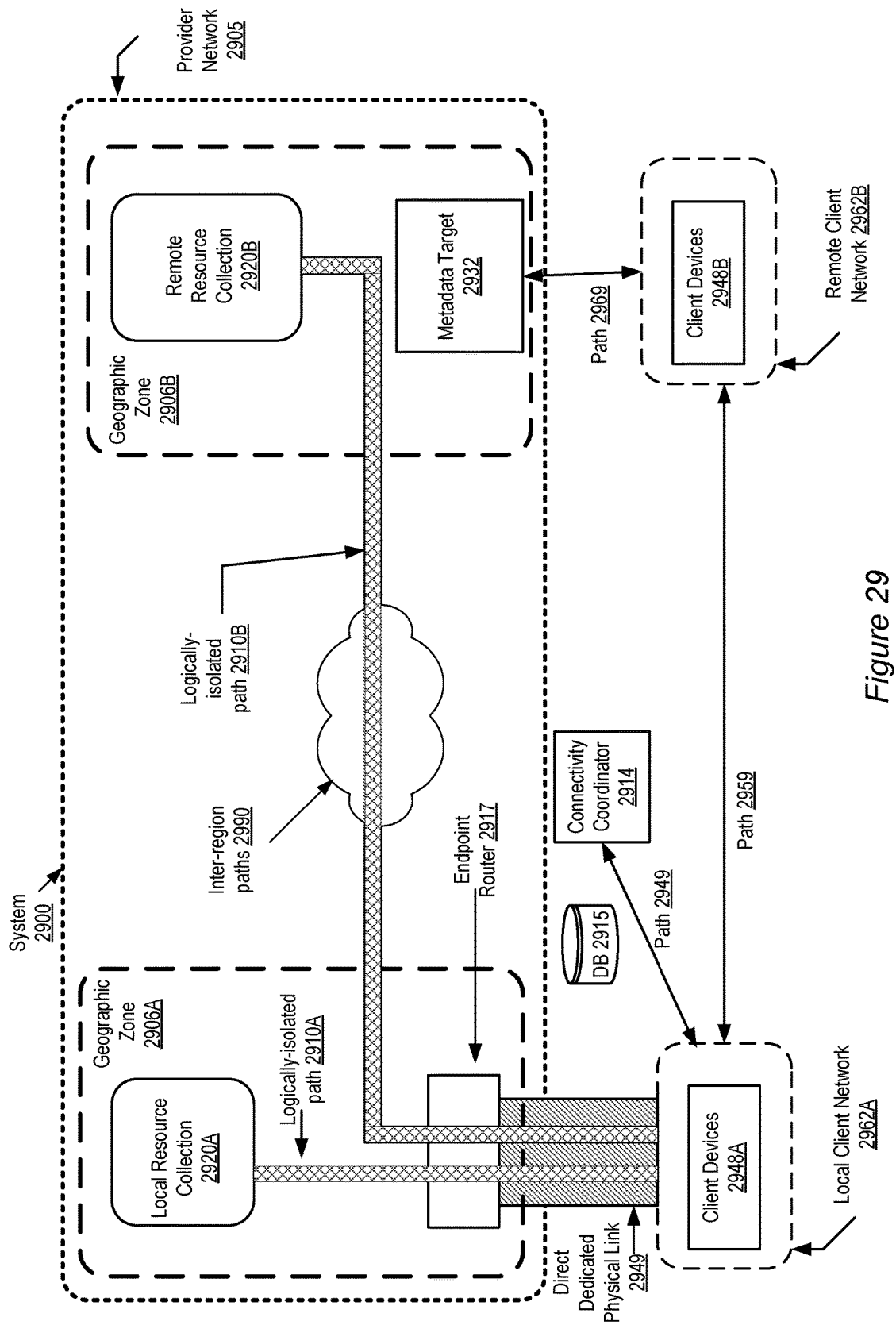
FIG. 29 illustrates an example of a system with a provider network comprising a plurality of geographical zones, according to at least some embodiments.

FIG. 29 illustrates an example of a system 2900 with a provider network 2905 comprising a plurality of geographical zones, according to at least some embodiments. In the illustrated embodiment, provider network 2905 includes geographical zones 2906A and 2906B. Geographical zone 2906A is designated as the "local" zone in the following description; it is the zone within which a client has established a direct dedicated physical link 2949. Geographical zone 2906B is designated the "remote" zone. The client in the illustrated embodiment operates a distributed client network, comprising a local client network component 2962A and a remote client network component 2962B that may be linked via paths external to the provider network (e.g., via elements of the public Internet and/or client-managed private paths), such as path 2959. The client may have established the direct link 2949, e.g., with the help of a connectivity coordinator 2914 using techniques similar to those described earlier in conjunction with the description of FIG. 1 or FIG. 11, to set up a logically-isolated path 2910A between its local client network 2962A and a local resource collection 2920A via an endpoint router 2917.

Connectivity provider 2914 may be operable to implement a programmable interface (which may enhance or extend the functionality of the interfaces described earlier of coordinator 114 of FIG. 1, coordinator 1114 of FIG. 11, and/or coordinator 2014 of FIG. 20) defining connectivity services for remote geographical zones such as zone 2906B in the illustrated embodiment. For example, in response to a connectivity request formatted according to the interface to establish a logically isolated network path to remote resource collection 2920B, connectivity coordinator 2914 may perform one or more configuration operations to enable traffic to flow from the local client devices 2948A to remote resource collection 2920B over path 2910B using the dedicated physical network link 2949. The configuration operations may include, for example, routing changes at endpoint router 2917 and/or changes at other networking devices within inter-region paths 2990 of the provider network.

In some embodiments, the establishment of logically-isolated oath 2910B may require the requesting client to communicate with a metadata target 2932 in the remote zone 2906B. For example, in response to the connectivity request in such an embodiment, the connectivity coordinator 2914 may send connectivity metadata to the requesting client together with instructions to transmit the connectivity metadata to the metadata target 2932 over an alternate network path outside the provider network. The connectivity metadata may in some embodiments comprise information on some of the possible configuration changes that may be proposed by connectivity coordinator 2914, and may also include information about the requesting client or client devices. The connectivity metadata may be encoded or encrypted into a format that cannot be parsed by the client in some embodiments, e.g., to prevent the client from deliberately or accidentally corrupting or modifying the metadata. Such a technique may be used, for example, in a provider network 2905 that is configured to minimize control traffic or network administration traffic across its geographical zone boundaries, especially control traffic initiated in response to some types of client requests. Minimizing cross-zone control traffic in this way may help reduce the chances that the effects of a failure, misconfiguration or network intrusion within one geographical zone spread across multiple zones, and may thereby increase the reliability and availability of the provider network as a whole. The client may transmit the connectivity metadata from its local client network 2962A via external path 2959 to its remote client network 2962B, and from remote client network 2962B to the metadata target 2932 via path 2969 in the illustrated embodiment. The metadata target 2932 may process or validate the connectivity metadata in some embodiments, and send an indication to the connectivity coordinator 2914 (using any appropriate paths comprising elements internal to or external from the provider network) that the metadata has been received and processed as requested. Upon receiving such an indication, the connectivity coordinator may in such an embodiment proceed to make the configuration changes needed to establish the logically-isolated path 2910B. The metadata target 2932 may comprise various types of devices in different embodiments, such as for example a router, a gateway, or some other device capable of performing network administration functions. In some embodiments the metadata target 2932 may comprise a remote component of the connectivity coordinator 2914.

In addition to responding to connectivity requests for paths to remote zones, in some embodiments connectivity coordinator 2914 may also provide other services related to remote zones. For example, the connectivity coordinator 2914 may respond to a client query via the interface asking for an enumeration of remote resource collections to which paths can be set up by that client, a client query asking for performance metrics or status of a logically-isolated path to a remote resource collection, and so on. The connectivity coordinator 2914 may store connectivity-related information in a database 2915 in some embodiments, which may be used to provide responses to such client queries. Clients may also use the interface to disable or terminate logical paths such as path 2910B, to modify the characteristics (e.g., the maximum allowed traffic rate) of an existing logically-isolated path, to provide payment-related information for the paths, to identify services (similar to service 2008 of FIG. 20) that may be implemented in a remote zone, and so on. Pricing information for the remote connectivity services (such as rates for traffic that stays within a given zone, and rates for traffic that crosses zone boundaries) may also be provided via the interface. Pricing for traffic within one zone (e.g., the local zone 2906A) may differ from pricing from traffic within a different zone (e.g., remote zone 2906B) in some embodiments, and pricing for traffic that moves from one zone to another may be different from intra-zone pricing for either zone. The pricing information provided via the interface in some embodiments may include pricing indicators that depend on the amount of network traffic generated (e.g., based on the number of megabytes of network traffic over a given time period), and/or on the distance that traffic is transmitted. In one embodiment, service characteristics such as expected response times or throughputs may differ from one zone to another, and the interface may be used to provide information on such service variations as well: for example, the expected response times may be higher for requests that cross zone boundaries than for requests are serviced without crossing zone boundaries. In some embodiments access policies may be associated with various local and remote resource collections 2920 and/or the services implemented therein, which may govern who is allowed to access the resource collection or service, or from where such access is permitted. In such embodiments, before responding to a connectivity request or providing any connectivity-related notifications or responses, the connectivity coordinator 2914 may verify whether the action it is taking is in compliance with the applicable access policy or policies. Access policies associated with the resource collections 2920 and/or associated services may, in some implementations, be stored in the database 2915. The interface may comprise any combination of an application programming interface, a command-line interface, a GUI, and/or a web interface in different embodiments.

Examples of Client-coordinator Interactions for Remote Connectivity Operations

Figure 30:
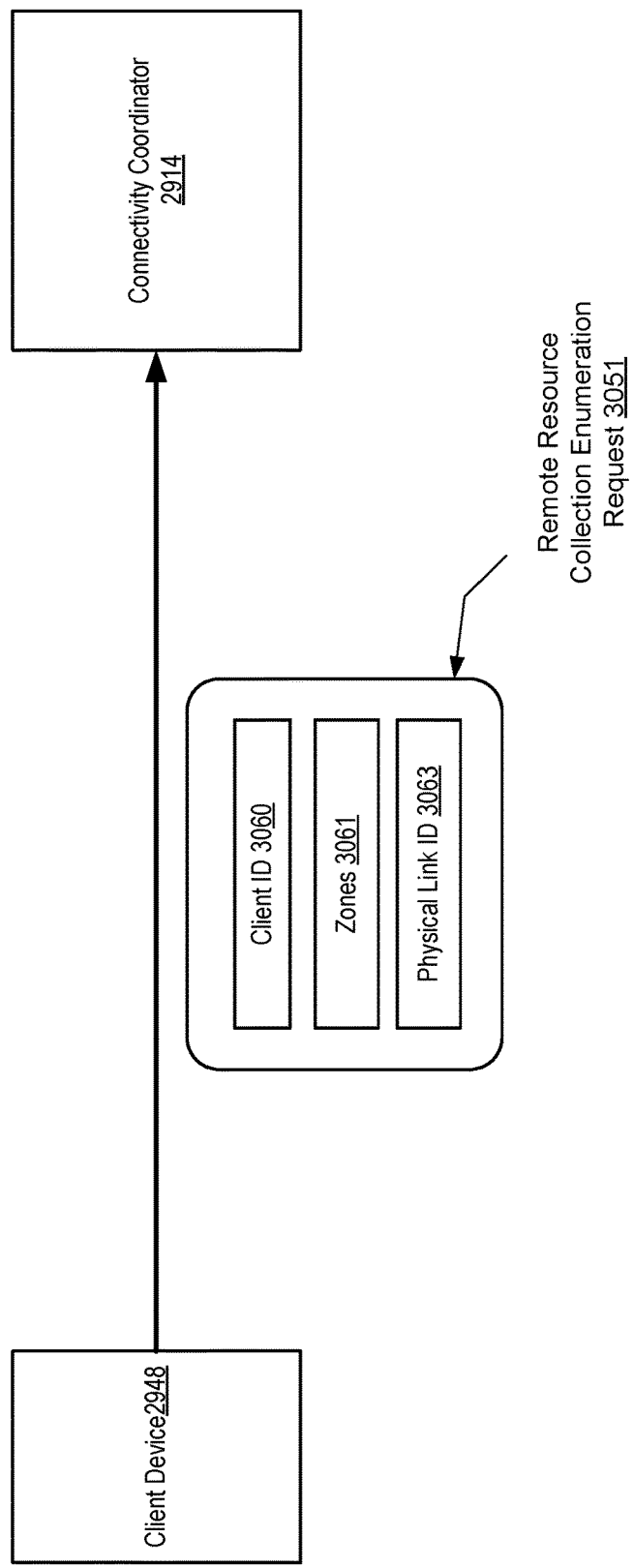
FIG. 30 illustrates examples of constituent elements of a remote resource collection enumeration request that may be sent to a connectivity coordinator by a client, according to at least some embodiments.

In some environments, clients may have multiple resource collections allocated for their use in various geographical zones, and it may not be clear to the client how many (or exactly which) remote resource collections may be reachable via new logically-isolated paths over a given direct physical link. FIG. 30 illustrates examples of constituent elements of a remote resource collection enumeration request 3051 that may be sent to connectivity coordinator 2914 by a client using the interface provided by the connectivity coordinator, according to at least some embodiments. Such a request may be sent by the client to identify the specific resource collections in remote zones to which it may be possible to establish new logically-isolated paths using an existing dedicated physical link such as link 2949 of FIG. 29. As shown, the request comprises a client identifier 3060 of the requesting client, zone information 3061 indicating the geographical zones to which logically-isolated paths may be desired, and physical link identification information 3063 indicating the direct link or links to be used for the paths. In some embodiments the request may include only the client identification 3060 and the zone information 3061, and the connectivity coordinator 2914 may be responsible for identifying both the remote resource collections and the direct physical links that have already been set up on behalf of the client.

Figure 31:
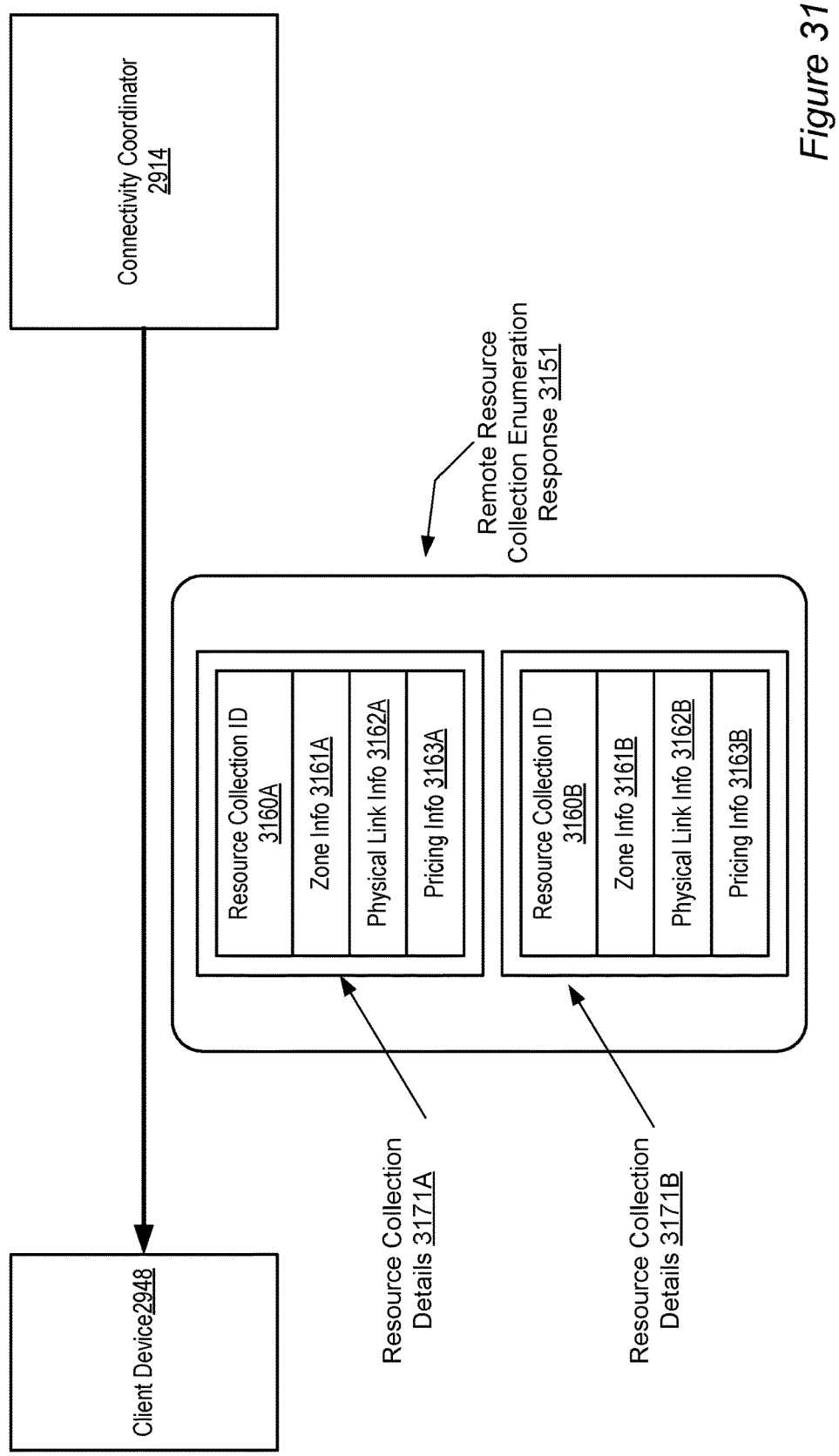
FIG. 31 illustrates examples of constituent elements of a remote resource collection enumeration response that may be sent by a connectivity coordinator to a client, according to at least some embodiments.

FIG. 31 illustrates examples of constituent elements of a remote resource collection enumeration response 3151 that may be sent by connectivity coordinator 2914 using the interface to a client from which a request similar to request 3051 was received, according to at least some embodiments. Such a response may include a list of resource collection details records such as 3171A and 3171B which the connectivity coordinator 2914 may have retrieved from its connectivity database 2915 in some embodiments. Each details record 3171 may comprise an identification 3160 of a resource collection within a corresponding geographical zone 3161 to which a new logically-isolated path may be established over an existing physical link identified by physical link information 3162. In addition, the response 3151 may include pricing-related information 3163 for each potential logically-isolated path in one embodiment. Pricing details may include different rates for different time periods—e.g., in an environment where the local zone and the remote zone are in different time zones, one rate may be quoted for inter-zone traffic during 8 am to 6 pm of each business day in the local zone, and another rate may be quoted for inter-zone traffic during 8 am to 6 pm of the remote zone's business day. Pricing information 3163 may include fixed fees (e.g., for establishing the logically-isolated paths) and traffic-based fees (e.g., proportional to the amount of traffic transmitted or the number of service requests made). In some embodiments clients may also be charged based on their use of additional services that may be provided within the provider network, such as hardware or software load balancing, wide area network (WAN) scaling, and the like. In such embodiments pricing information 3163 may include indicators of the pricing for such services.

Figure 32:
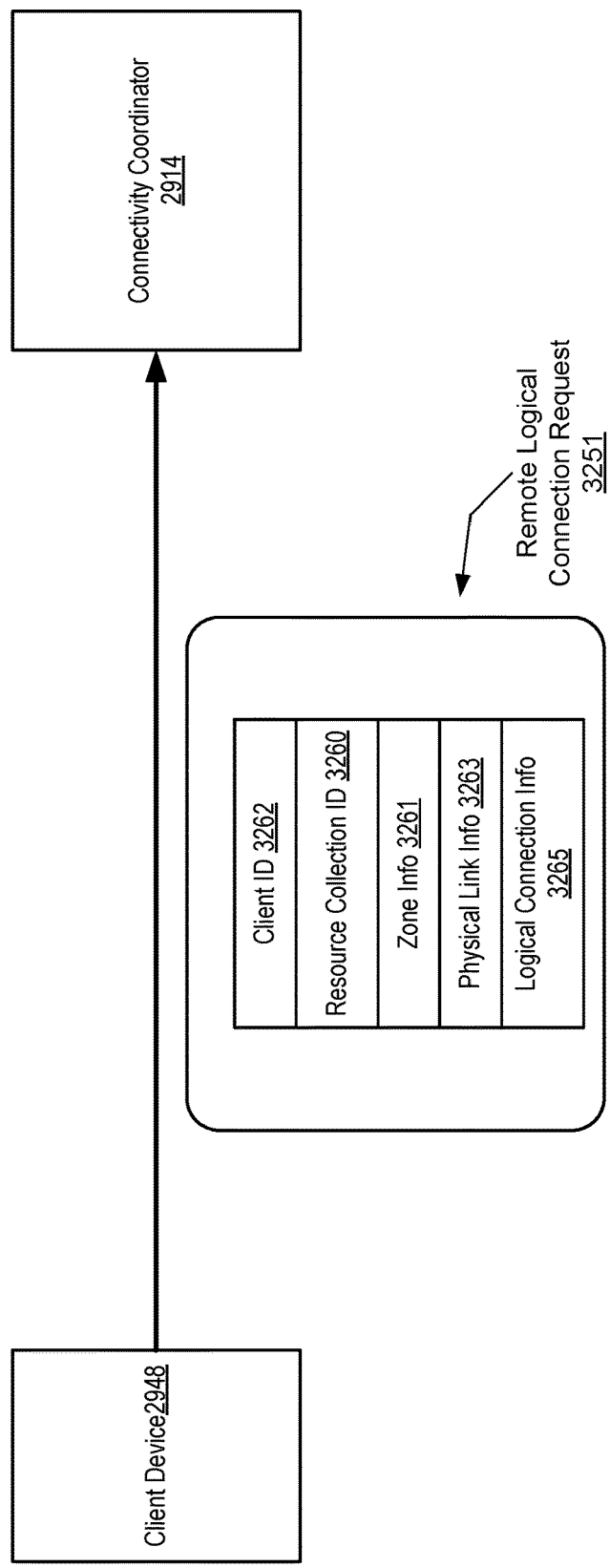
FIG. 32 illustrates examples of constituent elements of a remote logical connection request that may be sent by a client to a connectivity coordinator, according to at least some embodiments.

FIG. 32 illustrates examples of constituent elements of a remote logical connection request 3251 that may be sent by a client to connectivity coordinator 2914 using the interface, according to at least some embodiments. In embodiments where a client sends a remote resource collection enumeration request such as request 3051 to a connectivity coordinator to find potential remote resource collections, request 3251 may be sent after the remote resource collections have been enumerated and the client has selected a particular remote resource collection. In other embodiments a client may not need to request an enumeration of remote resource collections (e.g., if the client already knows which remote resource collection to connect to, or has only one remote resource collection), and in such cases a remote logical connection request 3251 may be sent without the types of communications shown in FIGS. 30 and 31. The remote logical connection request 3251 may include client identification 3262, the remote resource collection identification 3260, zone information 3261 for the remote resource collection, information 3262 identifying the physical link (similar to link 2949 of FIG. 29) to be used, and logical connection information 3265 in some embodiments. Logical connection information 3265 may in turn comprise any of a number of elements similar to those shown in FIG. 5, such as a connection identifier 482, VLAN tag 501, BGP ASN information 511, network prefixes 521, pairing information 531, and virtual private gateway information 541, that may be useful in establishing the requested logically-isolated path.

Figure 33:
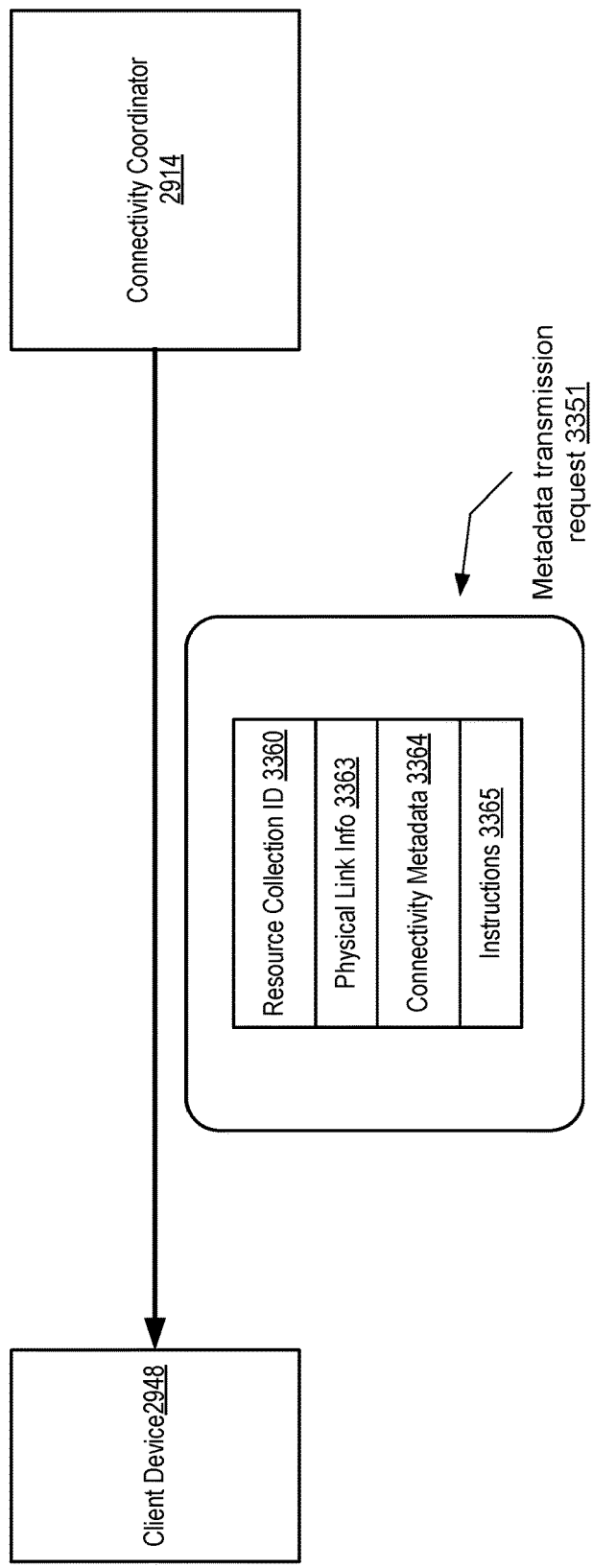
FIG. 33 illustrates examples of constituent elements of a metadata transmission request that may be sent by a connectivity coordinator to a client, according to at least some embodiments.

Upon receiving a remote logical connection request 3251, in some embodiments connectivity coordinator 2914 may perform the configuration change or changes (such as routing changes at endpoint router 2917 and/or configuration changes at other network devices managing traffic flow over inter-regional paths 2990) needed to enable traffic to flow over the requested logically-isolated path. In other embodiments the provider network 2905 may implement policies that require the requesting client to perform an additional step of transmitting metadata for the requested logical connection to a target address, before the configuration changes are made. FIG. 33 illustrates examples of constituent elements of a metadata transmission request 3351 that may be sent by the connectivity coordinator 2914 to a client via the interface, according to at least some such embodiments. The metadata transmission request 3351 may comprise identification information 3360 for the resource collection to which a new logically-isolated path was requested by the client, physical link information 3363 identifying the direct physical link to be used, connectivity metadata 3364 and instructions 3365 for transmitting the connectivity metadata. The instructions may, for example, comprise an IP address or addresses in the remote zone to which the client is requested to transmit the metadata 3364, and/or steps to be followed during the transmission—e.g., the equivalent of "save the metadata as a file and forward it as an email attachment", or "open a web page at this host and port, authenticate yourself using your user ID, and paste the metadata in the form field on the page". In some embodiments the metadata 3364 may be encoded or encrypted, e.g., using a digital signature mechanism in which the connectivity coordinator and the metadata target device participate, so that its contents are not easily modifiable or corruptible by the client. As described earlier, such a step of requesting a client to transmit connectivity metadata to a destination in the remote zone via a path outside the provider network may be implemented to reduce the control traffic across geographical zones in some embodiments, and may help enhance the reliability and fault-tolerance of the provider network.

In an embodiment in which a metadata transmission request 3351 is sent to a client, the connectivity coordinator 2914 may then wait for an acknowledgement from the metadata target device to which the client is requested to send the metadata. Such an acknowledgment may be transmitted across paths external to the provider network in some embodiments, and within the provider network in other embodiments. When an acknowledgment from the metadata target device is received, indicating that the metadata was transmitted by the client as per the instructions 3365 and was found to be valid, the connectivity coordinator 2914 may perform the configuration changes needed to establish the desired logically-isolated connection. In some embodiments the metadata may be used by one or more devices within the remote zone (including, for example, the metadata target device) to perform configuration changes needed for the logical connection within the remote zone, and the connectivity coordinator 2914 may perform configuration changes needed within the local zone. In one embodiment, portions of the functionality provided by connectivity coordinator 2914 may be implemented within each zone, and the target metadata device may comprise a remote component of the connectivity coordinator. After the desired connectivity has been established, in one embodiment the connectivity coordinator may send a confirmation message to the client, similar to the confirmation message 651 of FIG. 6.

Example Web Interface for Remote Logical Connections

FIG. 34 is an illustration of a portion of an exemplary web-based interface that may be provided to allow a client to request the establishment of a logically-isolated path to a remote resource collection, according to some embodiments. As shown, form fields included within a web page 3400 may be used by clients to provide the information needed to set up such a path. The web page may include a welcome message area 3403, and form field 3405 for the client identifier of the requesting client. The remote resource collection to which the logically isolated path is desired may be specified via form field 3407. The remote zone may be specified via field 3409, and the direct physical link to be used may be identified via filed 3411.

Additional details about the desired logically-isolated path, such as a VLAN tag, a BGP ASN, network prefixes, pairing information, and gateway information, may be specified via form fields 3413. The submit button 3415 may be used to submit the completed request for the remote logical connection to the connectivity coordinator 2914. In some embodiments one or more of the form fields may be populated with the help of drop-down menus that allow the client to select from among several choices available, and default values may be provided for some form fields. Web pages similar to web page 3400 may be used for other types of remote connectivity-related communications between clients and the connectivity coordinator as well, such as enumeration requests for identifying remote resource collections, modifications to existing logical connections, queries, and connection disablement or termination.

In one embodiment, the submission of such a form 3400 may result in the invocation of one or more APIs at the connectivity coordinator 2914 similar to APIs API-1 through API-18, API 21 through API-25, and API-31 through API-34 described earlier. Example API invocations for operations related to remote logical connections may include the following in one implementation:

[API-41] ResourceCollectionList rsList=findRemoteResourceCollections(CustomerID customerId, ZoneInfo zoneInfo, ConnectionId connectionId);

The findRemoteResourceCollections API may be used to obtain an enumeration or list of remote resource collections in specified zones to which connectivity may be enabled using a physical link identified via connectionId.

[API-42] LogicalRequestId logicalRequestId=setUpRemoteLogicalConnection(ConnectionId connectionId, RemoteLogicalConnectionParameters lcParameters);

The setUpRemoteLogicalConnection API may be used to request that a logically isolated network path be set up using a previously established physical connection and a set of logical connection properties encapsulated in a RemoteLogicalConnectionParameters object.

[API-43] RemoteLogicalConnectionInfo logicalConnectionInfo=getRemoteLogicalConnectionInfo(LogicalConnectionId logicalConnectionId);

The getRemoteLogicalConnectionInfo API may be used to obtain the properties and status of the remote logical connection, including such properties as the VLAN tag being used and/or other routing-related information associated with the logical connection.

[API-44] RemoteLogicalConnectionRequestStatus modificationStatus=modifyRemoteLogicalConnection(LogicalConnectionId logicalConnectionId, LogicalConnectionModificationInfo modificationInfo);

The modifyRemoteLogicalConnection API may be used to request changes to an existing remote logical connection—e.g., to modify the set of network prefixes associated with it.

[API-45] RemoteLogicalConnectionRequestStatus disableL- ogicalConnectionStatus=disableRemoteLogicalConnection(LogicalConnectionId connectionId);

The disableRemoteLogicalConnection API may be used to request that an existing remote logical connection be disabled, i.e., that no traffic be allowed to flow through the logically-isolated path associated with the logical connection.

[API-46] RemoteLogicalConnectionRequestStatus enableLogicalConnectionStatus=enableRemoteLogicalConnection(LogicalConnectionId connectionId);

The enableRemoteLogicalConnection API may be used to request that an existing (e.g., currently disabled) remote logical connection be enabled.

[API-47] RemoteLogicalConnectionRequestStatus deleteLogicalConnectionStatus=deleteRemoteLogicalConnection (LogicalConnectionId connectionId);

The deleteRemoteLogicalConnection API may be used to request that a remote logical connection be removed permanently.

In some implementations multiple layers of interfaces may be supported, allowing clients to request some connectivity-related operations using a web interface, for example, and to perform or request other operations using an API. Customized versions of portions of the interface may be provided in some implementations, e.g. web pages may be translated into the local language for each zone.

Methods for Remote Connectivity Operations

Figure 35:
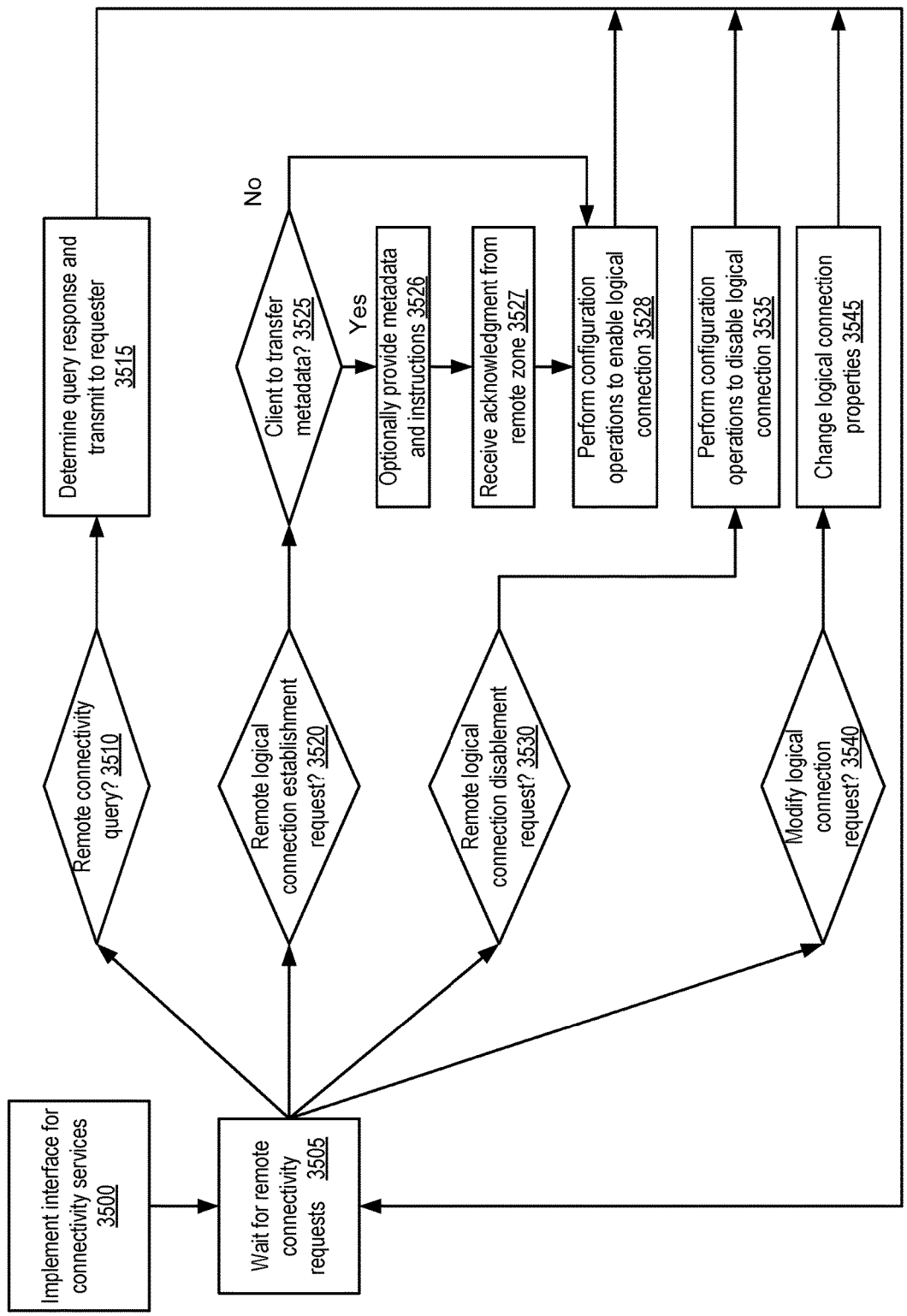
FIG. 35 is a flowchart of a method for providing connectivity services across geographical zones of a provider network, according to at least some embodiments.

FIG. 35 is a flowchart of a method for providing connectivity services across geographical zones of a provider network, according to at least some embodiments. As shown in element 3500 of FIG. 35, the method may comprise implementing a programmatic interface that defines a set of connectivity operations made available to clients of a provider network 2905 by a connectivity coordinator 2914. The interface may comprise an API, a command-line interface, a web-based interface, some other GUI, or any other programmatic interface, for example. As shown in element 3505, the method may include waiting for a remote connectivity-related request received in accordance with the interface. Depending on the type of request, one or more operations may be performed as part of the method. For example, if the request is a query related to an existing remote logical connection or a remote resource collection (element 3510), a response to the query may be generated (element 3515), e.g., by consulting database 2915, and transmitted to the requester. In response to a query (such as the request 3051 of FIG. 30) requesting an enumeration of remote resource collections to which logically isolated paths may be configurable, a list of such resource collections may be provided to the requester, together with information such as connectivity pricing rates in some embodiments. If a request to establish a remote logical connection is received (element 3520), and the connectivity coordinator is configured to use the technique described above of requesting the client to transmit connectivity metadata to a designated address within the remote zone (as determined in element 3525), the connectivity coordinator 2914 may send the metadata and instructions (element 3526) to the requesting client. After the metadata has been transmitted in accordance with the instructions, an acknowledgement of the metadata transfer may be received from the remote zone by the connectivity coordinator (element 3527). The configuration operations to enable traffic to flow over the requested logically-isolated path may then be performed (element 3528). In embodiments where connectivity metadata transfer by the client is not required, the connectivity coordinator 2914 may perform the configuration operations as indicated in element 3528 in response to receiving the request as shown in element 3520. The configuration operations may for example include routing changes at endpoint routers 2917 or other devices involved in administering inter-region paths 2990 of the provider network.

If a request to disable or terminate a logically isolated path to a remote resource collection is received (element 3530), the appropriate configuration changes may be performed (element 3535) to disable further traffic via the path. In some implementations, clients may issue requests via the interface to modify one or more properties of an existing remote logical connection (element 3540), such as the maximum traffic rate supported, and in response the connectivity coordinator may modify the properties as requested (element 3545). Upon completing the operations responsive to a given request, the method may comprise resuming waiting for the next client request. In some embodiments multiple requests may be handled in parallel.

Example Use Cases

The techniques described above of providing easy-to-use interfaces for dedicated connectivity operations may be used in a variety of environments. For example, if the provider network is expanding quickly across new geographical regions where the reliability, performance and/or security of publicly available networking facilities is limited, more and more clients may wish to utilize dedicated connectivity, especially if it is provided at a reasonable price point. In addition, in cases where a provider network operator may already provide a set of interfaces for managing computation and/or storage resources (such as resource collections 120 of FIG. 1) that are currently accessed via shared (non-dedicated) paths, the provision of additional interfaces to manage dedicated connectivity options may significantly increase the adoption rate of the dedicated connectivity services in which the operator has invested.

Illustrative Computer System

Figure 36:
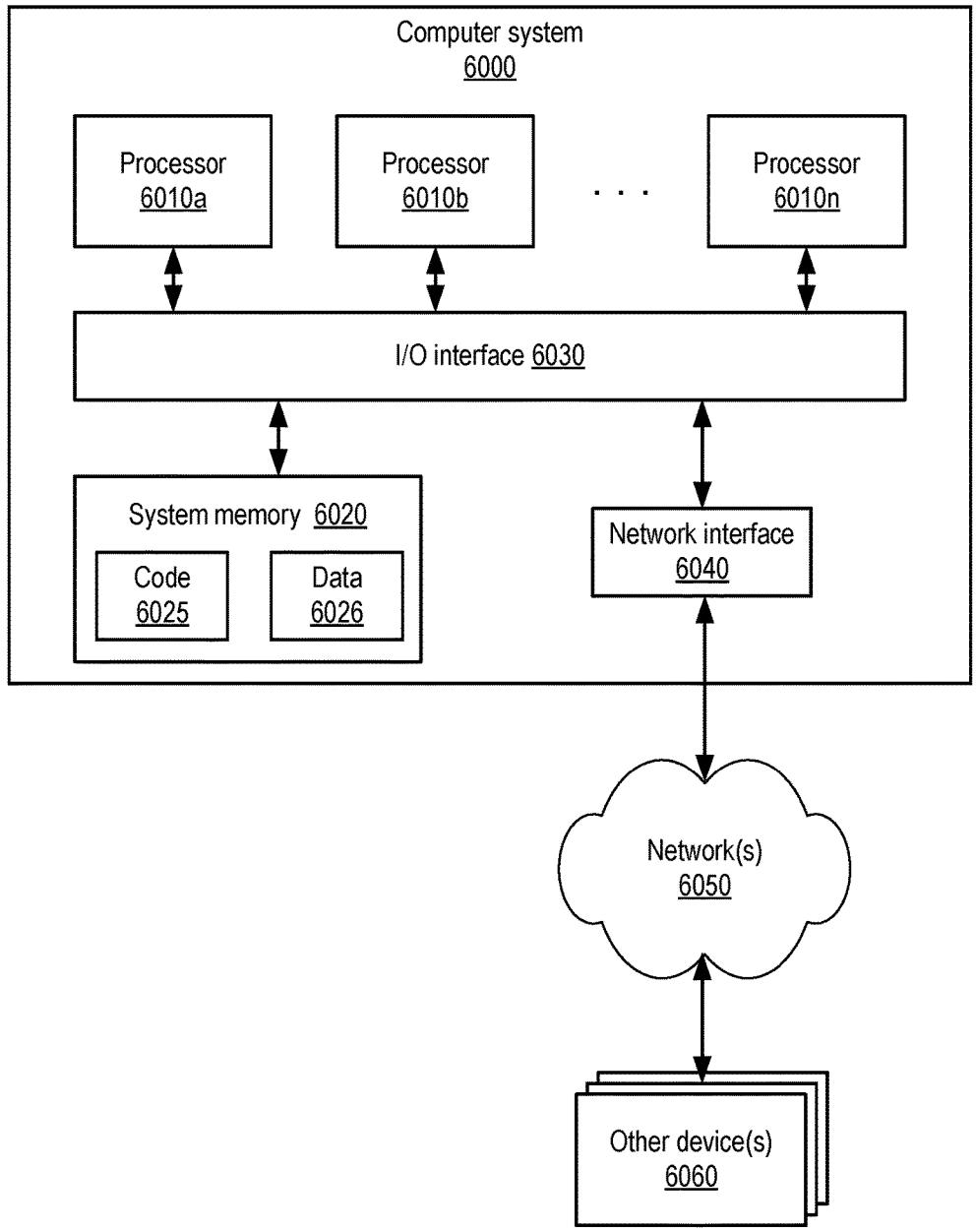
FIG. 36 is a block diagram illustrating an example computer system that may be used in some embodiments.

In at least some embodiments, a server that implements a portion or all of one or more of the technologies described herein, including the techniques to implement an interface that defines various connectivity services and operations, and to receive and respond to various types of connectivity requests via the interface, may include a general-purpose computer system that includes or is configured to access one or more computer-accessible media, such as computer system 6000 illustrated in FIG. 36. In the illustrated embodiment, computer system 6000 includes one or more processors 6010 coupled to a system memory 6020 via an input/output (I/O) interface 6030. Computer system 6000 further includes a network interface 6040 coupled to I/O interface 6030.

In various embodiments, computer system 6000 may be a uniprocessor system including one processor 6010, or a multiprocessor system including several processors 6010 (e.g., two, four, eight, or another suitable number). Processors 6010 may be any suitable processors capable of executing instructions. For example, in various embodiments, processors 6010 may be general-purpose or embedded processors implementing any of a variety of instruction set architectures (ISAs), such as the x86, PowerPC, SPARC, or MIPS ISAs, or any other suitable ISA. In multiprocessor systems, each of processors 6010 may commonly, but not necessarily, implement the same ISA.

System memory 6020 may be configured to store instructions and data accessible by processor(s) 6010. In various embodiments, system memory 6020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 6020 as code 6025 and data 6026.

In one embodiment, I/O interface 6030 may be configured to coordinate I/O traffic between processor 6010, system memory 6020, and any peripheral devices in the device, including network interface 6040 or other peripheral interfaces. In some embodiments, I/O interface 6030 may perform any necessary protocol, timing or other data transformations to convert data signals from one component (e.g., system memory 6020) into a format suitable for use by another component (e.g., processor 6010). In some embodiments, I/O interface 6030 may include support for devices attached through various types of peripheral buses, such as a variant of the Peripheral Component Interconnect (PCI) bus standard or the Universal Serial Bus (USB) standard, for example. In some embodiments, the function of I/O interface 6030 may be split into two or more separate components, such as a north bridge and a south bridge, for example. Also, in some embodiments some or all of the functionality of I/O interface 6030, such as an interface to system memory 6020, may be incorporated directly into processor 6010.

Network interface 6040 may be configured to allow data to be exchanged between computer system 6000 and other devices 6060 attached to a network or networks 6050, such as other computer systems or devices as illustrated in FIGS. 1 through 35, for example. In various embodiments, network interface 6040 may support communication via any suitable wired or wireless general data networks, such as types of Ethernet network, for example. Additionally, network interface 6040 may support communication via telecommunications/telephony networks such as analog voice networks or digital fiber communications networks, via storage area networks such as Fibre Channel SANs, or via any other suitable type of network and/or protocol.

In some embodiments, system memory 6020 may be one embodiment of a computer-accessible medium configured to store program instructions and data as described above for FIGS. 1 through 35 for implementing embodiments of methods and apparatus for interfaces to manage direct network peerings. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 6000 via I/O interface 6030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 6000 as system memory 6020 or another type of memory. Further, a computer-accessible medium may include transmission media or signals such as electrical, electromagnetic, or digital signals, conveyed via a communication medium such as a network and/or a wireless link, such as may be implemented via network interface 6040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
 a plurality of resource collections of a provider network, including a first resource collection and a second resource collection, wherein the first and second resource collections each comprise compute or storage resources configured to provide compute or storage services to clients of the provider network, and wherein the first resource collection is in a different geographical zone of the provider network than the second resource collection;
 an endpoint router associated with the first resource collection, wherein the endpoint router links the first resource collection to a client network of a client via a dedicated physical network link between the provider network and the client network; and
 a connectivity coordinator configured to:
  receive a connectivity request from the client to establish a network path from the client network to the second resource collection; and
  perform one or more configuration operations to enable traffic to flow from the client network to the second resource collection, wherein the traffic flows over the dedicated physical network link between the client network and the first resource collection of the provider network and through the provider network to the second resource collection.

2. The system of claim 1, wherein the compute or storage resources of the first resource collection are included in a first data center located in a first geographical zone of the provider network, and wherein the compute or storage resources of the second resource collection are included in a second data center located in a second geographical zone of the provider network.

3. The system of claim 2, wherein the first data center located in the first geographical zone and the second data center located in the second geographical zone are connected via a dedicated network path of the provider network between the first data center and the second data center,
 wherein the one or more configuration operations cause traffic to flow from the client network to the first data center over the dedicated physical network link and through the provider network to the second resource collection over the dedicated network path between the first data center and the second data center.

4. The system of claim 3, wherein the data center in the first geographical zone, the data center in the second geographical zone, and the dedicated network path are managed by an operator of the provider network.

5. The system of claim 1, wherein the first resource collection is located local to the client network and the second resource collection is located remote from the client network.

6. The system of claim 1, wherein the first resource collection is local to a first portion of the client network, and the second resource collection is local to a second portion of the client network, and
 wherein the one or more configuration operations cause traffic to flow between the second resource collection and the second portion of the client network over the dedicated physical network link linking the first portion of the client network to the first resource collection.

7. The system of claim 1, wherein the connectivity coordinator is further configured to:
 transmit connectivity metadata and instructions to a client device in the client network, via a path other than the dedicated physical network link, wherein the instructions comprise instructions to transmit the connectivity metadata to a metadata target at the second resource collection of the provider network,
 wherein the connectivity coordinator performs the one or more configuration operations to enable traffic to flow from the client network to the second resource collection over the dedicated physical network link in response to validating the connectivity metadata when sent from the client network and received at the second resource collection.

8. The system of claim 1, wherein the connectivity coordinator is further configured to:
 receive a remote resource collection enumeration request; and
 provide a response comprising a list of other remote resource collections to which a logically-isolated network path can be established over the dedicated physical network link.

9. A method, comprising:
 presenting a connectivity service to a client of a provider network, wherein the provider network comprises a first resource collection and a second resource collection located in different geographic locations, wherein the first and second resource collections each comprise compute or storage resources configured to provide compute or storage services to the client of the provider network;

receiving a connectivity request from the client to establish a logically isolated network path to the second resource collection using a dedicated physical link established between an endpoint router associated with the first resource collection and a client network of the client; and performing a configuration operation to enable traffic to flow from the client network to the second resource collection over the dedicated physical link between the client network and the first resource collection and through the provider network to the second resource collection.

10. The method of claim 9, further comprising:

in response to receiving the connectivity request, sending instructions to the client to transmit connectivity metadata to a destination address within the provider network; and prior to performing the configuration operation, verifying that the connectivity metadata was transmitted in accordance with the instructions.

11. The method as recited in claim 10, wherein the connectivity metadata is encoded in accordance with an encryption algorithm set up to secure communication between the connectivity coordinator and a network device associated with the destination address.

12. The method of claim 11, wherein the instructions are sent via a public network link to a portion of the client network that is local to the second resource collection.

13. The method of claim 12, wherein performing the configuration operation causes traffic to flow between the second resource collection and the portion of the client network local to the second resource collection via the dedicated physical network link between the client network and the first resource collection.

14. The method of claim 9, wherein the connectivity service includes a connectivity coordinator implementing a programmatic interface defining connectivity operations available to the client, wherein the interface comprises one or more of: an application programming interface, a command line interface, a graphical user interface or a web interface.

15. The method of claim 9, wherein the compute or storage resources of the first resource collection are included in a first data center located in a first geographical zone of the provider network, and wherein the compute or storage resources of the second resource collection are included in a second data center located in a second geographical zone of the provider network, wherein a dedicated network path of the provider network connects the first data center and the second data center.

16. One or more non-transitory computer-accessible storage media storing program instructions that when executed on or across one or more processors:

implement a programmatic interface defining connectivity operations available to a client of a provider network, wherein the provider network comprises a plurality of resource collections each comprising compute or storage resources configured to provide compute or storage services to clients of the provider network, and wherein the compute or storage resources of a first resource collection of the provider network are located in a different geographical location than the compute or storage resources of a second resource collection of the provider network;

receive a connectivity request from the client to establish a logically isolated network path from the client network to the second resource collection; and perform one or more configuration operations to enable traffic to flow from the client network to the second resource collection over a dedicated physical network link between the client network and the first resource collection of the provider network and through the provider network to the second resource collection.

17. The one or more non-transitory computer-accessible storage media as recited in claim 16, wherein the instructions when executed on or across the one or more processors:

send, in response to receiving the connectivity request, instructions to the client to transmit connectivity metadata to a destination address within the provider network; and verify, prior to performing the configuration operation, that the connectivity metadata was transmitted in accordance with the instructions.

18. The one or more non-transitory computer-accessible storage media as recited in claim 16, wherein the instructions when executed on or across the one or more processors:

provide, in response to receiving an enumeration request, a list of remote resource collections for which a logically-isolated network path can be established between the client network and the provider network over the dedicated physical network link between the client network and the first resource collection of the provider network.

19. The one or more non-transitory computer-accessible storage media as recited in claim 16, wherein:

the connectivity request specifies one or more characteristics of the logically isolated network path to be established from the client network to the second resource collection; and the one or more configuration operations establish the logically isolated network path in accordance with the characteristics specified in the connectivity request.

20. The one or more non-transitory computer-accessible storage media as recited in claim 16, wherein:

the connectivity request includes an identifier for the dedicated physical network link between the provider network and the client network to be used to establish the logically isolated network path; and the one or more configuration operations establish the logically isolated network path via the dedicated physical network link identified in the connectivity request.

* * * * *